United States Patent
Shiono

(10) Patent No.: US 10,739,575 B2
(45) Date of Patent: Aug. 11, 2020

(54) LIGHT DETECTION DEVICE INCLUDING LIGHT DETECTOR, LIGHT-TRANSMISSIVE FIRST LAYER, FIRST OPTICAL COUPLER, AND SECOND OPTICAL COUPLER, AND LIGHT DETECTION SYSTEM INCLUDING THE SAME

(71) Applicant: Panasonic Intellectual Property Management Co., Ltd., Osaka (JP)

(72) Inventor: Teruhiro Shiono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/437,478

(22) Filed: Feb. 21, 2017

(65) Prior Publication Data

US 2017/0261738 A1    Sep. 14, 2017

(30) Foreign Application Priority Data

Mar. 9, 2016   (JP) .................................. 2016-045996
Mar. 9, 2016   (JP) .................................. 2016-045997

(51) Int. Cl.
   *G02B 21/36*      (2006.01)
   *G02B 21/00*      (2006.01)

(52) U.S. Cl.
   CPC ....... *G02B 21/361* (2013.01); *G02B 21/0056* (2013.01); *G02B 21/0068* (2013.01)

(58) Field of Classification Search
   CPC ............. G02B 21/361; G02B 21/0056; G02B 21/0068
   See application file for complete search history.

(56) References Cited

U.S. PATENT DOCUMENTS

| 5,493,397 A    | 2/1996 | Huber et al. |
| 7,560,681 B2 * | 7/2009 | Moon ............... G02B 3/0056 250/208.1 |
| 2010/0244168 A1 | 9/2010 | Shiozawa et al. |

(Continued)

FOREIGN PATENT DOCUMENTS

| JP | 2-093311 | 4/1990 |
| JP | 4-025725 | 1/1992 |
| JP | 4-106990 | 4/1992 |

(Continued)

*Primary Examiner* — Tony Ko

(74) *Attorney, Agent, or Firm* — McDermott Will & Emery LLP

(57) ABSTRACT

A light detection device according to an aspect of the present disclosure includes a light detector, a first layer, a first optical coupler, and a second optical coupler. The light detector includes a first photodetector and a second photodetector. The first layer is disposed above the first photodetector and the second photodetector. The first layer is light-transmissive and has a first surface and a second surface opposing the first surface. The first optical coupler is disposed on at least one surface selected from the group consisting of the first surface and the second surface. The second optical coupler is disposed on the at least one surface. The first and second optical couplers are light-transmissive and disposed above the first and second photodetectors, respectively. The second surface is closer to the light detector than the first surface.

19 Claims, 42 Drawing Sheets

(56) References Cited

U.S. PATENT DOCUMENTS

2010/0253820 A1    10/2010   Kanamori et al.
2015/0171817 A1     6/2015   Sun

FOREIGN PATENT DOCUMENTS

| | | |
|---|---|---|
| JP | 6-288722 | 10/1994 |
| JP | 2000-065528 A | 3/2000 |
| JP | 2006-229116 A | 8/2006 |
| JP | 2008-282900 A | 11/2008 |
| JP | 2010-225944 A | 10/2010 |
| JP | 2011-180426 A | 9/2011 |
| JP | 2014-165417 A | 9/2014 |
| JP | 2015-017968 | 1/2015 |
| JP | 2015-172730 | 10/2015 |
| JP | 2015-219280 | 12/2015 |
| WO | 1997/012225 | 4/1997 |
| WO | 2009/072260 A1 | 6/2009 |

\* cited by examiner

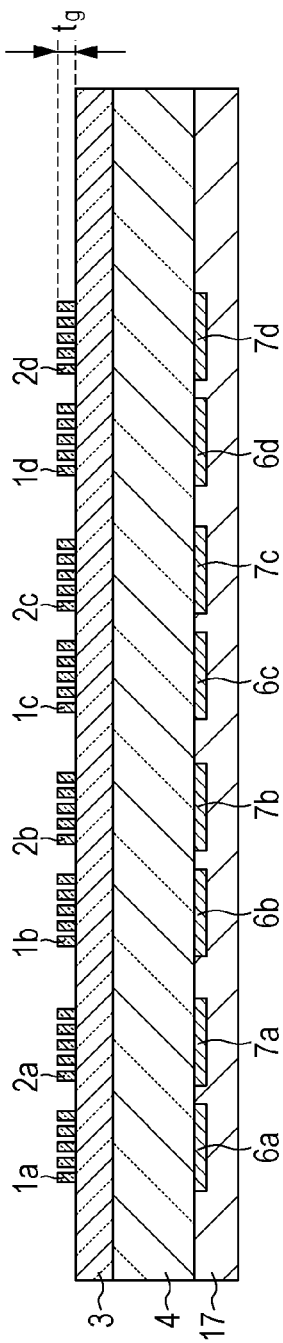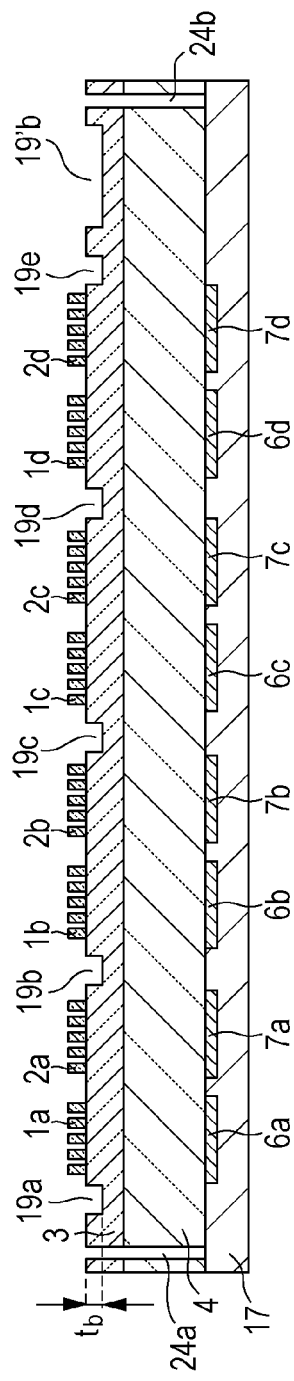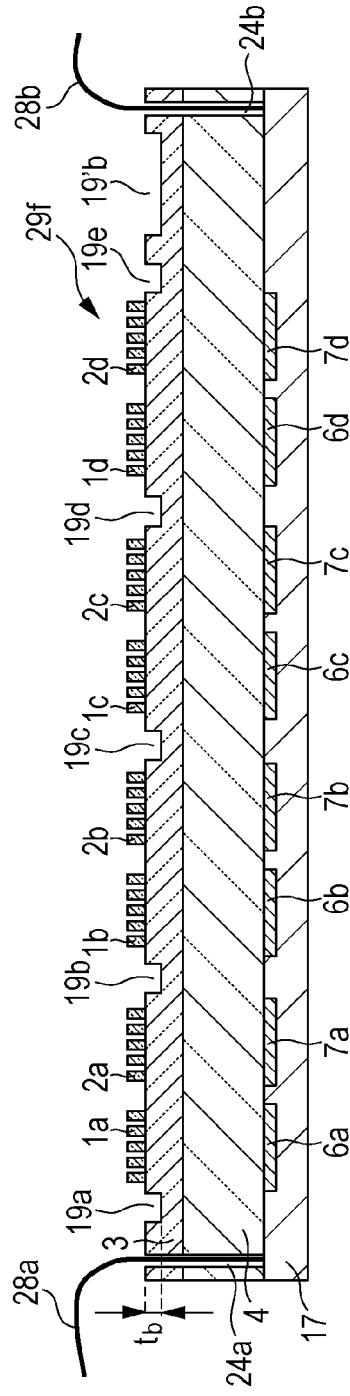

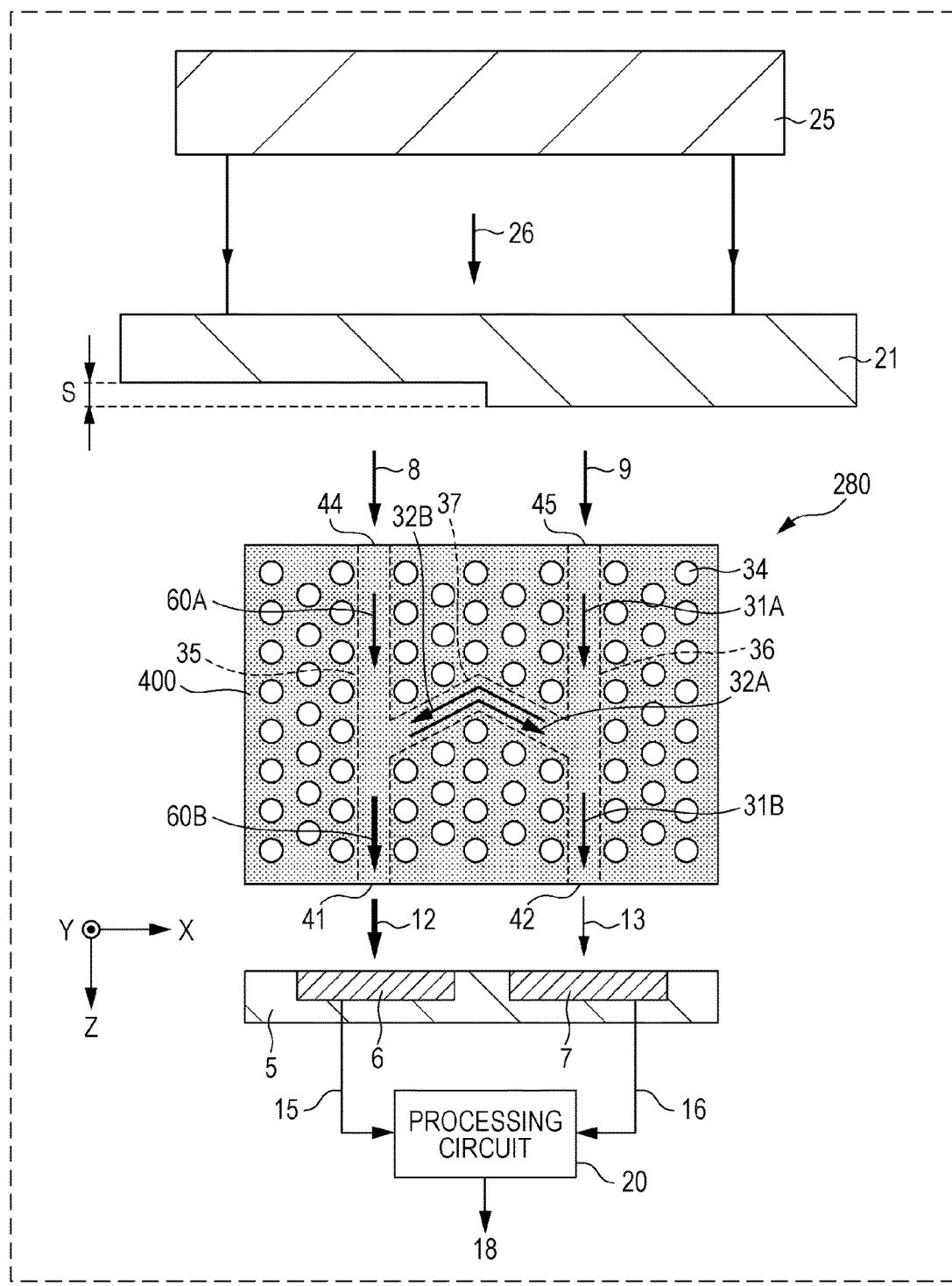

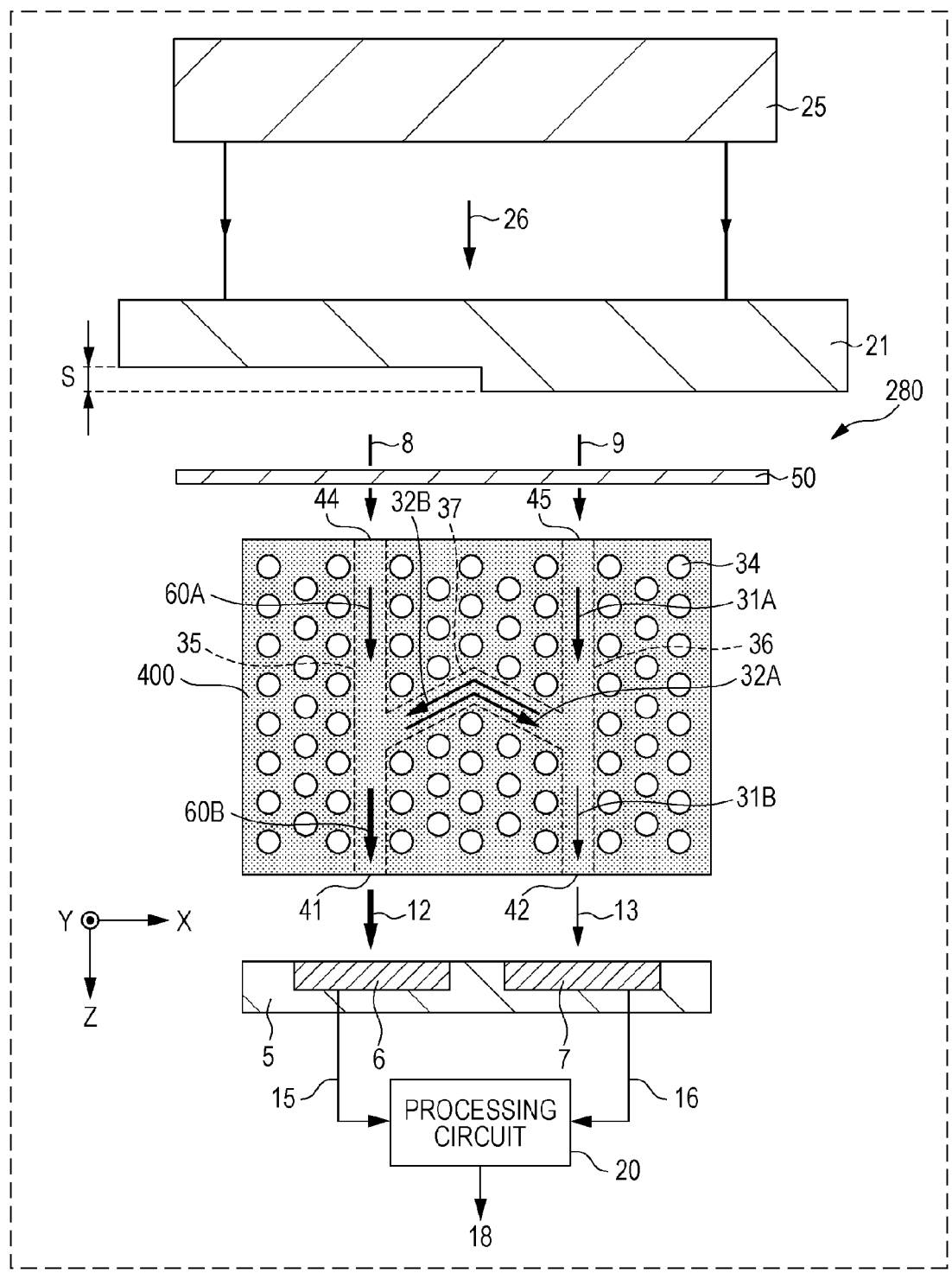

FIG. 28A
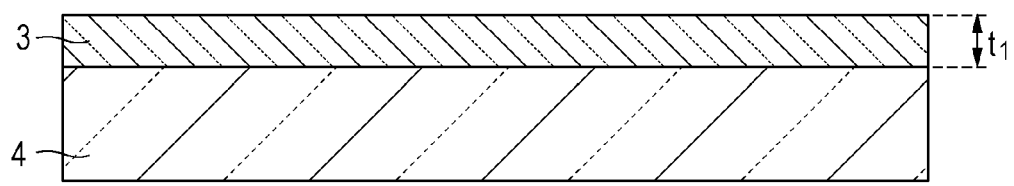
FIG. 28B
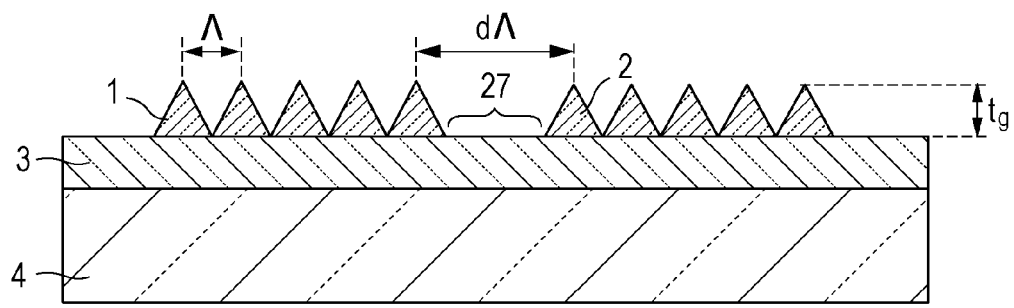
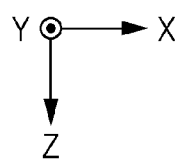

LIGHT DETECTION DEVICE INCLUDING LIGHT DETECTOR, LIGHT-TRANSMISSIVE FIRST LAYER, FIRST OPTICAL COUPLER, AND SECOND OPTICAL COUPLER, AND LIGHT DETECTION SYSTEM INCLUDING THE SAME

BACKGROUND

1. Technical Field

The present disclosure relates to a light detection device and a light detection system.

2. Description of the Related Art

Interferometers and phase-contrast microscopes are known as instruments used to observe an object and obtain information regarding the object.

Interferometers irradiate an object with coherent monochromatic light from a light source, cause transmitted or reflected light (signal light) and light (reference light) from the light source to interfere with each other, and detect the resultant light. Information regarding the surface profile of the object and the wavefront shape of the incident light is successfully obtained by analyzing an interference pattern resulting from an optical-path difference between the signal light and the reference light. Such interferometers are disclosed in Japanese Unexamined Patent Application Publication No. 2015-17968, for example.

Phase-contrast microscopes are instruments that convert phase differences in transmitted light due to different refractive indices or thicknesses of portions of an object into brightness changes for observation of the object. Phase-contrast microscopes enable observation of a phase distribution of light that has passed through an object even if the object is transparent. Such phase-contrast microscopes are disclosed in Japanese Unexamined Patent Application Publication No. 2015-219280, for example.

SUMMARY

In one general aspect, the techniques disclosed here feature a light detection device including a light detector including a first photodetector and a second photodetector; a first layer disposed above the first photodetector and the second photodetector, the first layer being light-transmissive and having a first surface and a second surface opposing the first surface; a first optical coupler disposed on at least one surface selected from the group consisting of the first surface and the second surface, the first optical coupler being light-transmissive and opposing the first photodetector; and a second optical coupler disposed on the at least one surface, the second optical coupler being light-transmissive and opposing the second photodetector. The second surface is closer to the light detector than the first surface.

It should be noted that general or specific embodiments may be implemented as a system, a method, an integrated circuit, a computer program, a recording medium, or any selective combination of a system, a device, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 15D is a fourth diagram illustrating the process of fabricating the light detection device according to the fourth embodiment;

FIG. 15E is a fifth diagram illustrating the process of fabricating the light detection device according to the fourth embodiment;

FIG. 15F is a sixth diagram illustrating the process of fabricating the light detection device according to the fourth embodiment;

FIG. 20A is a diagram schematically illustrating an example of the configuration of a light detection system in which the light detection device according to the sixth embodiment is used;

FIG. 20B is a diagram illustrating a modification of the light detection system according to the sixth embodiment;

FIG. 28A is a first diagram illustrating an example of a process of fabricating the light detection device according to the ninth embodiment;

FIG. 28B is a second diagram illustrating an example of the process of fabricating the light detection device according to the ninth embodiment;

DETAILED DESCRIPTION

Outline of Present Disclosure

Figure 1A:
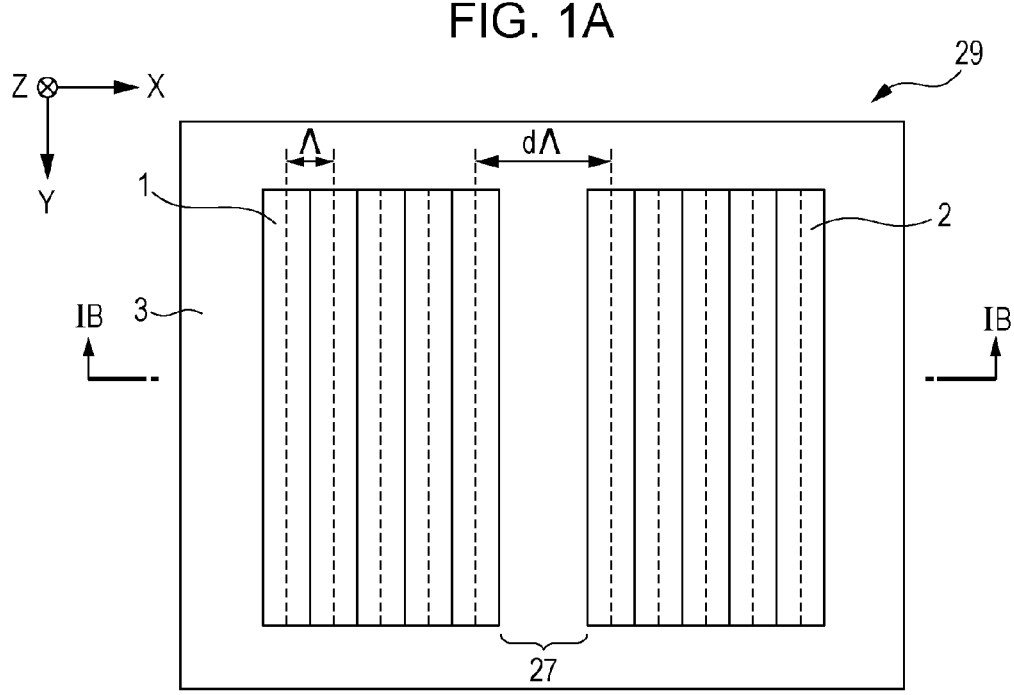
FIG. 1A is a plan view schematically illustrating the configuration of a light detection device according to a first embodiment of the present disclosure.

Embodiments of the present disclosure include light detection devices according to items below.

[Item 1] In accordance with Item 1 of the present disclosure, a light detection device includes a light detector including a first photodetector and a second photodetector;

a first layer disposed above the first photodetector and the second photodetector, the first layer being light-transmissive and having a first surface and a second surface opposing the first surface;

a first optical coupler disposed on at least one surface selected from the group consisting of the first surface and the second surface, the first optical coupler being light-transmissive and opposing the first photodetector; and a second optical coupler disposed on the at least one surface, the second optical coupler being light-transmissive and opposing the second photodetector, wherein the second surface is closer to the light detector than the first surface.

[Item 2] The light detection device according to Item 1 may further includes a second layer disposed between the light detector and the first layer so as to be in contact with the second surface of the first layer, the second layer being light-transmissive, wherein:

the second layer may have a refractive index lower than a refractive index of the first layer, the first optical coupler and the second optical coupler may be disposed on the first surface of the first layer, the first optical coupler may have a structure that allows part of first light incident on the first optical coupler to propagate through the first layer in a direction toward the second optical coupler, and the second optical coupler may have a structure that allows part of second light incident on the second optical coupler to propagate through the first layer in a direction toward the first optical coupler.

[Item 3] In the light detection device according to Item 2, the first optical coupler may allow another part of the first light to pass through the first layer and the second layer and to be incident on the first photodetector, and the second optical coupler may allow another part of the second light to pass through the first layer and the second layer and to be incident on the second photodetector.

[Item 4] The light detection device according to Item 1 may further include a second layer that is in contact with the first surface of the first layer, the second layer being light-transmissive, wherein the second layer may have a refractive index lower than a refractive index of the first layer, and the first optical coupler and the second optical coupler may be disposed on the second surface of the first layer.

[Item 5] In the light detection device according to any one of Items 1 to 4, the first photodetector and the second photodetector may be arranged along a first direction in plan view, the first optical coupler may be a first grating including first light-transmissive structures arranged along the first direction and extending in a second direction crossing the first direction in plan view, each of the first light-transmissive structures including a protrusion, and the second optical coupler may be a second grating including second light-transmissive structures arranged along the first direction and extending in the second direction in plan view, each of the second light-transmissive structures including a protrusion.

[Item 6] In the light detection device according to Item 5, the first grating, the second grating, and the first layer may be a single structure composed of an identical material.

[Item 7] In the light detection device according to Item 5 or 6, each of the first photodetector and the second photodetector may detect light having a wavelength λ in the air, and each of the first light-transmissive structures and the second light-transmissive structures may be arranged at a period Λ smaller than the wavelength λ, where 0.46 µm≤λ≤0.85 µm.

[Item 8] The light detection device according to Item 7 may further include a second layer disposed between the light detector and the first layer so as to be in contact with the second surface of the first layer, the second layer being light-transmissive, wherein:

the second layer may have a refractive index lower than a refractive index of the first layer, and the period Λ may satisfy $\lambda/n_1 < \Lambda < \lambda/n_2$, where $n_1$ denotes the refractive index of the first layer and $n_2$ denotes the refractive index of the second layer.

[Item 9] In the light detection device according to Item 7 or 8, the first grating may further include a portion in which the first light-transmissive structures are arranged at a period different from the period Λ, and the second grating may further include a portion in which the second light-transmissive structures are arranged at a period different from the period Λ.

[Item 10] In the light detection device according to any one of Items 7 to 9, a distance between a first light-transmissive structure closest to the second optical coupler among the first light-transmissive structures and a second light-transmissive structure closest to the first optical coupler among the second light-transmissive structures may be greater than the period Λ.

[Item 11] In the light detection device according to Item 10, the light detector may further include a third photodetector opposing a region between the first grating and the second grating.

[Item 12] The light detection device according to Item 10 or 11 may further include a second layer disposed between the light detector and the first layer so as to be in contact with the first layer, the second layer being light-transmissive, wherein:

the second layer may have a refractive index lower than a refractive index of the first layer, the first optical coupler and the second optical coupler may be disposed on the first surface of the first layer, cross-sections of the protrusion of the first grating and the protrusion of the second grating, the cross-sections being perpendicular to the second direction, may have a shape selected from the group consisting of a triangular shape, a trapezoidal shape, and a sinusoidal shape, and the distance may be equal to dΛ, d satisfying $i+1.05 \le d \le i+1.26$, or $i+1.58 \le d \le i+1.79$, where i is an integer that is greater than or equal to 0.

[Item 13] The light detection device according to Item 10 or 11 may further include a second layer that is in contact with the first surface of the first layer, the second layer being light-transmissive, wherein:

the second layer may have a refractive index lower than a refractive index of the first layer, the first optical coupler and the second optical coupler may be disposed on the second surface of the first layer, cross-sections of the protrusion of the first grating and the protrusion of the second grating, the cross-sections being perpendicular to the second direction, may have a shape selected from the group consisting of a triangular shape, a trapezoidal shape, and a sinusoidal shape, and the distance may be equal to dΛ, d satisfying $1.08+i \le d \le 1.31+i$, or $1.58+i \le d \le 1.83+i$, where i is an integer that is greater than or equal to 0.

[Item 14] The light detection device according to Item 10 or 11 may further include a second layer disposed between the light detector and the first layer so as to be in contact with the first layer, the second layer being light-transmissive, wherein the second layer may have a refractive index lower than a refractive index of the first layer, the first optical coupler and the second optical coupler may be disposed on the first surface of the first layer, cross-sections of the protrusion of the first grating and the protrusion of the second grating, the cross-sections being perpendicular to the second direction, may have a shape selected from the group consisting of a rectangular shape, a rounded rectangular shape, and a semicircular shape, and the distance may be equal to dΛ, d satisfying one condition selected from the group consisting of:

$1 < d \le 1.16$, $i+1.47 \le d \le i+1.77$, and $i+1.92 \le d \le i+2.16$, where i is an integer that is greater than or equal to 0.

[Item 15] The light detection device according to Item 10 or 11 may further include a second layer that is in contact with the first surface of the first layer, the second layer being light-transmissive, wherein:

the second layer may have a refractive index lower than a refractive index of the first layer, the first optical coupler and the second optical coupler may be disposed on the second surface of the first layer, cross-sections of the protrusion of the first grating and the protrusion of the second grating, the cross-sections being perpendicular to the second direction, may have a shape selected from the group consisting of a rectangular shape, a rounded rectangular shape, and a semicircular shape, and the distance may be equal to dΛ, d satisfying $1 < d \le 1.22$, or $1.46+i \le d \le 2.22+i$, where i is an integer that is greater than or equal to 0.

[Item 16] The light detection device according to any one of Items 1 to 15 may further include a polarizer, wherein the polarizer may allow light containing more transverse-magnetic polarization components than transverse-electric polarization components to be incident on the first optical coupler and the second optical coupler.

[Item 17] In the light detection device according to any one of Items 1 to 16, a plurality of first photodetectors may be provided in the light detector, each of the plurality of first photodetectors being the first photodetector, a plurality of second photodetectors may be provided in the light detector, each of the plurality of second photodetectors being the second photodetector, a plurality of first optical couplers may be provided in the light detection device, each of the plurality of first optical couplers being the first optical coupler, a plurality of second optical couplers may be provided in the light detection device, each of the plurality of second optical couplers being the second optical coupler, the plurality of first photodetectors, the plurality of second photodetectors, the plurality of first optical couplers, and the plurality of second optical couplers may be partitioned into a plurality of detection units arranged two-dimensionally, and each of the plurality of detection units may include a part of the first layer, one of the plurality of first optical couplers, one of the plurality of second optical couplers, one of the plurality of first photodetectors, and one of the plurality of second photodetectors.

[Item 18] In the light detection device according to Item 17, a groove may be provided in each region between the plurality of detection units in the first layer.

[Item 19] In the light detection device according to Item 17, a metal film may be provided in each region between the plurality of detection units in the first layer.

[Item 20] In the light detection device according to Item 17, a third optical coupler may be disposed in a region of the first layer between the plurality of detection units, the third optical coupler being covered with a metal film.

[Item 21] In the light detection device according to any one of Items 17 to 20, the first photodetector and the second photodetector may be arranged along a first direction in plan view, and the plurality of detection units may be arranged along at least one direction selected from the group consisting of the first direction and a second direction crossing the first direction in plan view.

[Item 22] In the light detection device according to any one of Items 17 to 20, the plurality of detection units may be arranged in a staggered pattern.

[Item 23] In accordance with Item 23 of the present disclosure, a light detection system includes the light detection device according to any one of Items 1 to 22; and a processing circuit that, in operation, generates information regarding a structure of an object by using a first electric signal output from the first photodetector and a second electric signal output from the second photodetector.

[Item 24] The light detection system according to Item 23 may further include a light source that, in operation, emits light having a wavelength λ in the air, wherein the first photodetector and the second photodetector may detect the light that has been emitted from the light source and has reached from the object.

[Item 25] In the light detection system according to Item 24, the light may contain more transverse-magnetic polarization components than transverse-electric polarization components.

[Item 26] In accordance with Item 26 of the present disclosure, a light detection device includes a light detector including a first photodetector and a second photodetector, a substrate disposed above the first photodetector and the second photodetector and including a first optical propagation path where light from an object propagates in a direction toward the first photodetector and a second optical propagation path where light from the object propagates in a direction toward the second photodetector, and a third optical propagation path that connects a portion of the first optical propagation path with a portion of the second optical propagation path.

[Item 27] In the light detection device according to Item 26, the third optical propagation path may be included in the substrate.

[Item 28] In the light detection device according to Item 27, the first photodetector and the second photodetector may detect light having a wavelength λ in the air, and the substrate may include a photonic crystal structure that blocks the light having the wavelength λ in a region other than the first optical propagation path, the second optical propagation path, and the third optical propagation path.

[Item 29] In the light detection device according to Item 28, the first photodetector and the second photodetector may be arranged along a first direction on a light-receiving surface of the light detector, the substrate may include a plurality of cavities that extend in a second direction that is parallel to the light-receiving surface and is perpendicular to the first direction, and the plurality of cavities may be periodically arranged in a region other than the first optical propagation path, the second optical propagation path, and the third optical propagation path.

[Item 30] In the light detection device according to any one of Items 27 to 29, the third optical propagation path may include a bend between the first optical propagation path and the second optical propagation path, and the bend may be located farther from the light-receiving surface of the light detector than a joint of the third optical propagation path and the first optical propagation path and a joint of the third optical propagation path and the second optical propagation path.

[Item 31] In the light detection device according to any one of Items 27 to 30, the light detector may further include a third photodetector between the first photodetector and the second photodetector, and the substrate may include a fourth optical propagation path where light propagates from a middle or halfway portion of the third optical propagation path toward the third photodetector.

[Item 32] In the light detection device according to Item 31, at least part of light that propagates in the first optical propagation path may be incident on the first photodetector, at least part of light that propagates in the second optical propagation path may be incident on the second photodetector, and at least part of light that propagates in the third optical propagation path and the fourth optical propagation path may be incident on the third photodetector.

[Item 33] The light detection device according to any one of Items 26 to 32 may further include a plurality of detection units that are two-dimensionally arranged, wherein each of the plurality of detection units may include the first optical propagation path, the second optical propagation path, the third optical propagation path, the first photodetector, and the second photodetector.

In the present disclosure, all or a part of any of a circuit, a unit, a device, a member, a section; or all or a part of any of functional blocks in the block diagrams may be implemented as one or more electronic circuits including, but not limited to, a semiconductor device, a semiconductor integrated circuit (IC) or a large scale integration (LSI). The LSI or IC may be integrated into one chip, or may be a combination of a plurality of chips. For example, functional blocks other than a memory may be integrated into one chip. The name used here is LSI or IC, but it may also be called system LSI, very large scale integration (VLSI), or ultra large scale integration (ULSI) depending on the degree of integration. A field programmable gate array (FPGA) that can be programmed after manufacturing the LSI or a reconfigurable logic device that allows reconfiguration of the connection or setup of circuit cells inside the LSI can be used for the same purpose.

Further, all or a part of the functions or operations of the circuit, unit, device, member, or section can be implemented by software-based processing. In such a case, the software is stored on one or more non-transitory recording media such as a read-only memory (ROM), an optical disc, or a hard disk drive, and when the software is executed by a processor, the software causes the processor together with peripheral devices to execute the functions specified in the software. A system or apparatus may include such one or more non-transitory recording media on which the software is stored, a processor, and necessary hardware devices such as an interface.

Interferometers of the related art require a troublesome operation for measurement. In addition, phase-contrast microscopes of the related art have a difficulty in quantitatively measuring a phase difference.

One non-limiting and exemplary embodiment provides a photo-detection technique that enables quantitative determination of information regarding an object without requiring a troublesome operation.

Embodiments of the present disclosure will be described below with reference to the accompanying drawings. Each of the embodiments described below provides general or specific examples. The values, shapes, materials, components, arrangement and connection of the components, steps, the order of steps, etc., described in the following embodiments are merely illustrative and are not intended to limit the present disclosure. Various configurations described herein can be combined with each other as long as any contradiction does not arise. In addition, among the components in the following embodiments, a component not recited in any of the independent claims indicating the most generic concept is described as an optional component. In the following description, the same reference sign is assigned to components having substantially the same or similar function, and thus a repeated description is sometimes omitted.

First Embodiment

Photodetector Device

A light detection device according to a first embodiment will be described first.

Figure 1B:
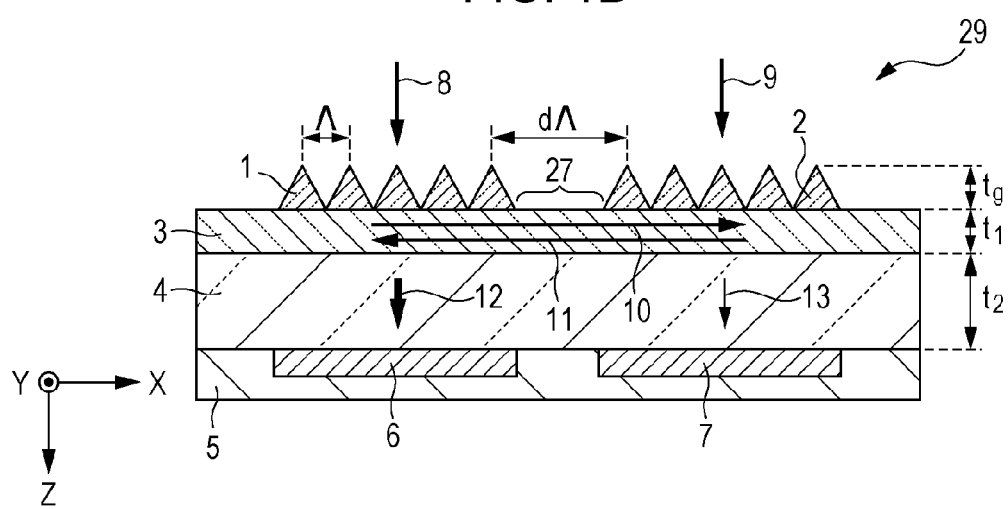
FIG. 1B is a cross-sectional view taken along line IB-IB illustrated in FIG. 1A.

FIG. 1A is a plan view schematically illustrating the configuration of a light detection device 29 according to the first embodiment of the present disclosure. FIG. 1A illustrates the structure of the light detection device 29 when viewed from the light incident side. FIG. 1B is a cross-sectional view taken along line IB-IB illustrated in FIG. 1A.

In the following description, the XYZ coordinate system that expresses X, Y, and Z directions that are orthogonal to one another is used. In the first embodiment, a plane that is parallel to a light-receiving surface (also referred to as an "imaging surface") of a light detector 5 of the light detection device 29 is referred to as the X-Y plane, and a direction perpendicular to the X-Y plane is referred to as the Z direction. Note that the illustrated coordinate system is set for convenience of explanation and does not restrict arrangement and orientation of the light detection device according to the embodiments of the present disclosure when the light detection device is actually used. In addition, the illustrated shape and dimensions of the entirety or part of the structure do not restrict the actual shape and dimensions.

The light detection device 29 according to the first embodiment includes the light detector 5, a first layer 3, a second layer 4, a first optical coupler 1, and a second optical coupler 2. The light detector 5 includes a first photodetector 6 and a second photodetector 7. The first layer 3 is light-transmissive and covers the first photodetector 6 and the second photodetector 7. The second layer 4 is light-transmissive and is located between the light detector 5 and the first layer 3. The first optical coupler 1 and the second optical coupler 2 are disposed on a surface of the first layer 3. The second layer 4 is in contact with the first layer 3 and has a lower refractive index than the first layer 3. The first optical coupler 1 opposes the first photodetector 6, and the second optical coupler 2 opposes the second photodetector 7. The first optical coupler 1 is a light-transmissive member that couples part of incident light 8 to an optical waveguide in the first layer 3. The second optical coupler 2 is a light-transmissive member that couples part of incident light 9 to an optical waveguide in the first layer 3. Herein, the expression "something is light-transmissive" means that something has a property of allowing at least part of incident light to pass therethrough.

The first photodetector 6 and the second photodetector 7 are arranged along a first direction (X direction in the illustrated example). The first optical coupler 1 allows part of the incident light 8 to propagate through the first layer 3 at least in the first direction (X direction), that is, in a direction toward the second optical coupler 2 (guided light 10). The second optical coupler 2 allows part of the incident light 9 to propagate through the first layer 3 at least in a direction (−X direction) opposite to the first direction, that is, in a direction toward the first optical coupler 1 (guided light 11). In this way, interference between the guided light 10 and the guided light 11 occurs in the first layer 3. Part of the incident light 8 that has been incident on the first optical coupler 1 passes through the first layer 3 and the second layer 4 and is incident on the first photodetector 6. Part of the incident light 9 that has been incident on the second optical coupler 2 passes through the first layer 3 and the second layer 4 and is incident on the second photodetector 7.

In the following description, out of light that has reached from an object, light that is incident on the first optical coupler 1 is sometimes referred to as "first incident light 8", and light that is incident on the second optical coupler 2 is sometimes referred to as "second incident light 9". In addition, light that passes through a region of the second layer 4 above the first photodetector 6 is sometimes referred to as "first transmitted light 12", and light that passes through a region above the second photodetector 7 is sometimes referred to as "second transmitted light 13". The first photodetector 6 receives the first transmitted light 12 and outputs a first electric signal based on an amount of received light. The second photodetector 7 receives the second transmitted light 13 and outputs a second electric signal based on an amount of received light. The first and second electric signals are processed by a processing circuit (not illustrated), and information representing a phase difference between the first incident light 8 and the second incident light 9 is generated. The processing circuit is further capable of generating and outputting information regarding the structure of the object (e.g., the surface structure, the refractive index distribution, etc.) on the basis of this phase difference information.

As illustrated in FIG. 1B, the light detection device 29 according to the first embodiment includes the light detector 5, the second layer 4 disposed on the light detector 5, and the first layer 3 disposed on the second layer 4. The first optical coupler 1 and the second optical coupler 2 are disposed on the first layer 3. With such an integration configuration, the light detection device 29 that has a stable structure and is robust to disturbance, such as vibration, is implemented. FIG. 1B omits illustration of wirings or the like with which the electric signals from the light detector 5 are output.

Each of the first optical coupler 1 and the second optical coupler 2 in the first embodiment is a grating (diffraction grating). In the following description, the first optical coupler 1 is sometimes referred to as a "first grating 1", and the second optical coupler 2 is sometimes referred to as a "second grating 2". Each of the first grating 1 and the second grating 2 according to the first embodiment has a structure in which a plurality of light-transmissive members each having a protrusion extending in the Y direction (second direction) are arranged periodically along the X direction (first direction). Two adjacent light-transmissive members define a groove extending in the Y direction therebetween. In the first embodiment, the plurality of light-transmissive members are arranged at a period $\Lambda$ that is shorter than a wavelength $\lambda$ of the first incident light 8 and the second incident light 9 in the air ($\Lambda<\lambda$). In the first embodiment, the light-transmissive members have a triangular cross-section. The plurality of light-transmissive members that constitute the first grating 1 and the second grating 2 can have various structures as described below. The first grating 1, the second grating 2, and the first layer 3 may be a single structure composed of the same material.

The period $\Lambda$ and the wavelength $\lambda$ can be set, for example, such that $\Lambda=0.45$ μm and $\lambda=0.85$ μm although they can be set differently depending on the object to be observed. As a result of setting the period $\Lambda$ to be smaller than the wavelength $\lambda$, only transmitted light and reflected light which are 0-th order diffracted light occur in the air when the first incident light 8 and the second incident light 9 are respectively incident on the first optical coupler 1 and the second optical coupler 2. Since diffracted light of the ±1st order or higher is not emitted to the outside, the light utilization efficiency can be improved and stray light can be reduced.

The first layer 3 is designed to function as an optical waveguide (having a thickness $t_1$) for incident light of $\lambda=0.85$ μm. The second layer 4 is designed to function as a buffer layer (having a thickness $t_2$). The thickness $t_1$ of the first layer 3 (optical waveguide) is designed so that waveguide modes can exist. The first layer 3 (optical waveguide) has a refractive index $n_1$ that is larger than a refractive index $n_2$ of the second layer 4 ($n_1>n_2$).

In the light detection device 29 according to the first embodiment, the first layer 3, the first optical coupler 1, and the second optical coupler 2 can be composed of tantalum pentoxide $Ta_2O_5$ ($n_1=2.11$), for example. The second layer 4 can be composed of silicon dioxide $SiO_2$ ($n_2=1.45$). The thickness $t_2$ of the second layer 4 is 0.7 μm, for example. In such a case, known waveguide-mode characteristic equations indicate that there are waveguide modes for transverse electric (TE) and transverse magnetic (TM) modes if $t_1 \geq 0.13$ μm. Accordingly, in this case, the thickness $t_1$ of the first layer 3 can be set to a thickness that is sufficiently larger than 0.13 μm (for example, $t_1=0.3$ μm).

Various materials other than $Ta_2O_5$ can be used for the first layer 3, the first optical coupler 1, and the second optical coupler 2. Likewise, various materials other than $SiO_2$ can be used for the second layer 4. Materials that are transparent for incident light having a wavelength in use may be used. For example, inorganic materials, such as one or a plurality of oxides selected from $ZrSiO_4$, $(ZrO_2)_{25}(SiO_2)_{25}(Cr_2O_3)_{50}$, SiCr, $TiO_2$, $ZrO_2$, $HfO_2$, ZnO, $Nb_2O_5$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$, for example, can also be used as the materials of the first layer 3, the first optical coupler 1, the second optical coupler 2, and the second layer 4. In addition, one or a plurality of nitrides selected from C—N, Ti—N, Zr—N, Nb—N, Ta—N, Si—N, Ge—N, Cr—N, Al—N, Ge—Si—N, and Ge—Cr—N, for example, can also be used as the materials of the first layer 3, the first optical coupler 1, the second optical coupler 2, and the second layer 4. Further, a sulfide such as ZnS, a carbide such as SiC, or a fluoride such as $LaF_3$, $CeF_3$, or $MgF_2$ can also be used as materials of the first layer 3, the first optical coupler 1, the second optical coupler 2, and the second layer 4. In addition, the first layer 3, the first optical coupler 1, the second optical coupler 2, and the second layer 4 may be formed by using a mixture of a plurality of materials selected from the above materials.

Further, the materials of the first layer 3, the first optical coupler 1, the second optical coupler 2, and the second layer 4 may be organic materials such as resins, for example, a polycarbonate resin, polymethyl methacrylate (PMMA), a norbornene resin (sold under the trademark ARTON by JSR Corporation, for example), or a cyclo-olefin resin (sold under the trademark "ZEONEX" by ZEON CORPORATION, for example). Materials that satisfy a relationship between the refractive indices of $n_1>n_2$ may be selected for the first layer 3 and the second layer 4.

Although the first layer 3, the first optical coupler 1, and the second optical coupler 2 are composed of the same material in the first embodiment, they may be composed of different materials. If a protection layer is formed on the surface of the light detector 5 by using a material having a lower refractive index than the first layer 3, by using typically $SiO_2$, the protection layer can serve as the second layer 4. In this case, a layer different from the protection layer need not be provided as the second layer 4. If the protection layer has a thickness of 0.5 μm or more, the protection layer can reduce the propagation loss of the guided light sufficiently. In addition, since it is only required that the second layer 4 have a lower refractive index than the first layer 3, air can be used as the second layer 4 theoretically. However, an integrated structure of the first embodiment can improve the structural stability.

If incident light is linearly polarized light (TE-polarized light) whose electric field oscillates in the Y direction (that is, if the electric-field direction of incident light is parallel to the direction in which the grooves of the gratings extend), guided light of the TE mode is excited in the first layer 3. On the other hand, if incident light is linearly polarized light (TM-polarized light) whose electric field oscillates in the X direction (that is, the magnetic-field direction of the light is parallel to the direction in which the grooves of the gratings extend), guided light of the TM mode is excited in the first layer 3. Accordingly, the mode of the guided light can be changed by changing the polarization direction of incident light.

In the first embodiment, the cross-section of the first grating 1 and the second grating 2 that is parallel to the X-Z plane is an isosceles triangle shape. A depth $t_g$ of the grooves of the first optical coupler 1 and the second optical coupler 2 can be set such that $t_g=0.3$ μm, for example. The shape and dimensions of the first optical coupler 1 and the second optical coupler 2 are not limited to this example, and the first optical coupler 1 and the second optical coupler 2 may have different shape and dimensions.

When the first incident light 8 and the second incident light 9 are respectively incident on the first optical coupler 1 and the second optical coupler 2, guided light is excited in the first layer 3 if Equation (1) below is satisfied.

$$\sin\theta = N - m\lambda/\Lambda \qquad (1)$$

In Equation (1), N denotes the effective refractive index in the optical waveguide (the first layer 3), θ denotes the incident angle of light with respect to the Z direction, and m denotes the diffraction order. If the period Λ of the light-transmissive members of the first and second gratings 1 and 2 is set to a value that satisfies Equation (1), part of the first incident light 8 and the second incident light 9 are coupled to the waveguide in the first layer 3 and guided light is excited. For example, when the first-order diffracted light (m=1) that couples relatively easily is incident vertically (θ=0), Equation (1) is modified to Equation (2) below.

$$\Lambda = \lambda/N \qquad (2)$$

For the structure described above, $\Lambda \approx 0.45$ μm is calculated from waveguide-mode characteristic equations.

Note that the waveguide-mode characteristic equations indicate that the effective reflective index N changes as the thickness $t_1$ of the first layer 3 changes. When the waveguide modes exist, N satisfies Inequality (3) below.

$$n_2 < N < n_1 \qquad (3)$$

Inequality (3) can be modified into Inequality (4) by using Equation (1).

$$m\lambda/(n_1 - \sin\theta) < \Lambda < m\lambda/(n_2 - \sin\theta) \qquad (4)$$

When θ=0 and m=1 hold, Λ satisfies Inequality (5) below.

$$\lambda/n_1 < \Lambda < \lambda/n_2 \qquad (5)$$

Guided light excited by each of the first incident light 8 and the second incident light 9 in the optical waveguide in the first layer 3 propagates both in the +X direction and the −X direction. Among these guided light, FIG. 1B illustrates the guided light 10 that is excited by the first incident light 8 and propagates in the +X direction and the guided light 11 that is excited by the second incident light 9 and propagates in the −X direction. Since the guided light 10 and the guided light 11 travel in the opposite directions, they interfere within the first layer 3.

Although part of the first incident light 8 and part of the second incident light 9 become guided light in this manner, most of the first incident light 8 and the second incident light 9 become transmitted light 12 and transmitted light 13 that pass through the first layer 3 and enter the second layer 4, respectively. The transmitted light 12 and the transmitted light 13 are detected by the first photodetector 6 and the second photodetector 7, respectively. Each of the first and second photodetectors 6 and 7 includes, for example, a photodiode and outputs an electric signal (photoelectric conversion signal) based on an amount of received light.

The inventors have found that the structure (for example, a change in thickness or a refractive index distribution) of an object can be quantitatively determined by irradiating the object with coherent light, such as laser beams, and detecting reflected light or transmitted light from the object by using the light detection device 29 according to the first embodiment. The inventors have also found that, when two adjacent light beams of light from the object are set as the first incident light 8 and the second incident light 9, amounts (powers) of the transmitted light 12 and the transmitted light 13 change depending on the degree of interface between the guided light 10 and the guided light 11. That is, a coherence difference (or a phase difference) between the first incident light 8 and the second incident light 9 is detectable by detecting the amounts of the transmitted light 12 and the transmitted light 13 by using the first photodetector 6 and the second photodetector 7, respectively.

Phase information of the transmitted light or the reflected light changes depending on the structure (for example, a change in thickness or a refractive index distribution) of the object. Accordingly, a change in thickness or a refractive index distribution of the object can be quantitatively determined by detecting the coherence difference (or the phase difference) between the first incident light 8 and the second incident light 9.

In the configuration illustrated in FIG. 1A, a distance between the peaks or centers of two most adjacent protrusions of the first optical coupler (first grating) 1 and the second optical coupler (second grating) 2 is larger than the period Λ. That is, the first grating 1 and the second grating 2 have a flat portion (referred to as a "spacing region 27") therebetween, and the length of the spacing region 27 in the X direction is larger than zero.

It is assumed that the distance between the most adjacent peaks of the first grating 1 and the second grating 2 is equal to a value dΛ that is a product of the period Λ by a constant d. This constant d is referred to as a "distance constant d". In the case of d=1, the distance between the most adjacent peaks is equal to Λ. Accordingly, the first grating 1 and the second grating 2 are formed closely, and there is no spacing region 27 therebetween. On the other hand, in the case of d>1 as in the first embodiment, the spacing region 27 exists between the first grating 1 and the second grating 2.

Figure 2A:
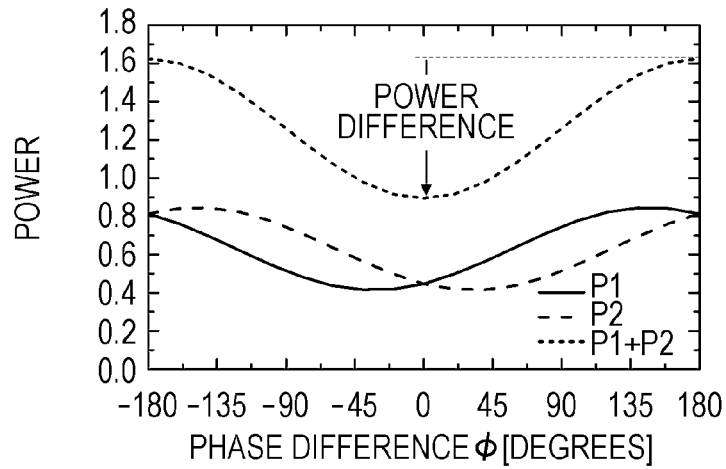
FIG. 2A is a graph showing a relationship among a phase difference $\phi$ between two incident rays, powers P1 and P2 of transmitted rays, and (P1+P2) in the case where the distance constant $d=1$ in the light detection device according to the first embodiment.
Figure 2B:
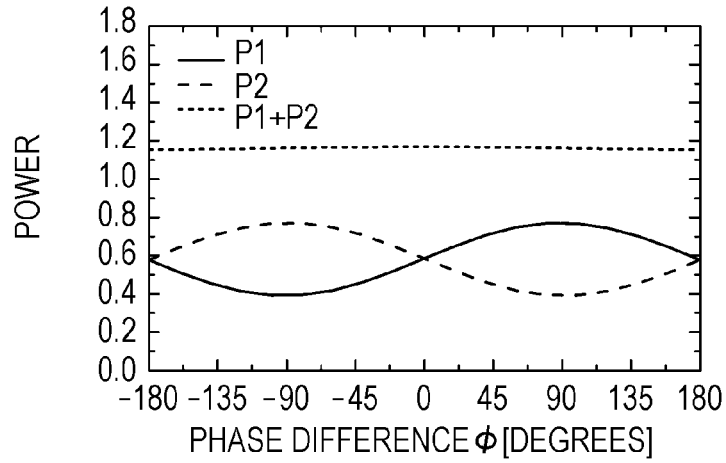
FIG. 2B is a graph showing a relationship among a phase difference $\phi$ between the two incident rays, powers P1 and P2 of the transmitted rays, and (P1+P2) in the case where the distance constant $d=1.16$ in the light detection device according to the first embodiment.
Figure 2C:
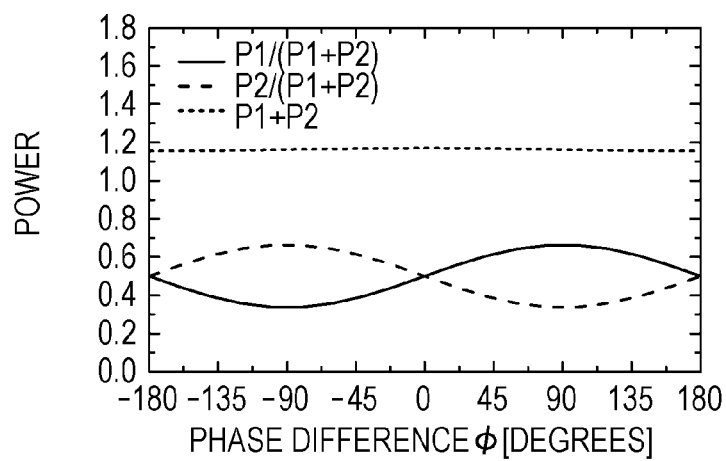
FIG. 2C is a graph showing a relationship among a phase difference $\phi$ between the two incident rays, normalized powers P1/(P1+P2) and P2/(P1+P2) of the transmitted rays, and (P1+P2) in the case where the distance constant $d=1.16$ in the light detection device according to the first embodiment.

FIG. 2A is a graph showing a relationship among a phase difference ϕ between the first incident light 8 and the second incident light 9, powers P1 and P2 of the transmitted light 12 and the transmitted light 13, and the sum (P1+P2) of the powers in the case where the distance constant d=1 in the light detection device 29. FIG. 2B is a graph showing a relationship among a phase difference ϕ between the first incident light 8 and the second incident light 9, powers P1 and P2 of the transmitted light 12 and the transmitted light 13, and the sum (P1+P2) of the powers in the case where the distance constant d=1.16 in the light detection device 29. FIG. 2C is a graph showing a relationship among a phase difference ϕ between the first incident light 8 and the second incident light 9, normalized powers P1/(P1+P2) and P2/(P1+P2) of the transmitted light 12 and the transmitted light 13, and the sum (P1+P2) of the powers in the case where the distance constant d=1.16 in the light detection device 29. FIGS. 2A to 2C illustrate exemplary results of electromagnetic field analysis performed by using Finite-Difference time-domain method (FDTD method) for TM-polarized light whose electric-field direction is the X direction.

In this analysis, highly coherent laser beams having the same wavelength λ and the same power (normalized power of 1) are used as the first incident light 8 and the second incident light 9. The phase difference ϕ [degrees] is a phase difference of the second incident light 9 with respect to the phase of the first incident light 8. As illustrated using a solid line and dash line in FIG. 2A, the power P1 of the first transmitted light 12 and the power P2 of the second transmitted light 13 change depending on the phase difference ϕ between the first incident light 8 and the second incident light 9. The power P1 becomes the largest at around φ=140° and becomes the smallest at around φ=−40°. The power P2 becomes the largest at around φ=−140° and becomes the smallest at around φ=40°. Accordingly, the phase difference φ can be uniquely quantified in a range from −180° to 180° from the powers P1 and P2 on the basis of these curves. That is, the phase difference φ between the first incident light 8 and the second incident light 9 can be uniquely detected by detecting the powers P1 and P2 using the first photodetector 6 and the second photodetector 7, respectively.

FIGS. 2A to 2C illustrate results of the case where guided light of the TM mode is excited by using the first incident light 8 and the second incident light 9, each of which is TM-polarized light. When the first grating 1 and the second grating 2, which are fine gratings, are used as in the first embodiment, polarization dependency occurs and the largest value of |P1−P2| differs between the case where guided light of the TE mode is excited and the case where guided light of the TM mode is excited. In the first embodiment, the largest value of |P1−P2| of the case where guided light of the TM mode is excited is about 4.6 times as large as that of the case where guided light of the TE mode is excited.

Accordingly, in the light detection device 29 according to the first embodiment, the signal-to-noise (SN) ratio can be increased in the case of using linearly polarized light (TM-polarized light in the first embodiment) that makes the largest value of |P1−P2| larger, compared with the case of using non-polarized incident light. Thus, the detection sensitivity can be increased by using the first incident light 8 and the second incident light 9 (linearly polarized light or elliptically polarized light) mainly containing TM-polarized light (that is, containing more TM-polarization components than TE-polarization components). The light detection device 29 may include, as a configuration for implementing the higher detection sensitivity, a polarization element (for example, linear polarizer or elliptical polarizer) that allows more TM-polarized light to be incident on the first grating 1 and the second grating 2 than TE-polarized light. Such a polarization element is disposed between the object and the first and second gratings 1 and 2 or between the light source and the object. Alternatively, for example, a semiconductor laser light source that emits linearly polarized light may be provided after rotation adjustment is performed so that light containing more TM-polarized light components than TE-polarized light components is emitted.

The inventors have considered that the actual powers of the first incident light 8 and the second incident light 9 could be calculated from the signal (P1+P2) obtained from the light detector 5. However, the inventors have learned that the signal (P1+P2) changes in accordance with the phase difference φ as illustrated by a dot line in FIG. 2A. More specifically, the signal (P1+P2) shows the smallest or largest value at φ=0° and 180°. Here, the absolute value of a value obtained by subtracting the power (P1+P2) at φ=180° or −180° from the power (P1+P2) at φ=0° is defined as a "power difference". It is convenient when the actual powers of the first incident light 8 and the second incident light 9 are calculated if the power difference is constant.

The inventors have found that the signal (P1+P2) is barely dependent on the phase difference φ (that is, is substantially constant) if the distance constant d is set to a particular value (d>1), for example, such that d=1.16 as illustrated using a dot line in FIG. 2B. It is considered that a period at which the guided light 10 and the guided light 11 interfere (typically λ/N≈Λ from Equation (2)) is disturbed by the spacing region 27 located at the center. The output characteristics of the powers P1 and P2 can be controlled by changing the distance constant d to adjust the disturbance degree of the period.

As illustrated using the solid line and the dash line in FIG. 2B, the power P1 of the first transmitted light 12 and the power P2 of the second transmitted light 13 change in accordance with the phase difference φ. In the case of d=1.16, the largest value of |P1−P2| is larger than that of the case of d=0. The power P1 becomes the largest at around φ=85° and becomes the smallest at around φ=−95°. The power P2 becomes the largest at around φ=−85° and becomes the smallest at around φ=95°. Accordingly, the phase difference φ can be quantified uniquely in a range from −180° to 180° from the values of the powers P1 and P2 on the basis of these curves.

It can be assumed that the powers of the first incident light 8 and the second incident light 9 are proportional to the signal (P1+P2) independently from the phase difference φ in the case of d=1.16. When the powers of the first incident light 8 and the second incident light 9 are normalized to 1, the signal (P1+P2) is equal to 1.16 as illustrated in FIG. 2B. Accordingly, the values of the powers of the first incident light 8 and the second incident light 9 can be calculated through a calculation of (P1+P2)/1.16 without using the phase difference φ.

Values P1/(P1+P2) and P2/(P1+P2), which are obtained by dividing the powers P1 and P2 by (P1+P2), may be used as normalized powers as illustrated in FIG. 2C. In this case, P1/(P1+P2)=P2/(P1+P2)=0.5 is maintained at φ=0° and ±180° even if (P1+P2) changes. Accordingly, this configuration is convenient for quantification based on the measured values.

The inventors have found that the value of d at which (P1+P2) is barely dependent on the phase difference φ periodically exists other than d=1.16. The wavelength of guided light in the first layer 3 (optical waveguide) is denoted by λ/N. In the case where guided light is excited in the conditions of θ=0 (vertically incident) and m=1, λ/N=ζ is determined according to Equation (2). Thus, the wavelength of the guided light is equal to the period Λ. Accordingly, the period of d can be approximated to λ/(NΛ)≈1 for light that is almost vertically incident.

Figure 3:
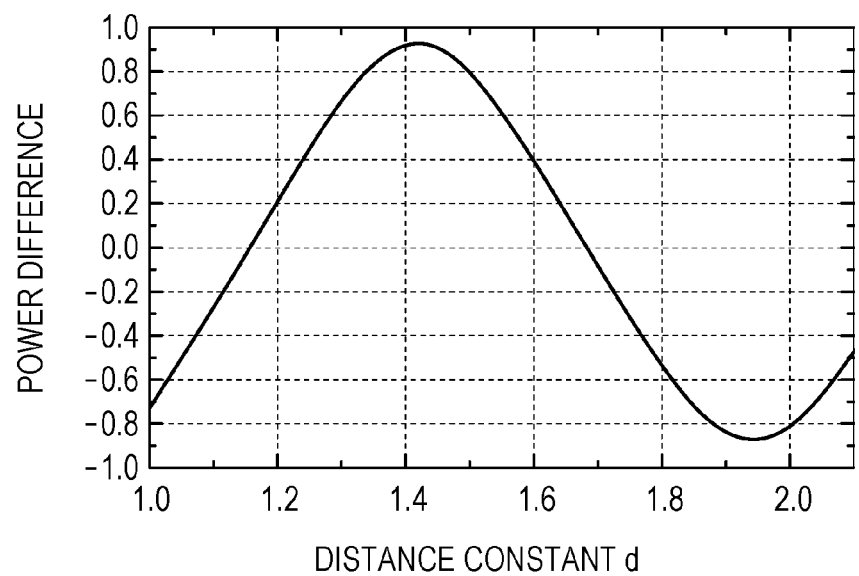
FIG. 3 is a graph showing a relationship between the distance constant d and the power difference in the light detection device according to the first embodiment.

FIG. 3 is a graph showing a relationship between the distance constant d and the power difference in the light detection device 29 according to the first embodiment.

An optimum value d making the power difference zero has been determined to be $$d = 1.16 + i \tag{6}$$

or $$d = 1.68 + i \tag{7},$$

where i is an integer of 0 or larger. For example, if i=10, d=11.16 or d=11.68. At that time, a space between the peaks of the most adjacent protrusions of the first optical coupler 1 and the second optical coupler 2 is dΛ=5.02 µm or dΛ=5.26 µm.

The condition of d with which the power difference is within a range from −0.5 to 0.5 is $$1.05 + i \leq d \leq 1.26 + i \tag{8}$$

or $$1.58 + i \leq d \leq 1.79 + i \tag{9}.$$

The condition of d with which the power difference is within a range from −0.2 to 0.2 is $$1.12+i \leq d \leq 1.20+i \quad (10)$$

or $$1.64+i \leq d \leq 1.72+i \quad (11).$$

The condition of d with which the power difference is within a range from −0.1 to 0.1 is $$1.14+i \leq d \leq 1.18+i \quad (12)$$

or $$1.66+i \leq d \leq 1.70+i \quad (13).$$

In the case of $\theta \neq 0$, the accuracy increases if N is calculated from the waveguide-mode characteristic equations and $i\lambda/(N\Lambda)$ is used instead of i.

In the configuration described above, the first optical coupler 1 and the second optical coupler 2 are gratings in which a plurality of light-transmissive members are arranged at an equal period $\Lambda$. However, the first optical coupler 1 and the second optical coupler 2 are not limited to such gratings, and each of the first grating 1 and the second grating 2 may have a plurality of portions where a plurality of light-transmissive members are arranged at different periods. Equation (1) indicates that the preferable period $\Lambda$ is dependent on the incident angle $\theta$ and the wavelength $\lambda$ of light. The use of gratings having a plurality of periods can increase the ranges of the incident angle $\theta$ and the wavelength $\lambda$.

In the case where the light detection device 29 is designed to have conditions suitable for vertical incidence of light ($\theta$=0), a change in the amount of transmitted light, which is the largest value of |P1−P2| in response to a change in the phase difference $\phi$, decreases if the incident angle of the light changes. The full width at half maximum is, for example, approximately ±4° which is relatively narrow. If the first grating 1 and the second grating 2 have a plurality of periods, this angle range can be extended. Preferable values of the period $\Lambda$ at $\theta$=±5° are 0.43 μm and 0.47 μm. Thus, if the first grating 1 and the second grating 2 are configured as chirped gratings in which the period $\Lambda$ gradually changes from 0.43 μm to 0.47 μm, for example, the light detection device 29 having good oblique incidence characteristics can be implemented.

Each of the first grating 1 and the second grating 2 may include three or more portions having different periods of, for example, $\Lambda$=0.43 μm, 0.45 μm, and 0.47 μm.

The wavelength characteristics can also be extended based on the similar idea. In the case of a multi-wavelength configuration in which the wavelength of incident light is wide, the change in the amount of transmitted light, which is the largest value of |P1−P2| in response to a change in the phase difference, decreases and the full width at half maximum can be, for example, approximately ±10 nm. Preferable values for the single wavelength $\lambda$=0.84 and 0.86 μm (at $\theta$=0) are $\Lambda$=0.445 μm and 0.455 μm, respectively. Thus, if the first grating 1 and the second grating 2 are configured as chirped gratings in which the period $\Lambda$ gradually changes from 0.445 μm to 0.455 μm, for example, the wavelength range can be extended.

Each of the first grating 1 and the second grating 2 may include three or more portions having different periods of, for example, $\Lambda$=0.445 μm, 0.450 μm, and 0.455 μm. With such a configuration, similar benefits can be expected.

An example of a method for fabricating the light detection device 29 according to the first embodiment will be described next.

Figure 4A:
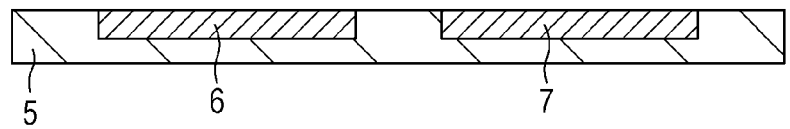
FIG. 4A is a first diagram illustrating a process of fabricating the light detection device according to the first embodiment.
Figure 4B:
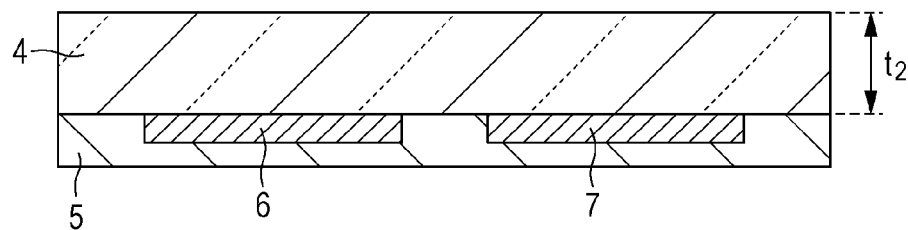
FIG. 4B is a second diagram illustrating the process of fabricating the light detection device according to the first embodiment.
Figure 4C:
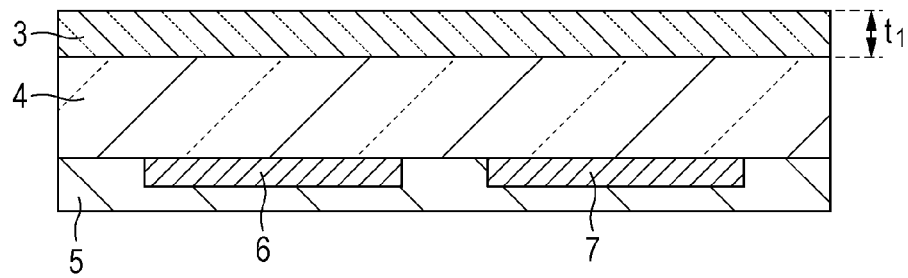
FIG. 4C is a third diagram illustrating the process of fabricating the light detection device according to the first embodiment.
Figure 4D:
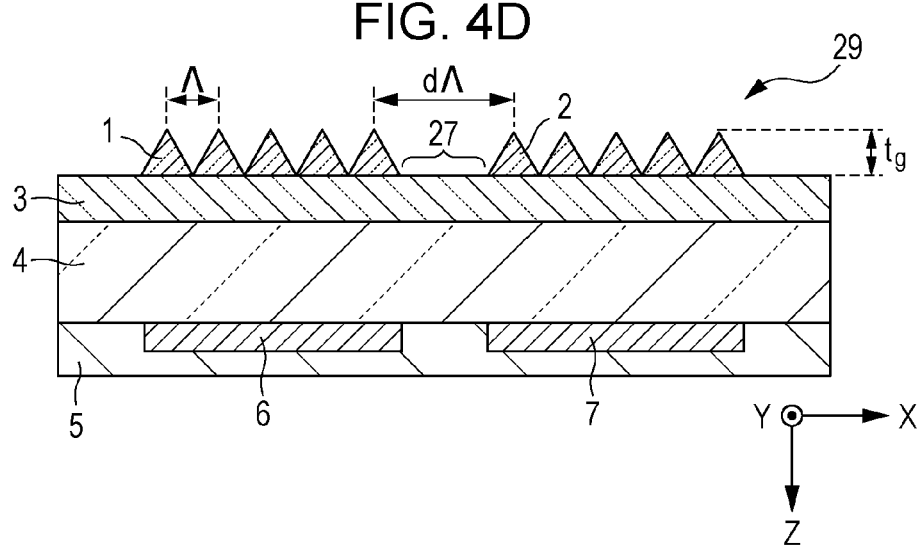
FIG. 4D is a fourth diagram illustrating the process of fabricating the light detection device according to the first embodiment.

FIGS. 4A to 4D are cross-sectional views illustrating an example of a process of fabricating the light detection device 29 according to the first embodiment. First, the light detector 5 including the first photodetector 6 and the second photodetector 7 is prepared as illustrated in FIG. 4A. Then, the second layer 4 having the thickness of $t_2$ is deposited on the light-receiving surface (imaging surface) of the light detector 5 as illustrated in FIG. 4B. Then, the first layer 3 having the thickness of $t_1$ is deposited on the second layer 4 as illustrated in FIG. 4C. For example, spattering or vacuum vapor deposition can be used during a deposition process of $Ta_2O_5$ and $SiO_2$ films. In the case of forming the first layer 3 and the second layer 4 by using a resin material, a coating process can be used. Since the coating process can be performed at low temperature, there is no need to worry about thermal damage in the case where an organic photoelectric film is used as well as in the case where Si is used in the light detector 5. Then, the first optical coupler 1 and the second optical coupler 2 are formed simultaneously on the first layer 3 as illustrated in FIG. 4D. During this process, a combination of photolithography and the etching process (known so-called binary optics fabrication method) can be used. In this way, for example, gratings having a triangular cross-section can be created. Other than the binary optics fabrication method, for example, nanoimprinting or 3D printing can also be used. Nanoimprinting, in particular, can reduce the cost.

Photodetector System

The light detection device 29 according to the first embodiment is capable of obtaining information regarding the structure of an object (e.g., the surface structure, the refractive index distribution, etc.) when it is used in combination with a light source and an processing circuit. An example of such a light detection system will be described below.

Figure 5A:
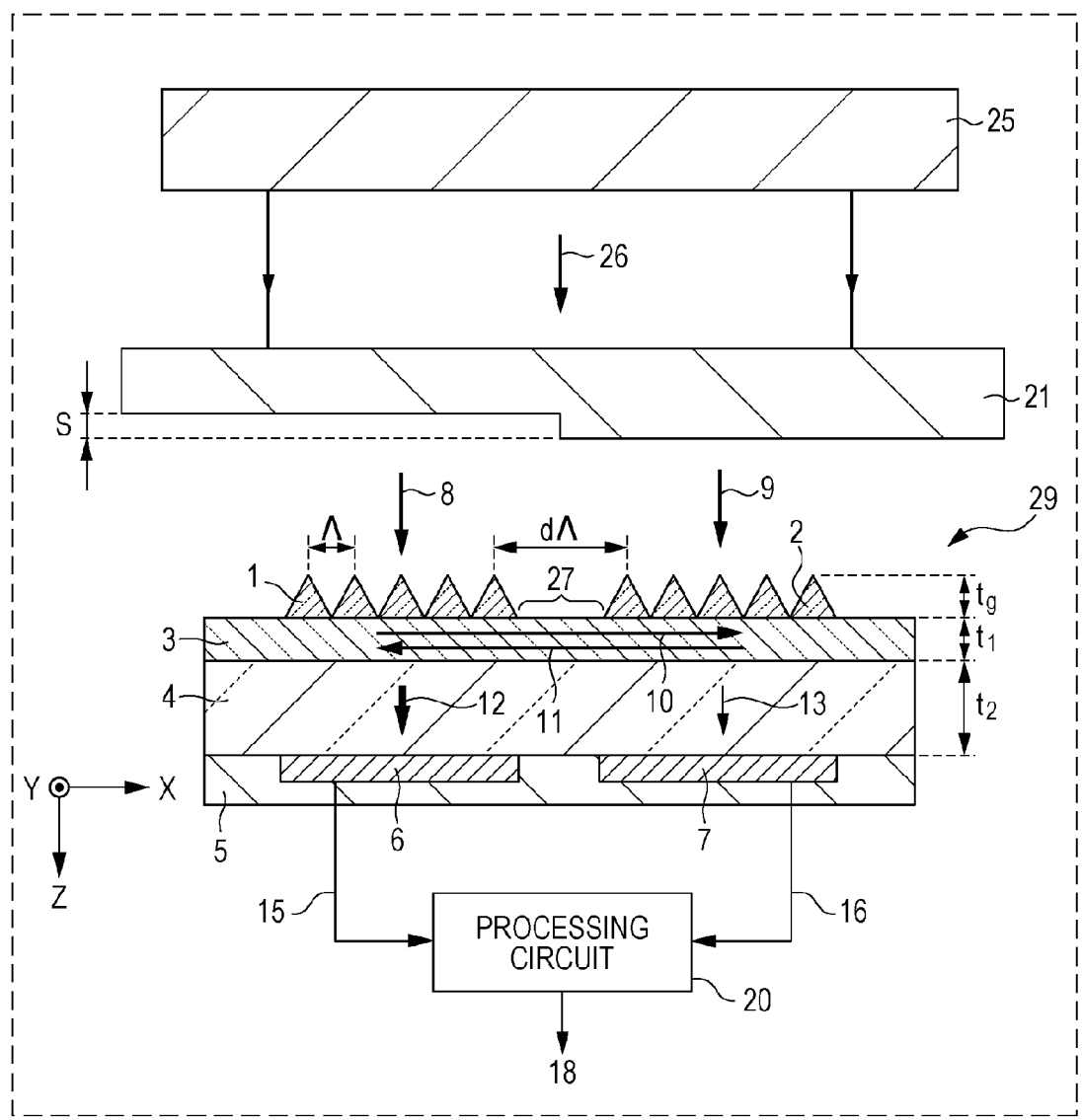
FIG. 5A is a diagram schematically illustrating an example of the configuration of a light detection system in which the light detection device according to the first embodiment is used.

FIG. 5A is a diagram schematically illustrating an example of the configuration of the light detection system in which the light detection device 29 according to the first embodiment is used. This light detection system includes a light source 25 that emits light having a wavelength $\lambda$ in the air and an processing circuit 20 that generates and outputs information (electric signal 18) regarding the structure of an object 21 on the basis of a first electric signal output from the first photodetector 6 and a second electric signal output from the second photodetector 7. The first photodetector 6 and the second photodetector 6 detect the light having the wavelength $\lambda$ that has been emitted from the light source 25 and is incoming from the object 21. This light detection system detects transmitted light from the object 21; however, the light detection system may be configured to detect reflected light. The object 21 can be, but not limited to, a biological tissue or a phase-stepping forgery prevention mark on documents, for example.

The processing circuit 20 used in the first embodiment may be an integrated circuit, for example, a digital signal processor (DSP), an application specific integrated circuit (ASIC), or a field programmable gate array (FPGA). The processing circuit 20 executes a computer program stored, for example, in a memory to perform computation to be described later and to generate information regarding the structure of the object 21.

The light detection system irradiates the object 21 with emitted light 26 which is monochromatic coherent light, such as laser beams, from the light source 25 and detects, by using the light detection device 29, light that has passed through the object 21 (including the first incident light 8 and the second incident light 9 that are adjacent to each other).

In the example illustrated in FIG. 5A, the first incident light 8 is light that has passed through a relatively thin portion of the object 21, whereas the second incident light 9 is light that has passed through a relatively thick portion of the object 21. Now, let S denote the difference in thickness between the relatively thin portion and the relatively thick portion and let $n_0$ denote a refractive index of the object 21. Then, the phase difference φ between the first incident light 8 and the second incident light 9 is denoted as Equation (14) below.

$$\phi = 2\pi(n_0 - 1)S/\lambda \quad (14)$$

That is, the phase of the first incident light 9 is delayed with respect to the phase of the first incident light 8 by $2\pi(n_0-1)S/\lambda$.

The first photodetector 6 outputs an electric signal 15 having a signal value that is proportional to the power P1 of the first transmitted light 12. The second photodetector 7 outputs an electric signal 16 having a signal value that is proportional to the power P2 of the second transmitted light 13. The processing circuit 20 receives the electric signals 15 and 16 and determines the power of the first incident light 8, the power of the second incident light 9, and the phase difference φ. The phase difference φ can be determined by using the method described with reference to FIGS. 2A to 2C. The processing circuit 20 outputs information representing the phase difference φ as the information (electric signal 18) regarding the structure of the object 21. The value of the change (step) S in thickness can be determined from the information representing the phase difference φ by using Equation (14). The processing circuit 20 may calculate the value of S on the basis of the phase difference φ and may output the electric signal 18 containing information regarding the S value.

Since the power of light emitted from the light source 25 is known, transmittance or reflectance of the object 21 can be determined from the power of the first incident light 8 and the power of the second incident light 9. The processing circuit 20 may output a signal representing the transmittance or reflectance of the object 21. As described, "information regarding the structure of an object" used herein can include information representing at least one of the phase difference between the first incident light 8 and the second incident light 9, a change in thickness of the object, and transmittance or reflectance of the object.

The light detection system may include the coherent light source 25, for example, a laser light source, or the light source 25 may be an external element. The light source 25 may be included in the light detection device 29. The light detection system may include elements other than those illustrated in FIG. 5A. For example, the light detection system may include, between the object 21 and the first and second optical couplers 1 and 2, a bandpass filter that selectively allows light having a specific wavelength range in use to pass, for example. Such a bandpass filter may be disposed in front of the first photodetector 6 and the second photodetector 7.

Figure 5B:
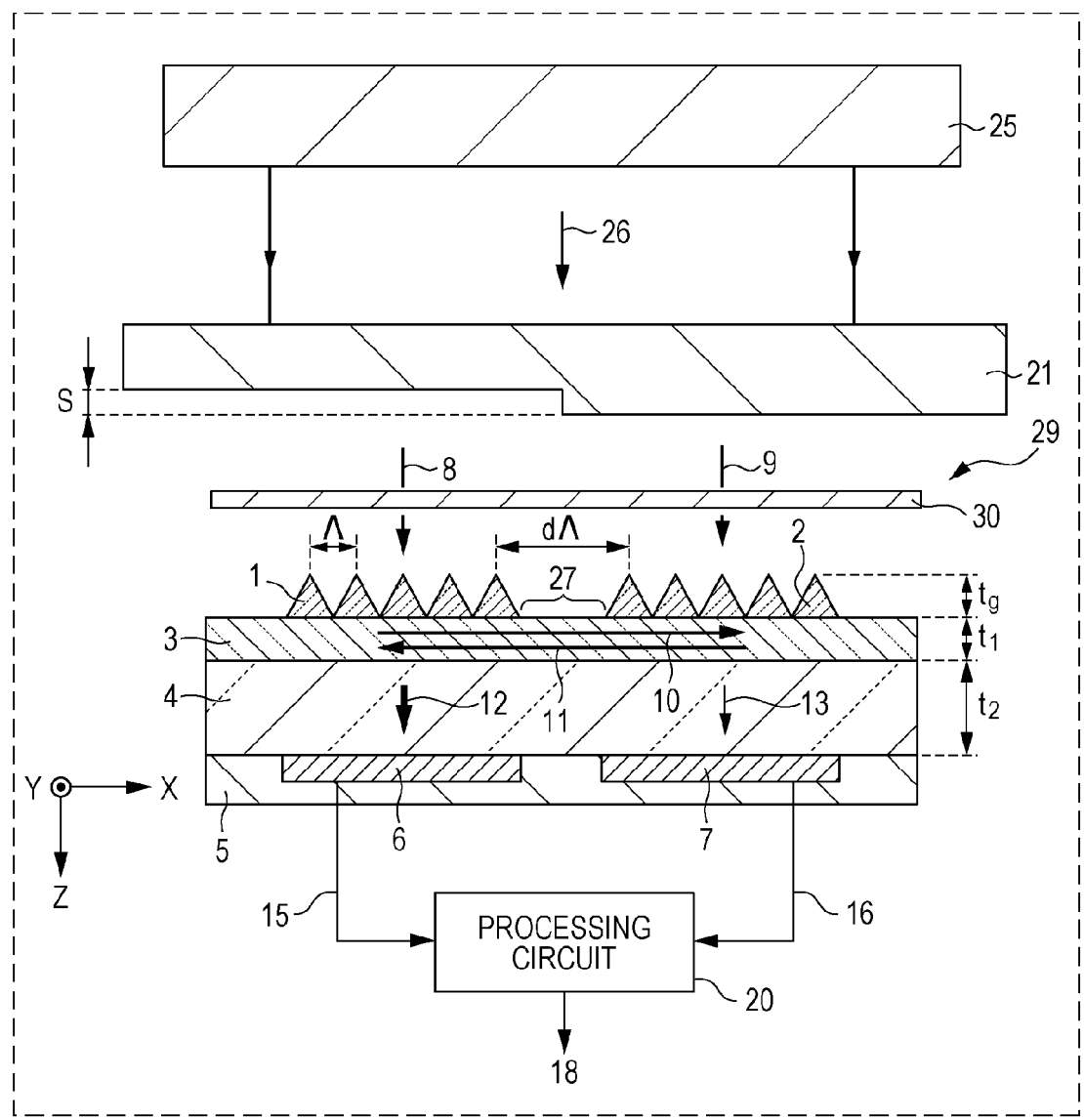
FIG. 5B is a diagram illustrating a modification of the light detection system according to the first embodiment.

FIG. 5B is a diagram illustrating a modification of the light detection system according to the first embodiment. As illustrated in FIG. 5B, the light detection device 29 may include, between the object 21 and the first and second optical couplers 1 and 2, a polarization element 30 that allows more TM polarization components to pass than TE polarization components. The polarization element 30 may be, for example, a linear polarizer or an elliptical polarizer. With the polarization element 30, light containing more TM polarization components than TE polarization components is incident on the first optical coupler 1 and the second optical coupler 2. Thus, the detection sensitivity can be increased as described above.

Modifications of Photodetector Device

Figure 6:
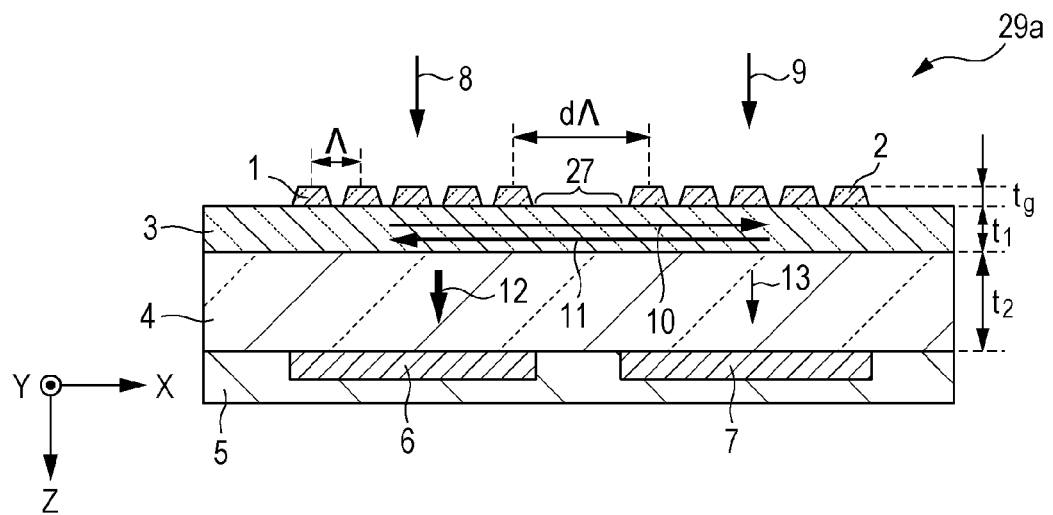
FIG. 6 is a cross-sectional view illustrating the configuration of a light detection device according to a modification of the first embodiment.

FIG. 6 is a cross-sectional view illustrating the configuration of a light detection device 29a according to a modification of the first embodiment. In this example, each of the first optical coupler 1 and the second optical coupler 2 is a grating including light-transmissive members whose cross-section parallel to the X-Z plane is trapezoidal. The light-transmissive members of the first grating 1 and the second grating 2 have a shape of a triangular pillar whose top portion (corner) is removed. Each of the light-transmissive members may have a sinusoidal cross-section, for example. Each of the light-transmissive members need not have a cross-section with a sharp corner and may have a cross-section with a round corner. If each of the light-transmissive members has a tapered cross-section in which the area of the cross-section parallel to the X-Z plane decreases toward the top from the bottom, benefits similar to those of the case where gratings including light-transmissive members having a triangular pillar shape are used are obtained. That is, a small and thin light detection device having a stable structure and capable of quantitatively determining information regarding an object on the basis of the degree of coherence of transmitted light or reflected light from the object can be implemented.

Figure 7:
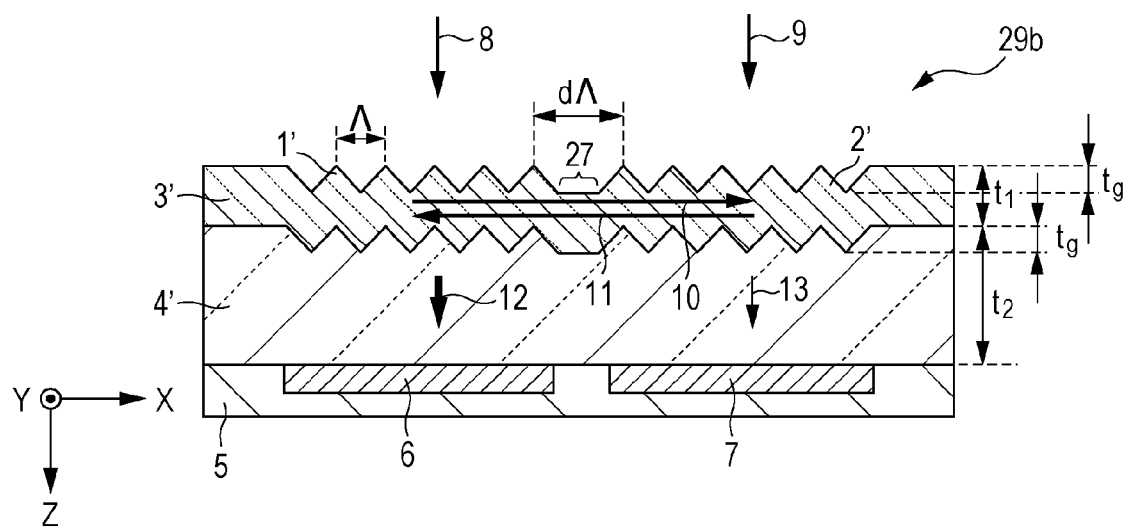
FIG. 7 is a cross-sectional view illustrating the configuration of a light detection device according to another modification of the first embodiment.

FIG. 7 is a cross-sectional view illustrating the structure of a light detection device 29b according to another modification of the first embodiment. In this example, a first optical coupler 1' and a second optical coupler 2' are formed on two surfaces (upper and lower surfaces) of a first layer 3'. The first optical coupler 1' and the second optical coupler 2' are composed of the same material as that of the first layer 3'. In other words, the first optical coupler 1' and the second optical coupler 2' are formed in the first layer 3'. As described above, the first optical coupler, the second optical coupler, and the first layer may be a single structure composed of the same material. In addition, the first optical coupler and the second optical coupler may be formed only in the first layer by using a material having a refractive index different from that of the first layer, for example.

The light detection device 29b illustrated in FIG. 7 can be fabricated in the following process, for example. First, a second layer 4' having the thickness $t_2$ is deposited on the surface where the first photodetector 6 and the second photodetector 7 of the light detector 5 are located. Then, the surface of the second layer 4' is shaped to have a grating of the depth $t_g$. During this process, for example, photolithography and etching can be used. Then, the first layer 3' is deposited on the second layer 4'. Then, the surface of the first layer 3' is also similarly shaped to have a grating of the depth $t_g$. In this way, the light detection device 29b is fabricated. According to this modification, fabrication becomes easier if the material of the second layer 4' has good etching characteristics and formation of the gratings 1' and 2' is easy.

Second Embodiment

Figure 8:
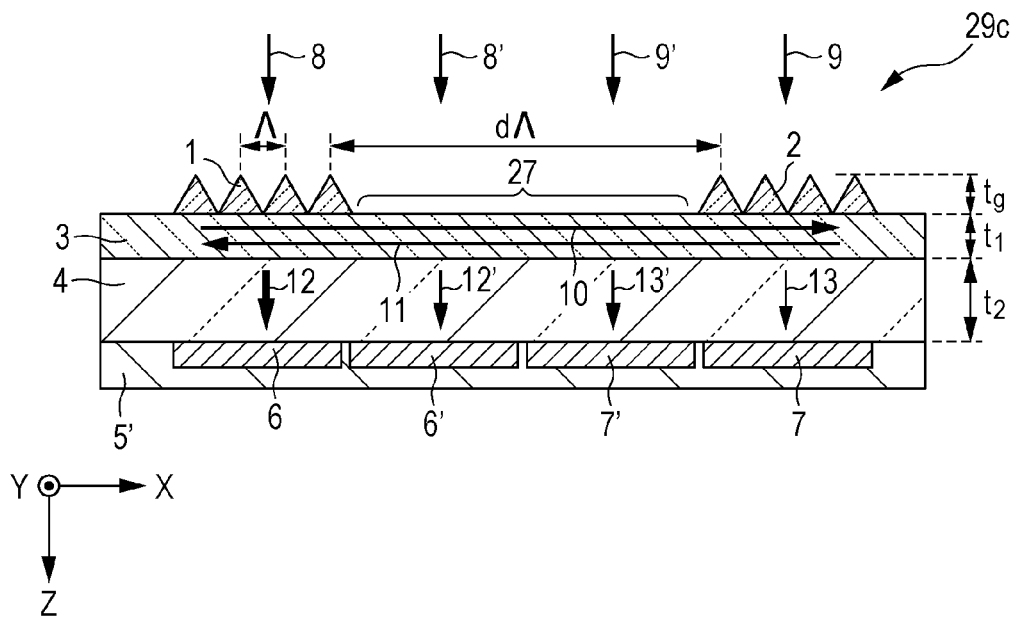
FIG. 8 is a cross-sectional view schematically illustrating the configuration of a light detection device according to a second embodiment of the present disclosure.

A light detection device according to a second embodiment of the present disclosure will be described next. FIG. 8 is a cross-sectional view schematically illustrating the configuration of a light detection device 29c according to the second embodiment of the present disclosure.

The light detection device 29c according to the second embodiment differs from the light detection device 29 according to the first embodiment in that a light detector 5' further includes a photodetector 6' (third photodetector) and a photodetector 7' (fourth photodetector) and the spacing region 27 is relatively large. In the light detection device 29 according to the first embodiment, incident light components that pass through the spacing region 27 are not incident on the photodetectors of the light detector 5. In contrast, in the light detection device 29c according to the second embodiment, incident light 8' and incident light 9' that pass through the spacing region 27 located at the center become transmitted light 12' and transmitted light 13' and are detected by the photodetector 6' and the photodetector 7' of the light detector 5', respectively.

The incident light 8' that is not incident on the first optical coupler 1 among the first incident light is not related to excitation of guided light. The incident light 8' passes through the first layer 3 and becomes the transmitted light 12'. Likewise, the incident light 9' that is not incident on the second optical coupler 2 among the second incident light is not related to excitation of guided light. The incident light 9' passes through the first layer 3 and becomes the transmitted light 13'. Accordingly, power of the incident light 8' and power of the incident light 9' can be detected by detecting the transmitted light 12' and the transmitted light 13' by the photodetector 6' and the photodetector 7', respectively.

With the configuration according to the second embodiment, the light utilization efficiency can be increased by providing the photodetectors 6' and 7' that detect light passing through the spacing region 27 even if the spacing region 27 is large.

The power distribution detection accuracy increases as a result of providing the photodetectors 6' and 7' separately from the photodetectors 6 and 7. In addition, the photodetectors 6 and 6' may be integrated, and the photodetector 7 and 7' may be integrated. The number of photodetectors that oppose the spacing region 27 is not limited to two and there may be one or three or more photodetectors. As described above, the light detector may include at least one third photodetector that opposes the spacing region 27 located between the first grating 1 and the second grating 2.

Third Embodiment

A light detection device according to a third embodiment of the present disclosure will be described next.

Figure 9:
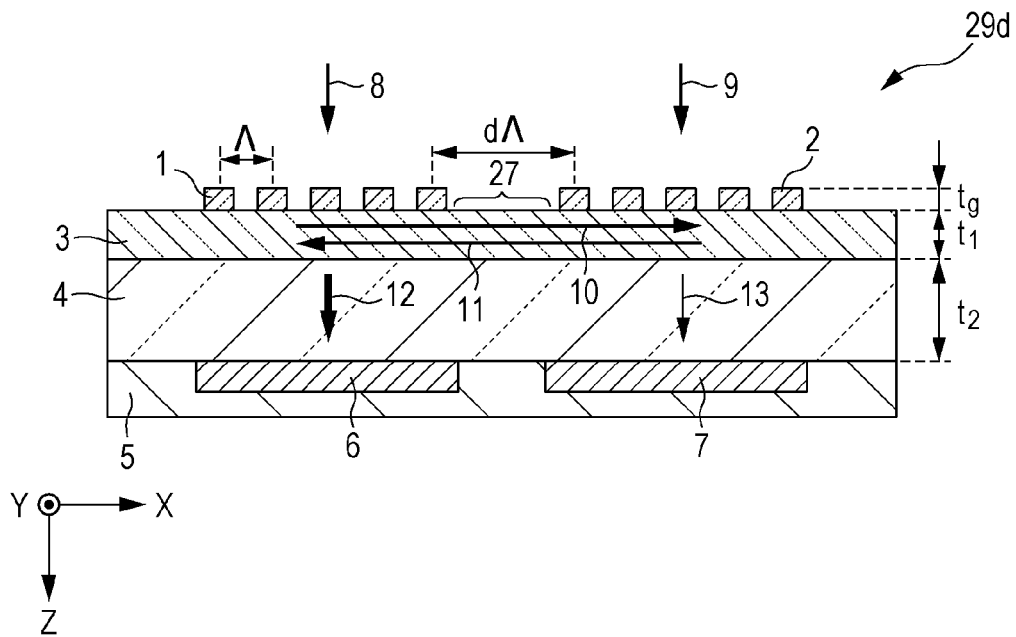
FIG. 9 is a cross-sectional view schematically illustrating the configuration of a light detection device according to a third embodiment of the present disclosure.

FIG. 9 is a cross-sectional view schematically illustrating the configuration of a light detection device 29d according to the third embodiment.

The light detection device 29d according to the third embodiment differs from the light detection device 29 according to the first embodiment in the shape of the first optical coupler 1 and the second optical coupler 2. Each of the first optical coupler 1 and the second optical coupler 2 according to the third embodiment is a grating including a plurality of light-transmissive members each of which has a protrusion extending in the Y direction and whose cross-section parallel to the X-Z plane is rectangular. Each of the first optical coupler 1 and the second optical coupler 2 according to the third embodiment has a structure in which the plurality of light-transmissive members are periodically arranged along the X direction. Two adjacent light-transmissive members define a groove extending in the Y direction therebetween. The light-transmissive members of the gratings 1 and 2 have a shape for which the peak is not determined uniquely; however, the description will be given as in the first embodiment by using the center of each protrusion of the first and second gratings 1 and 2 as a reference (virtual peak) as illustrated in FIG. 9 for convenience.

The first and second gratings 1 and 2 according to the third embodiment are composed of $Ta_2O_5$, which is the same material as that of the first layer 3. The wavelength $\lambda$ of the first incident light 8 and the second incident light 9 in the air is, for example, $\lambda$=0.85 μm. The dimension of each protrusion in the X direction is the same as that of the groove (dent) between the protrusions in the X direction. The depth $t_g$ of the groove is, for example, $t_g$=0.1 μm. The distance $\Lambda$ between the centers of two adjacent protrusions is, for example, $\Lambda$=0.45 μm. Fabrication of gratings having a rectangular cross-section with shallow grooves is easier than fabrication of gratings having a triangular cross-section according to the first embodiment.

Figure 10:
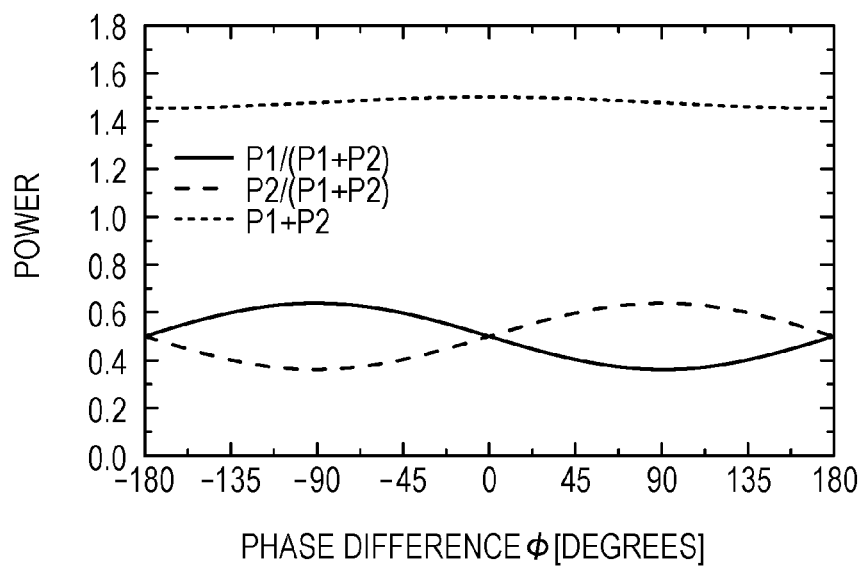
FIG. 10 is a graph showing a relationship among a phase difference $\phi$ between the two incident rays, normalized powers P1/(P1+P2) and P2/(P1+P2) of the transmitted rays, and (P1+P2) in the case where the distance constant $d=1.02$ in the light detection device according to the third embodiment.
Figure 11:
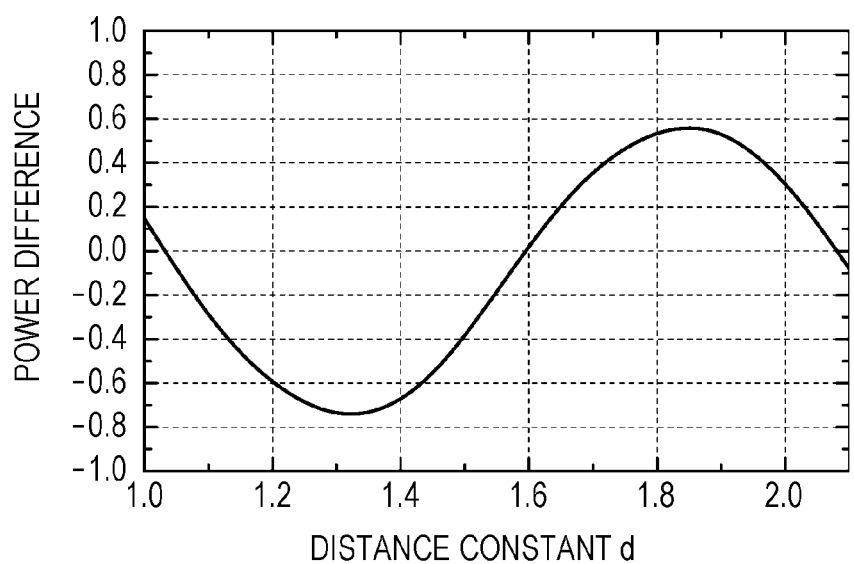
FIG. 11 is a graph showing a relationship between the distance constant d and the power difference in the light detection device according to the third embodiment.

FIG. 10 is a graph showing a relationship among a phase difference $\phi$ between the first incident light 8 and the second incident light 9, normalized powers P1/(P1+P2) and P2/(P1+P2) of the transmitted light 12 and the transmitted light 13, and the sum (P1+P2) in the case where the distance constant d=1.02 in the light detection device 29d according to the third embodiment. FIG. 11 is a graph showing a relationship between the distance constant d and the power difference in the light detection device 29d according to the third embodiment.

A value of d (d>1) at which (P1+P2) is barely dependent on the phase difference $\phi$ also exists for the light detection device 29d according to the third embodiment. For example, when d=1.02, the sum (P1+P2) takes a substantially constant value of 1.48 as illustrated using a dot line in FIG. 10. This value is larger than 1.16, which is the value of (P1+P2) of the light detection device 29 according to the first embodiment. Accordingly, the configuration of the third embodiment achieves higher light utilization efficiency. The powers of the first incident light 8 and the second incident light 9 can be calculated as (P1+P2)/1.48 without using the phase difference $\phi$ in the third embodiment.

As illustrated in FIG. 11, the power difference changes in accordance with the distance constant d. A value d making the power difference zero has been determined to be $$d=1.03+i \quad (15)$$

or $$d=1.60+i \quad (16),$$

where i is an integer of 0 or larger. For example, if i=10, d=11.03 or d=11.60. At that time, a space between the peaks (centers) of the most adjacent protrusions of the first optical coupler 1 and the second optical coupler 2 is $d\Lambda$=4.96 μm or $d\Lambda$=5.22 μm.

The condition of d with which the power difference is within a range from −0.5 to 0.5 is $$1 \leq d \leq 1.16 \quad (17),$$

$$1.47+i \leq d \leq 1.77+i \quad (18), \text{ or}$$

$$1.92+i \leq d \leq 2.16+i \quad (19).$$

The condition of d with which the power difference is within a range from −0.2 to 0.2 is $$1 \leq d \leq 1.08 \quad (20),$$

$$1.55+i \leq d \leq 1.66+i \quad (21), \text{ or}$$

$$2.02+i \leq d \leq 2.16+i \quad (22).$$

The condition of d with which the power difference is within a range from −0.1 to 0.1 is $$1.01+i \leq d \leq 1.06+i \quad (23), \text{ or}$$

$$1.57+i \leq d \leq 1.63+i \quad (24).$$

FIG. 10 illustrates a result of the case where guided light of the TM mode is excited by using the first incident light 8 and the second incident light 9 that contain TM-polarized light. In the third embodiment, the largest value of |P1−P2| of the case where guided light of the TM mode is excited is, for example, approximately 1.5 times as large as the largest value of the case where guided light of the TE mode is excited. However, this difference due to polarization is smaller than the value (approximately 4.6 times) obtained with the configuration according to the first embodiment in which gratings including light-transmissive members having a triangular cross-section are used.

Accordingly, in the light detection device 29d according to the third embodiment, the SN ratio can be increased in the case of using linearly polarized light (TM-polarized light in the third embodiment) that makes the largest value of |P1−P2| larger, compared with the case of using non-polarized incident light. That is, the SN ratio increases as a result of using the first incident light 8 and the second incident light 9 (linearly polarized light or elliptically polarized light) mainly containing TM-polarized light, and consequently the detection sensitivity can be increased.

Figure 12:
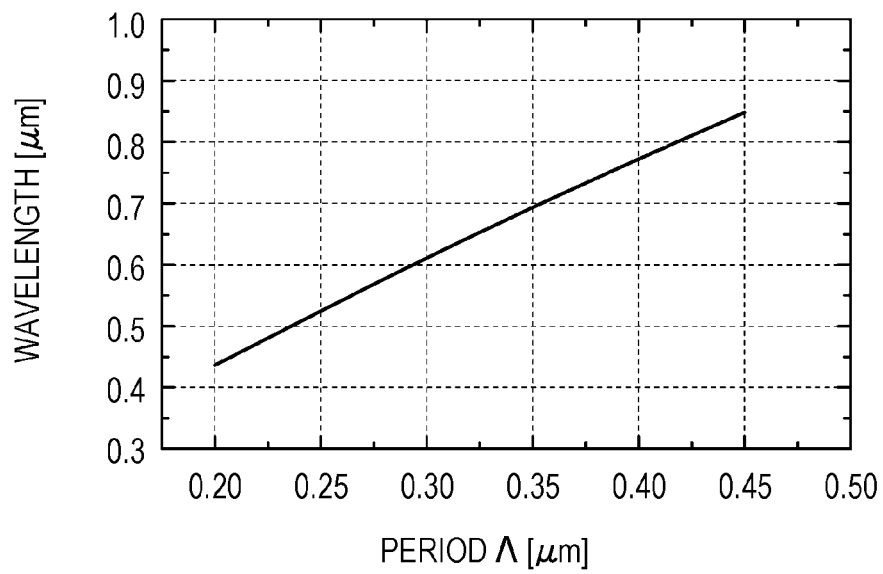
FIG. 12 is a graph illustrating a relationship between a period Λ of light-transmissive members of gratings and a preferable wavelength for the light detection device according to the third embodiment.

FIG. 12 is a graph illustrating a relationship between a period of the light-transmissive members of the gratings and a preferable wavelength for the light detection device 29d according to the third embodiment. This graph illustrates a result of the case where the depth of the grooves of the gratings is constant ($t_g$=0.1 μm). The graph indicates that the preferable wavelength λ changes linearly in accordance with the change in the period Λ. The graph also indicates that the preferable wavelength λ can be suitably approximated by Equation (25) below.

$$\lambda = 1.6488\Lambda + 0.11211 \quad (25)$$

According to Equation (25), Λ=211 nm is obtained for a wavelength λ=0.46 μm which represents blue light. In addition, Λ=255 nm is obtained for a wavelength λ=0.532 μm which represents green light, and Λ=315 nm is obtained for a wavelength λ=0.632 μm which represents red light. In the case of typical gratings that include dents and protrusions having the same length in the X direction and thus have a duty ratio of 0.5, the line width (width of each protrusion) is a half of the period. Accordingly, in the case of forming gratings including light-transmissive members having a rectangular cross-section with a depth $t_g$=0.1 μm, a light detection device that supports wavelengths of red, green, and blue light can be implemented if processing of the line width of 0.1 μm is possible.

Figure 13:
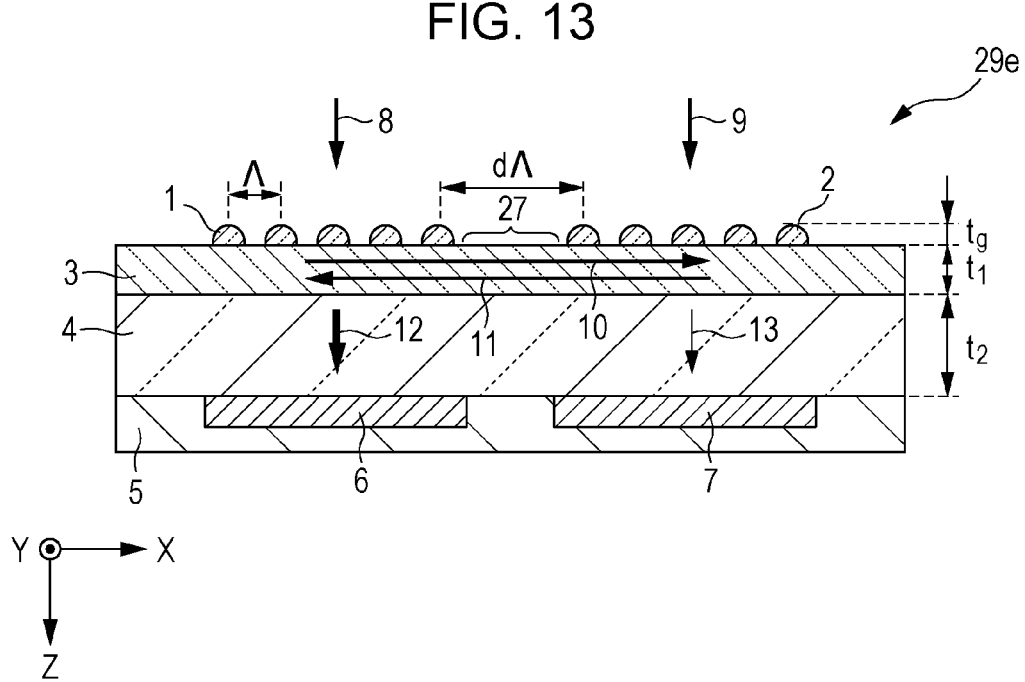
FIG. 13 is a cross-sectional view schematically illustrating the configuration of a light detection device according to a modification of the third embodiment.

FIG. 13 is a cross-sectional view schematically illustrating the configuration of a light detection device 29e according to a modification of the third embodiment. In this modification, each of the first optical coupler 1 and the second optical coupler 2 is a grating including light-transmissive members whose cross-section parallel to the X-Z plane is semicircular. The gratings 1 and 2 including light-transmissive members having a semicircular cross-section can be considered as the gratings 1 and 2 that include light-transmissive members having a substantially rectangular cross-section whose upper portion is rounded. In the gratings 1 and 2 including light-transmissive members having a semicircular cross-section or the gratings 1 and 2 including light-transmissive members having a rectangular cross-section with rounded corners, a lateral surface near the bottom is substantially perpendicular to the first layer 3. Benefits similar to those in the case of using the gratings 1 and 2 including light-transmissive members having a rectangular cross-section can be obtained in the case of using these gratings. That is, a small and thin light detection device having a stable structure and capable of quantitatively determining information regarding an object on the basis of the degree of coherence of transmitted light or reflected light from the object can be implemented.

Fourth Embodiment

A light detection device according to a fourth embodiment of the present disclosure will be described next.

Figure 14A:
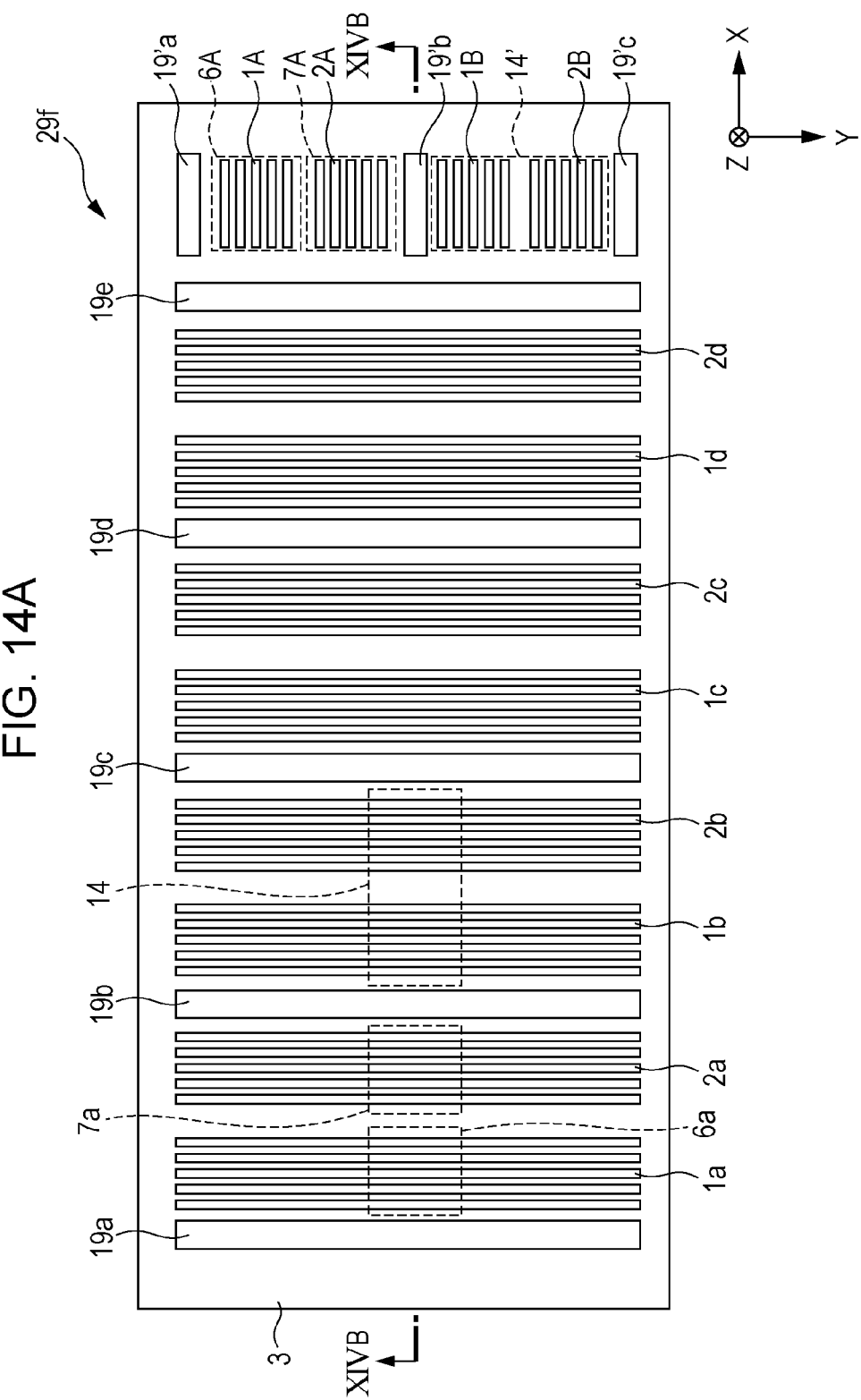
FIG. 14A is a plan view schematically illustrating the configuration of a light detection device according to a fourth embodiment of the present disclosure.
Figure 14B:
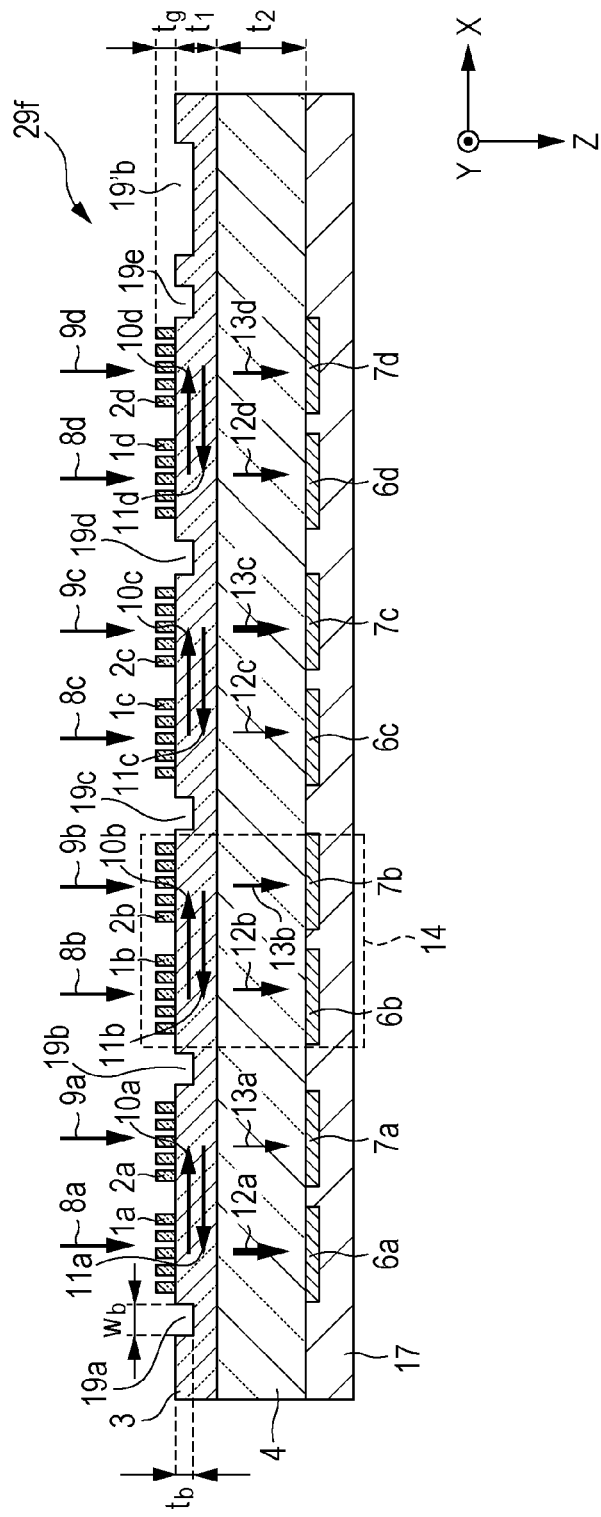
FIG. 14B is a cross-sectional view taken along line XIVB-XIVB illustrated in FIG. 14A.

FIG. 14A is a plan view schematically illustrating the configuration of a light detection device 29f according to the fourth embodiment. FIG. 14B is a cross-sectional view taken along line XIVB-XIVB illustrated in FIG. 14A. In the following description, first optical couplers 1a, 1b, 1c, and 1d illustrated in FIG. 14A are collectively referred to as first optical couplers 1. The same applies to other elements.

The light detection device 29f according to the fourth embodiment differs from the light detection device 29d according to the third embodiment in that the light detection device 29f includes a plurality of detection units 14 and 14'. The plurality of detection units 14 are two-dimensionally arranged in parallel to the X-Y plane. The plurality of detection units 14' are arranged along the Y direction. Each of the plurality of detection units 14 and 14' includes a part of the first layer 3, a part of the second layer 4, the first optical coupler 1, the second optical coupler 2, the first photodetector 6, and the second photodetector 7. The plurality of detection units 14 and 14' share the first layer 3 and the second layer 4. A light detector used in the fourth embodiment is an image sensor 17. On the first layer 3, a groove 19 (having a width $w_b$ and a depth $t_b$) is formed along the Y direction at each region between two adjacent detection units 14 among the plurality of detection units 14. On the first layer 3, a groove 19' (having the width $w_b$ and depth $t_b$) is formed along the X direction at each region between two adjacent detection units 14' among the plurality of detection units 14'. FIG. 14B omits illustration of wirings used to output electric signals from the image sensor 17. Although FIG. 14B illustrates only four detection units arranged along the X direction, five sets of the similar configuration are arranged along the Y direction.

The light detection device 29f according to the fourth embodiment includes the plurality of detection units each having the configuration of the light detection device 29d according to the third embodiment. The plurality of detection units includes the plurality of first detection units 14 that detect information for a first direction (X direction in this example) and the plurality of second detection units 14' that detect information for a second direction (Y direction in this example) perpendicular to the first direction. In each of the first detection units 14, the first photodetector 6 and the second photodetector 7 are arranged along the first direction (X direction). In each of the second detection units 14', the first photodetector 6 and the second photodetector 7 are arranged along the second direction (Y direction).

FIG. 14A illustrates an example in which twenty first detection units 14 in total (four along the X direction and five along the Y direction (4×5)) and two second detection units 14' (one along the X direction and two along the Y direction (1×2)) are arranged. This arrangement is merely an example, and the number of first detection units 14 and the number of second detection units 14' and the arrangements of the first and second detection units 14 and 14' are not limited to this example. Information regarding the X direction (first direction) and the Y direction (second direction) of the object is successfully obtained if at least one first detection unit 14 and at least one second detection unit 14' are provided.

The light detection device 29f according to the fourth embodiment allows incident light 8 and incident light 9 that are adjacent to each other out of transmitted light or reflected light from the object to be incident on the first detection units 14 and the second detection units 14' and detects the light. In this way, two-dimensional information of the object is successfully determined quantitatively.

In the configuration illustrated in FIG. 14A, the first detection units 14 and the second detection units 14' are arranged in a stripe pattern. The twenty first detection units 14 arranged in a matrix of five rows and four columns on the left side of FIG. 14A detect information regarding the X direction two-dimensionally. The two second detection units 14' arranged in a matrix of two rows and one column on the left side of FIG. 14A detect information regarding the Y direction one-dimensionally. Since information regarding the object obtained by each of the first detection units 14 is information regarding the X direction, two-dimensional information of the object is successfully obtained by using such information in combination with the information regarding the Y direction obtained by the second detection units 14' located on the right side.

The light detection device 29f according to the fourth embodiment includes gratings 1a, 1b, 1c, 1d, 2a, 2b, 2c, and 2d whose grooves extend in parallel to the Y direction (second direction) and gratings 1A, 1B, 2A, and 2B whose grooves extend in parallel to the X direction (first direction). Accordingly, TE-polarized light for the first detection units 14 serves as TM-polarized light for the second detection units 14', and TM-polarized light for the first detection units 14 serves as TE-polarized light for the second detection units 14'. The detection performance of the first and second detection units 14 and 14' need not necessarily be dependent on the polarization direction. As described above, a difference in the largest value of |P1−P2| due to a difference in the polarization direction between the incident light 8 and the incident light 9 is smaller when gratings including light-transmissive members having a rectangular or semicircular cross-section are used than when gratings including light-transmissive members having a triangular cross-section are used as in the first embodiment. Accordingly, in the fourth embodiment, gratings including light-transmissive members having a rectangular cross-section are used as illustrated in FIG. 14B. However, the shape of the cross-section of the gratings is not limited to this example, and gratings used in the first embodiment may be used.

Grooves 19a, 19b, 19c, 19d, 19e, 19'a, 19'b, and 19'c (which are sometimes referred to as grooves 19 and 19') are formed in respective regions between the plurality of first and second detection units 14 and 14' in the first layer 3 in the fourth embodiment. Accordingly, leakage of guided light from each of the first and second detection units 14 and 14' to the adjacent detection unit is successfully reduced. As a result, crosstalk is successfully reduced. The width $w_b$ of the grooves 19 and 19' can be typically set to a value larger than the period Λ of the plurality of light-transmissive members of the gratings, for example, to a value of Λ to 5Λ. The depth $t_b$ of the grooves 19 and 19' can be set to be equal to or larger than a thickness (so-called cut-off thickness) with which no waveguide modes occur thereunder, for example, such that $t_b \geq 0.26$ μm. The grooves 19 and 19' successfully reduce the power of guided light that leaks to the adjacent detection unit to ⅓ to ¹⁄₁₅ of the original level, for example. Note that thickness $t_b$ may be set such that $t_b = t_1$, or the grooves 19 and 19' may be formed so as to penetrate through the first layer 3 and reach the second layer 4 located below the first layer 3.

An example of a process of fabricating the light detection device 29f according to the fourth embodiment will be described next.

FIGS. 15A to 15F are cross-sectional views illustrating an example of the process of fabricating the light detection device 29f according to the fourth embodiment. The process of fabricating the light detection device 29f according to the fourth embodiment is almost the same as the process of fabricating the light detection device 29 according to the first embodiment expect that the plurality of first detection units 14 and the plurality of second detection units 14' are formed in a two-dimensional matrix and the grooves 19 and 19' and holes 24a and 24b for wirings are formed.

Figure 15A:
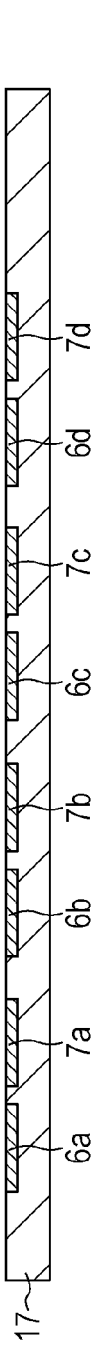
FIG. 15A is a first diagram illustrating a process of fabricating the light detection device according to the fourth embodiment.
Figure 15B:
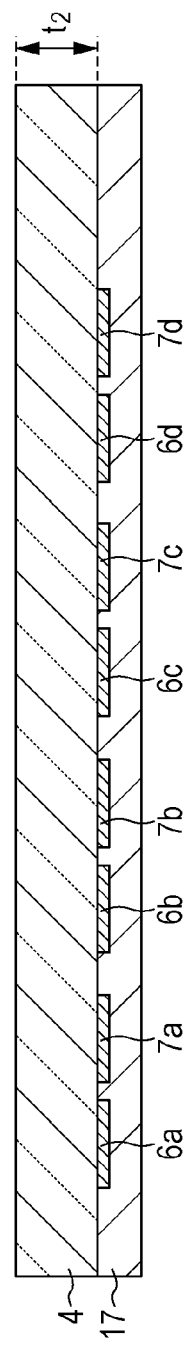
FIG. 15B is a second diagram illustrating the process of fabricating the light detection device according to the fourth embodiment.
Figure 15C:
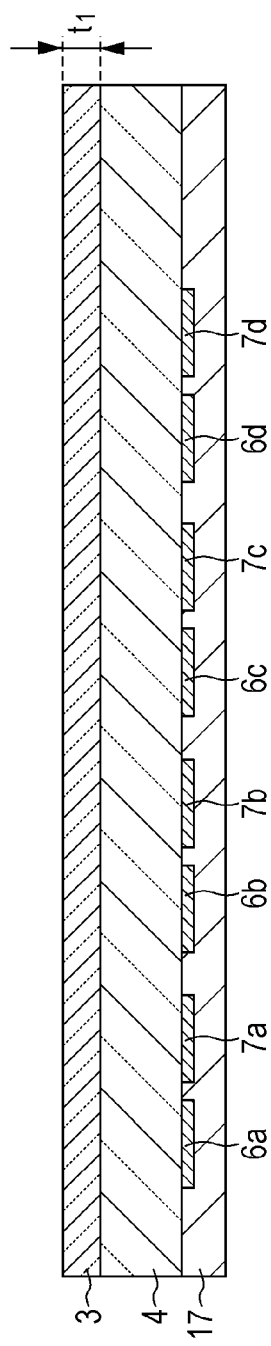
FIG. 15C is a third diagram illustrating the process of fabricating the light detection device according to the fourth embodiment.

First, as illustrated in FIG. 15A, an image sensor 17 including a plurality of photodetectors 6a, 6b, 6c, 6d, 7a, 7b, 7c, and 7d that are two-dimensionally arranged is prepared. Note that the cross-sectional view of FIG. 15A illustrates only eight photodetectors 6 and 7; however, the plurality of photodetectors 6 and 7 are also formed in the depth direction (Y direction). Then, as illustrated in FIG. 15B, the second layer 4 having a thickness of $t_2$ is formed on the light-receiving surface (imaging surface) of the image sensor 17. Then, as illustrated in FIG. 15C, the first layer 3 having a thickness of $t_1$ is formed on the second layer 4. Then, as illustrated in FIG. 15D, the plurality of first optical couplers 1 and the plurality of second optical couplers 2 are simultaneously formed two-dimensionally on the first layer 3. In this way, the plurality of first detection units 14 and the plurality of second detection units 14' are formed. Note that FIG. 15D illustrates only four detection units. Then, as illustrated in FIG. 15E, the plurality of grooves 19 and 19' are formed in respective regions between the plurality of first and second detection units 14 and 14' in the first layer 3. Further, the plurality of holes 24 (FIG. 15E illustrates only holes 24a and 24b) each of which penetrates through the first layer 3 and the second layer 4 and reaches a metal pad (not illustrated) of an electrode on the surface of the image sensor 17 are formed. Then, as illustrated in FIG. 15F, a plurality of wirings 28a and 28b are connected to the respective metal pads through the holes 24a and 24b, respectively. Consequently, the light detection device 29f is completed.

FIGS. 15A to 15F illustrate the example including one image sensor 17; however, the plurality of image sensors 17 may be used. In practice, many image sensors formed two-dimensionally on a large Si wafer having a diameter of approximately 300 mm are typically used. A cutting step may be performed to obtain chips that serve as the light detection devices 29f each including a single image sensor 17 after the step illustrated in FIG. 15E, and then wiring may be performed as illustrated in FIG. 15F.

In the fourth embodiment, each of the first and second detection units 14 and 14' includes the gratings 1 and 2 including a plurality of light-transmissive members arranged at an equal period. That is, the light detection device 29f according to the fourth embodiment has a configuration suitable for a specific wavelength. However, as described with reference to FIG. 12, various wavelengths can be handled by using gratings each including a plurality of light-transmissive members arranged at a plurality of periods. For example, the period Λ of the light-transmissive members may be changed for each detection unit. In addition, gratings including a plurality of light-transmissive members arranged at a plurality of periods may be used in a single detection unit. With this configuration, improved oblique incidence characteristics or wavelength characteristics of the light detection device can be expected.

Figures 16A, 16B, 16C:
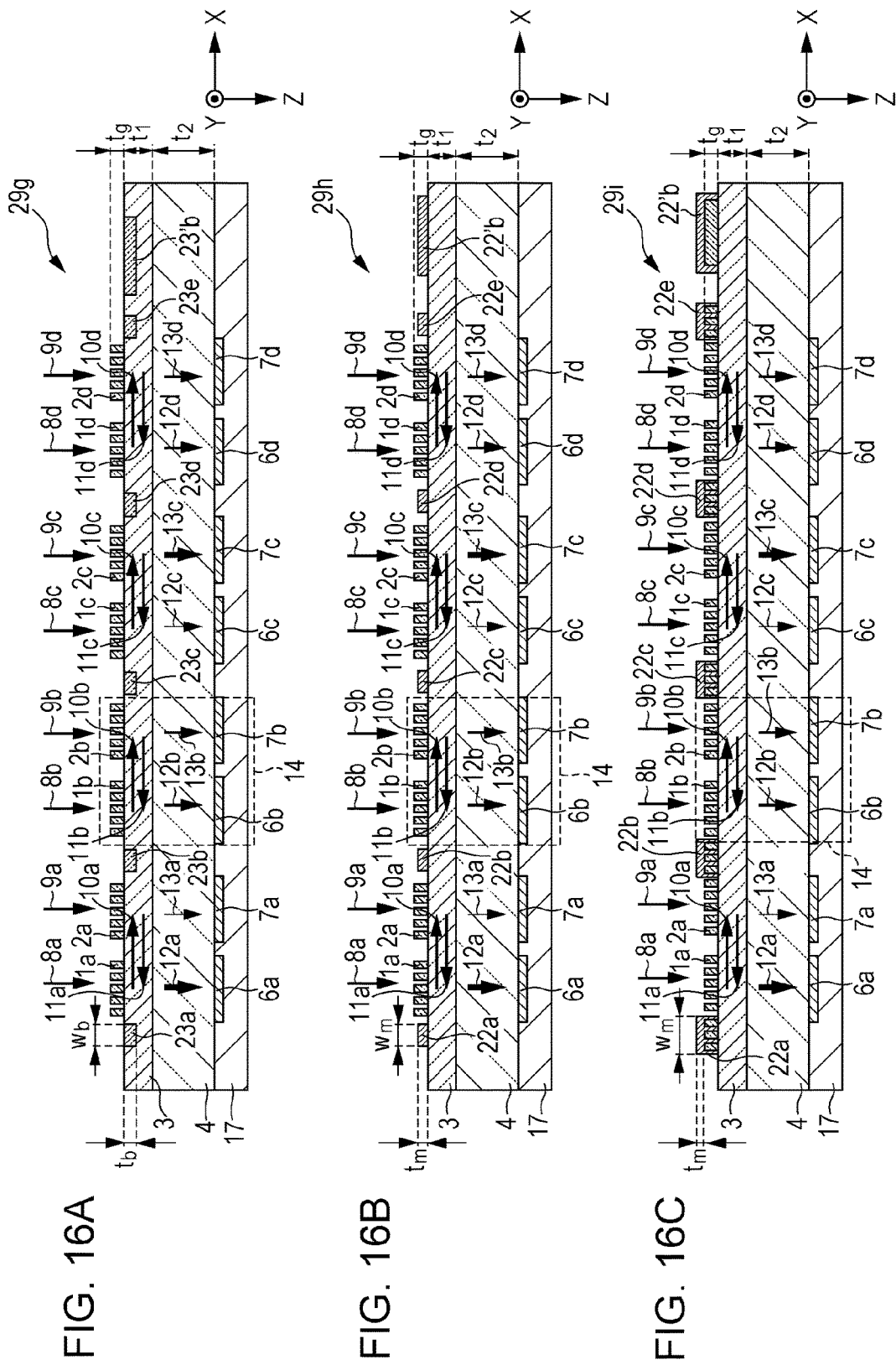
FIG. 16A is a cross-sectional view schematically illustrating the configuration of a light detection device according to a modification of the fourth embodiment.
FIG. 16B is a cross-sectional view schematically illustrating the configuration of a light detection device according to another modification of the fourth embodiment.
FIG. 16C is a cross-sectional view schematically illustrating the configuration of a light detection device according to yet another modification of the fourth embodiment.

FIG. 16A is a cross-sectional view schematically illustrating the configuration of a light detection device 29g according to a modification of the fourth embodiment. In this example, grooves are formed in respective regions between the plurality of first detection units 14 in the first layer 3, and absorbing films 23a, 23b, 23c, 23d, 23e, and 23′b are deposited in the respective grooves. The absorbing films 23a, 23b, 23c, 23d, 23e, and 23′b reduce reflected/scattered light that occurs in the grooves, and successfully reduce stray light of the light detection device 29g and improve the SN ratio. For example, a resin doped with carbon can be used for the absorbing films 23a, 23b, 23c, 23d, 23e, and 23′b. Other than this material, any material having a large extinction coefficient can be used similarly.

FIG. 16B is a cross-sectional view schematically illustrating the configuration of a light detection device 29h according to another modification of the fourth embodiment. In this example, patterns of metal films 22a, 22b, 22c, 22d, 22e, and 22′b (having a width $w_m$ and a thickness $t_m$) are formed in respective regions between the plurality of first detection units 14 in the first layer 3. The patterns of the metal films 22a, 22b, 22c, 22d, 22e, and 22′b (i.e., protrusions composed of a metal) create a state where light trapping conditions are no longer satisfied in that region and the waveguide modes no longer exist. In this way, the power of guided light that leaks to the adjacent detection unit is successfully reduced. For example, Au, Ag, Cu, Al, W, Ti can be used for the metal films 22a, 22b, 22c, 22d, 22e, and 22′b. The inventors have confirmed that the reduction effect is larger for Al, W, and Ti than for Au, Ag, and Cu. The dimension (width) $w_m$ of the metal films 22a, 22b, 22c, 22d, 22e, and 22′b in the X direction can be set, for example, such that $w_m = \Lambda$ to $5\Lambda$, where $\Lambda$ denotes the period of the light-transmissive members of gratings. The dimension (thickness) $t_m$ of the metal films 22a, 22b, 22c, 22d, 22e, and 22′b in the Z direction can be set, for example, such that $t_m = 20$ to 100 nm. With such a configuration, the power of guided light that leaks to the adjacent detection unit is successfully reduced to approximately 1/5 to 3/100 of the original level, for example.

In this modification, since the patterns of the metal films 22a, 22b, 22c, 22d, 22e, and 22′b are formed on the first layer 3, grooves are no longer required. Since the light detection device 29h include no grooves, reflection of guided light is successfully reduced. If reflection of guided light is large, the reflection influences interference between the guided light 10 and the guided light 11 in each first detection unit 14 and decreases the accuracy in phase-difference detection. According to this modification, reflection of guided light is successfully reduced, and the accuracy of phase-difference detection is successfully increased.

FIG. 16C is a cross-sectional view schematically illustrating the configuration of a light detection device 29i according to yet another modification of the fourth embodiment. In this example, an optical coupler (grating) is continuously formed over regions between the plurality of first detection units 14. The patterns of the metal films 22a, 22b, 22c, 22d, 22e, and 22′b are formed on the grating. In other words, the light detection device 29i according to this modification of the fourth embodiment includes a third optical coupler covered with the metal film in regions between the plurality of first detection units in the first layer 3. According to this modification, the power of guided light that leaks to the adjacent detection unit is successfully reduced more than that achieved by the light detection device 29h illustrated in FIG. 16B. Accordingly, the configuration of this modification implements good crosstalk characteristics.

Fifth Embodiment

A light detection device according to a fifth embodiment of the present disclosure will be described next.

Figure 17:
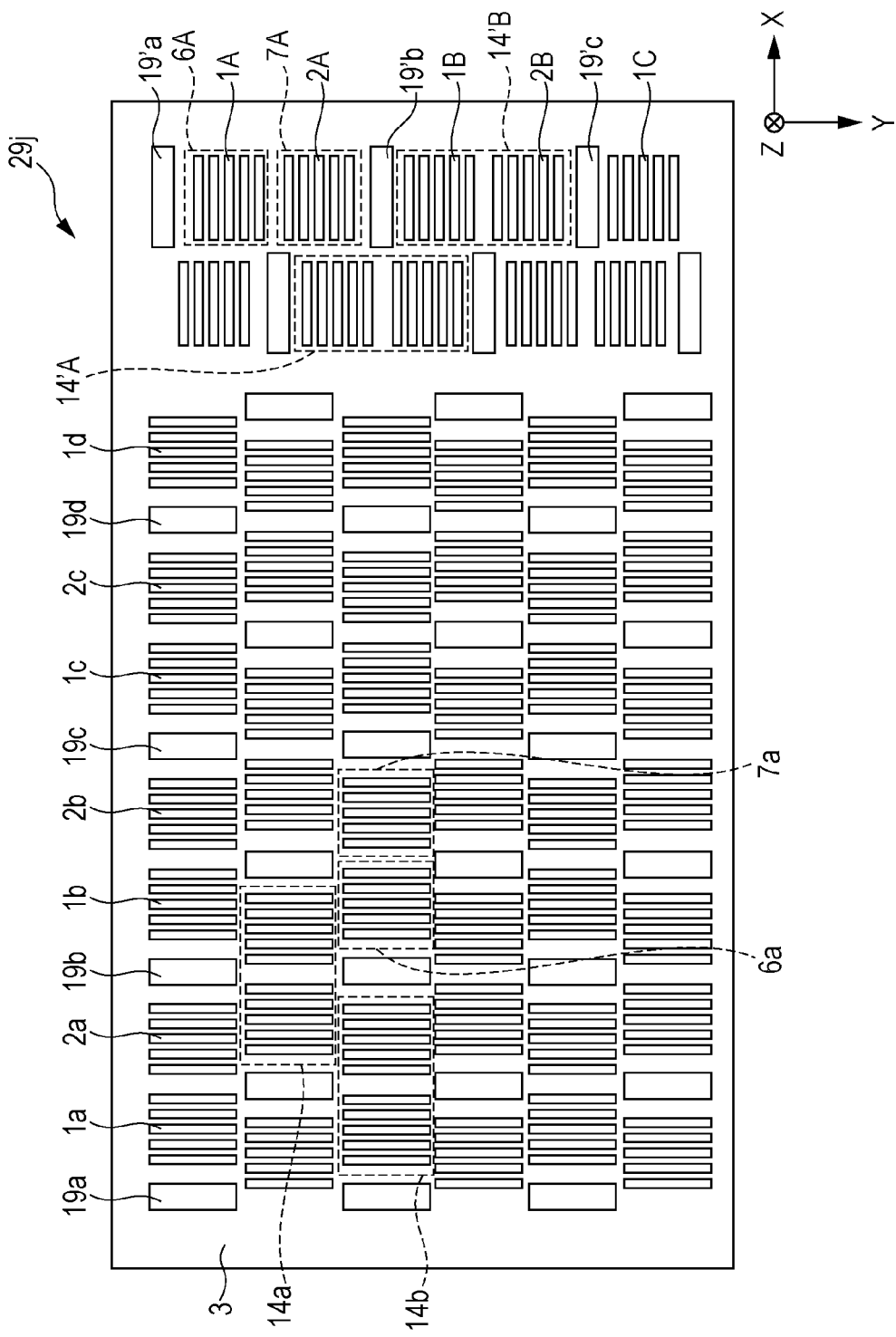
FIG. 17 is a plan view schematically illustrating the configuration of a light detection device according to a fifth embodiment of the present disclosure.

FIG. 17 is a plan view schematically illustrating the configuration of a light detection device 29j according to the fifth embodiment. The light detection device 29j according to the fifth embodiment has a configuration in which the arrangements of the plurality of first detection units 14 and the plurality of second detection units 14 (referred to as a stripe pattern) in the light detection device 29f according to the fourth embodiment are changed to arrangements in a staggered pattern. The light detection device 29j according to the fifth embodiment will be described below in terms of differences from the light detection device 29f according to the fourth embodiment.

In the fifth embodiment, the X-direction position of the first detection units 14 in a certain row is shifted by a half period from the X-direction position of the first detection units 14 in another row adjacent to the certain row. Likewise, the Y-direction position of the second detection units 14′ in a certain column is shifted by a half period from the Y-direction position of the second detection units 14′ in another columns adjacent to the certain column. Such an arrangement is referred to as an "arrangement in a staggered pattern". With such an arrangement, the resolution in the X direction and the Y direction can be substantially increased.

Sixth Embodiment

Photodetector Device

First, a light detection device according to a sixth embodiment of the present disclosure will be described.

Figure 18A:
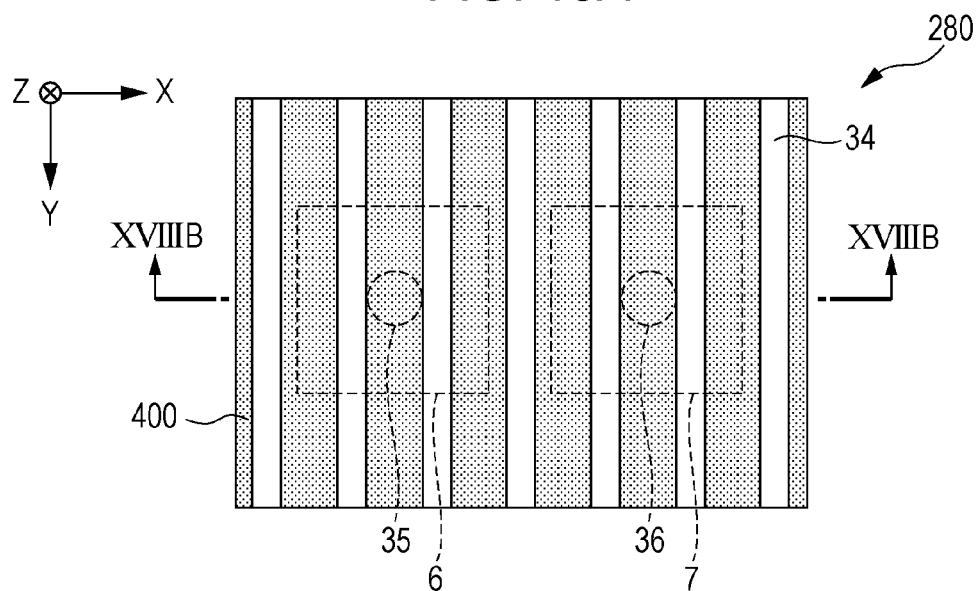
FIG. 18A is a first diagram schematically illustrating the configuration of a light detection device according to a sixth embodiment of the present disclosure.
Figure 18B:
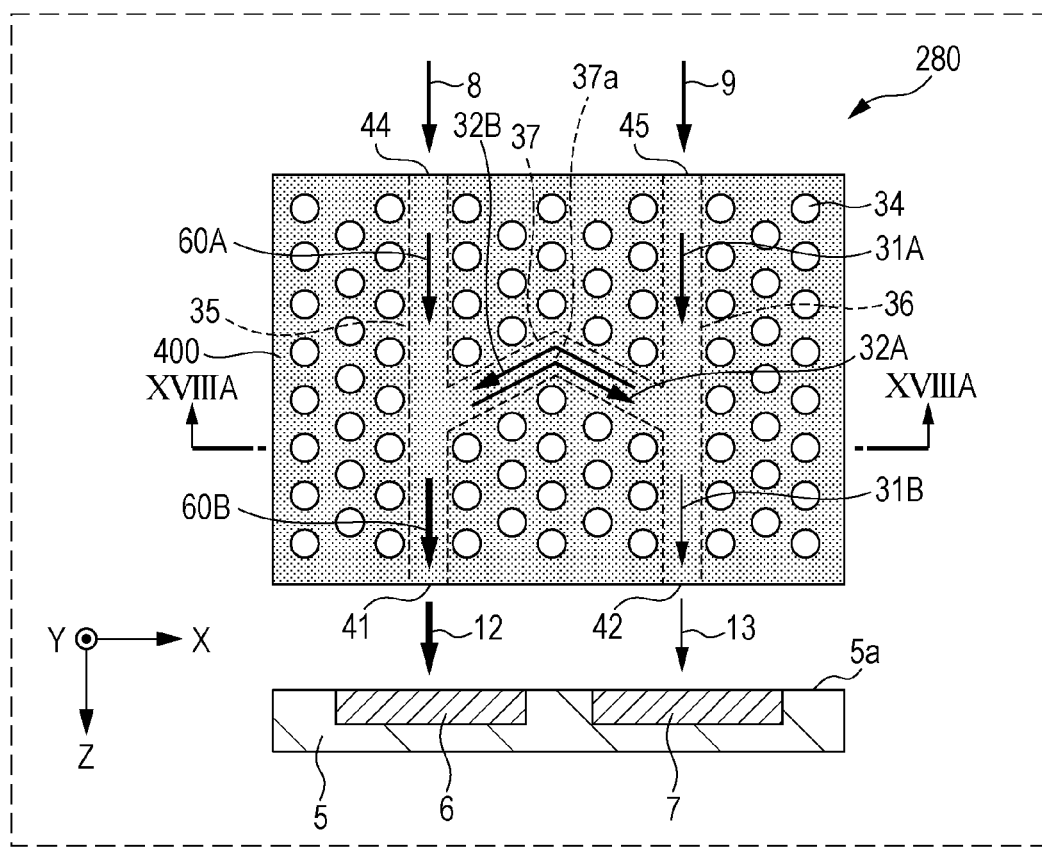
FIG. 18B is a second diagram schematically illustrating the configuration of the light detection device according to the sixth embodiment of the present disclosure and is a cross-sectional view taken along line XVIIIB-XVIIIB illustrated in FIG. 18A.

FIGS. 18A and 18B are diagrams schematically illustrating the configuration of a light detection device 280 according to the sixth embodiment of the present disclosure. Specifically, FIG. 18A illustrates a cross-section taken along line XVIIIA-XVIIIA illustrated in FIG. 18B, and FIG. 18B illustrates a cross-section taken along line XVIIIB-XVIIIB illustrated in FIG. 18A.

In the following description, the XYZ coordinate system is used which expresses X, Y, and Z directions that are orthogonal to one another. In the sixth embodiment, a plane that is parallel to a light-receiving surface of a light detector 5 of the light detection device 280 is referred to as the X-Y plane, and a direction perpendicular to the X-Y plane is referred to as the Z direction. Note that the illustrated coordinate system is set for convenience of explanation and does not restrict arrangement and orientation of the light detection device according to the sixth embodiment of the present disclosure when the light detection device is actually used. In addition, the illustrated shape and dimensions of the entirety or part of the structure do not restrict the actual shape and dimensions.

The light detection device 280 according to the sixth embodiment includes the light detector 5 and a light-transmissive substrate 400 disposed above the light detector 5. The light detector 5 includes the first photodetector 6 and the second photodetector 7 arranged along the first direction (X direction in the sixth embodiment). The substrate 400 includes therein a first optical propagation path 35 and a second optical propagation path 36 that extend in the Z direction. The first optical propagation path 35 is a path that allows the incident light 8 incoming from the object to propagate from a light incident portion 44 on the upper side of the substrate 400 to a light exiting portion 41 on the lower side of the substrate 400. The light exiting portion 41 of the first optical propagation path 35 opposes the first photodetector 6. The second optical propagation path 36 is a path that allows the incident light 9 incoming from the object to propagate from a light incident portion 45 on the upper side of the substrate 400 to a light exiting portion 42 on the lower side of the substrate 400. The light exiting portion 42 of the second optical propagation path 36 opposes the second photodetector 7. The light detection device 280 further includes a third optical propagation path 37 that connects a portion of the first optical propagation path 35 and a portion of the second optical propagation path 36 with each other. In the sixth embodiment, the third optical propagation path 37 is in the substrate 400. As described later, the third optical propagation path can be disposed outside the substrate 400 in other embodiments. The third optical propagation path 37 allows part of light that propagates through the first optical propagation path 35 to propagate toward the second optical propagation path 36 and allows part of light that propagates through the second optical propagation path 36 to propagate toward the first optical propagation path 35. In this way, interference of light occurs in the third optical propagation path 37.

Note that FIG. 18B omits illustration of wirings used to output electric signals from the light detector 5. Although FIG. 18B illustrates the configuration in which the substrate 400 and the light detector 5 are separated from each other; however, the substrate 400 and the light detector 5 may be integrated together by using an adhesive, such as a resin, for example. Such an integration structure allows the light detection device 280 to be more robust against vibration or the like and to have improved environment resistance.

When the first incident light 8 is incident on the light incident portion 44 of the first optical propagation path 35 from the object, the light propagates as first propagating light 60A along the first optical propagation path 35. After the first propagating light 60A propagates beyond the junction of the first optical propagation path 35 and the third optical propagation path 37, the first propagating light 60A becomes first propagating light 60B and propagates toward the light exiting portion 41. After the first propagating light 60B passes through the light exiting portion 41, the first propagating light 60B becomes first transmitted light 12 and is incident on the first photodetector 6. In this way, at least part of the first incident light 8 is incident on the first photodetector 6.

Likewise, when the second incident light 9 is incident on the light incident portion 45 of the second optical propagation path 36, the second incident light 9 propagates as second propagating light 31A along the second optical propagation path 36. After the second propagating light 31A propagates beyond the junction of the second optical propagation path 36 and the third optical propagation path 37, the second propagating light 31A becomes second propagating light 31B and propagates towards the light exiting portion 42. After the second propagating light 31B passes through the light exiting portion 42, the second propagating light 31B becomes second transmitted light 13 and is incident on the second photodetector 7. In this way, at least part of the second incident light 9 is incident on the second photodetector 7.

Each of the first photodetector 6 and the second photodetector 7 includes, for example, a photodiode and outputs an electric signal (photoelectric conversion signal) based on an amount of received light. The first photodetector 6 receives the first transmitted light 12 and outputs a first electric signal based on the amount of received light. The second photodetector 7 receives the second transmitted light 13 and outputs a second electric signal based on the amount of received light. The first and second electric signals are processed by a processing circuit (not illustrated), and information representing a phase difference between the first incident light 8 and the second incident light 9 is generated. The processing circuit is further capable of generating and outputting information regarding the structure of the object (e.g., the surface structure, the refractive index distribution, etc.) on the basis of this phase difference information.

In the sixth embodiment, the first photodetector 6 and the second photodetector 7 detect light having a wavelength $\lambda$ in the air. The substrate 400 has a photonic crystal structure that blocks the light having the wavelength $\lambda$ in a region other than the first optical propagation path 35, the second optical propagation path 36, and the third optical propagation path 37.

In the sixth embodiment, the light-transmissive substrate 400 has a plurality of cavities 34 extending in the second direction (Y direction in the sixth embodiment) that is perpendicular to the first direction (X direction in the sixth embodiment) and is parallel to the light-receiving surface 5a of the light detector 5. The plurality of cavities 34 are arranged periodically in regions other than the regions of the first optical propagation path 35, the second optical propagation path 36, and the third optical propagation path 37. Light of a specific wavelength range including the wavelength $\lambda$ used in the light detection device 280 cannot propagate in a region where the plurality of cavities 34 are periodically arranged densely, and the light of such a wavelength range can propagate in a region without the cavities 34. The first, second, and third optical propagation paths 35, 36, and 37 formed by such a structure can be considered as optical waveguides of a known photonic crystal. Accordingly, the first propagating light 60A and 60B, the second propagating light 31A and 31B, and the third propagating light 32A and 32B can be considered as guided light that propagates through optical waveguides.

As illustrated in FIG. 18B, the plurality of cavities 34 are arranged in a hexagonal lattice pattern when viewed from the Y direction in the sixth embodiment. The arrangement of the plurality of cavities 34 is not limited to this pattern, and the plurality of cavities 34 may be arranged in a tetragonal lattice pattern, for example. For example, each of the cavities 34 has a circular cylindrical shape in the sixth embodiment; however, each of the cavities 34 may have another rod-like shape, for example, a rectangular cylindrical shape. In addition, each of the cavities 34 is filled with the air in the sixth embodiment; however, each of the cavities 34 may be filled with a dielectric material other than the air. Each of the cavities 34 is only required to be filled with a dielectric material having a refractive index different from that of the substrate 400. If the refractive index periodically changes spatially in the structure, the structure functions as a photonic crystal.

Each of the cavities 34 typically has a diameter of orders from submicron (less than 1 µm) to micron (µm) although the diameter is dependent on the wavelength of the incident light. Each of the first, second, and third optical propagation paths 35, 36, and 37 typically has a width of orders from submicron to micron. In the following description, the first propagating light 60A and 60B is simply referred to as "first propagating light 60" when they are not distinguished from each other. The same applies to other reference signs.

Although FIGS. 18A and 18B illustrate regions of the three optical propagation paths 35, 36, and 37 by using dash lines for ease of understanding, boundaries do not necessarily exist at the positions of the dash lines. For example, in FIG. 18A, each of the first and second optical propagation paths 35 and 36 is illustrated as a circular cylindrical region; however, the first and second optical propagation paths 35 and 36 do not necessarily have such a shape in practice. In the substrate 400 illustrated in FIG. 18A, planar regions having the X coordinates as those of the first and second optical propagation paths 35 and 36 do not include the cavities 34. Accordingly, light propagates through the regions. In the sixth embodiment, the circular cylindrical regions illustrated by using dash lines in FIGS. 18A and 18B are assumed to be the first and second optical propagation paths 35 and 36 in distinction from the other regions.

As described above, the plurality of cavities 34 are formed around the first optical propagation path 35 and the second optical propagation path 36 such that the first optical propagation path 35 and the second optical propagation path 36 have a line-like structure extending in the Z direction. In addition, the plurality of cavities 34 are formed around the third optical propagation path 37 such that the third optical propagation path 37 connects (or is placed across) a middle portion of the first optical propagation path 35 and a middle portion of the second optical propagation path 36. In the sixth embodiment, the third light propagation 37 has a bend 37a between the first optical propagation path 35 and the second optical propagation path 36. The bend 37a is located farther from the light-receiving surface 5a of the light detector 5 than the joint of the third optical propagation path 37 and the first optical propagation path 35 and the joint of the third optical propagation path 37 and the second optical propagation path 36. In other words, the plurality of cavities 34 are formed such that the third optical propagation path 37 protrudes in the −Z direction. Accordingly, a portion of the first optical propagation path 35 where the first propagating light 60A propagates crosses the third optical propagation path 37 at an acute angle, and a portion of the second optical propagation path 36 where the second propagating light 31A propagates crosses the third optical propagation path 37 at an acute angle. It has been found that such a structure reduces scattering loss near the connection region of the first optical propagation path 35 and the third optical propagation path 37 and the connection region of the second optical propagation path 36 and the third optical propagation path 37 and increases the light utilization efficiency.

The inventors have found that the structure of an object (e.g., thickness or the inside refractive index distribution, etc.) is successfully measured quantitatively by irradiating the object with coherent light such as laser beams and detecting transmitted light or reflected light from the object by using the light detection device 280 according to the sixth embodiment. The inventors have found that, when it is assumed that two adjacent beams of the light from the object serve as the first incident light 8 and the second incident light 9, third propagating light 32A and third propagating light 32B that propagate in the opposite directions are excited and interfere with each other in the third optical propagation path 37 and the amounts (powers) of the first propagating light 60B and the second propagating light 31B change depending on the degree of interference. As the powers of the first propagating light 60B and the second propagating light 31B change, powers of the first transmitted light 12 and the second transmitted light 13 change. That is, a coherence difference (or a phase difference) between the first incident light 8 and the second incident light 9 can be detected by detecting the amounts of the transmitted light 12 and the transmitted light 13 by using the first photodetector 6 and the second photodetector 7, respectively.

Phase information of transmitted light or reflected light changes depending on the structure of an object (such as a spatial thickness distribution or inside refractive index distribution). Accordingly, a change in thickness of the object, the reflective index distribution, or the like can be quantitatively determined by detecting the coherence difference (or the phase difference) between the first incident light 8 and the second incident light 9.

Figure 19A:
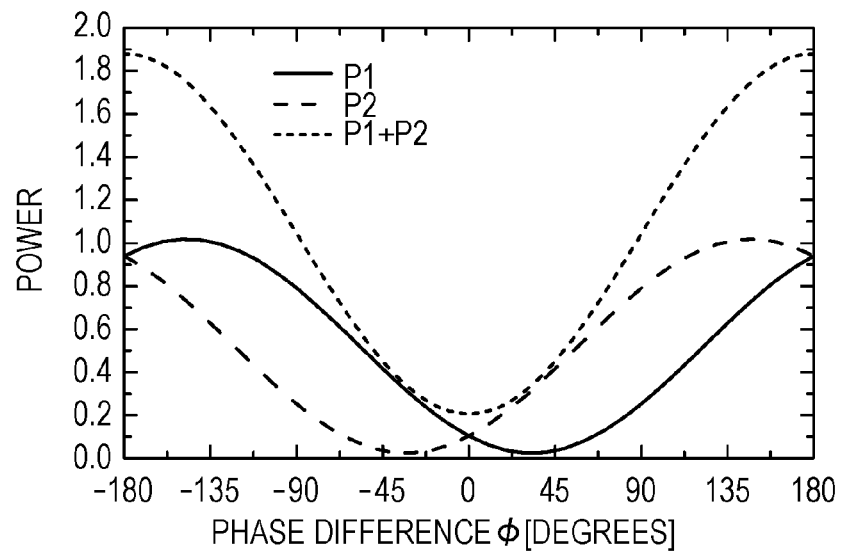
FIG. 19A is a graph showing a relationship among a phase difference $\phi$ between the two incident rays, powers P1 and P2 of the transmitted rays, and (P1+P2) in the light detection device according to the sixth embodiment.
Figure 19B:
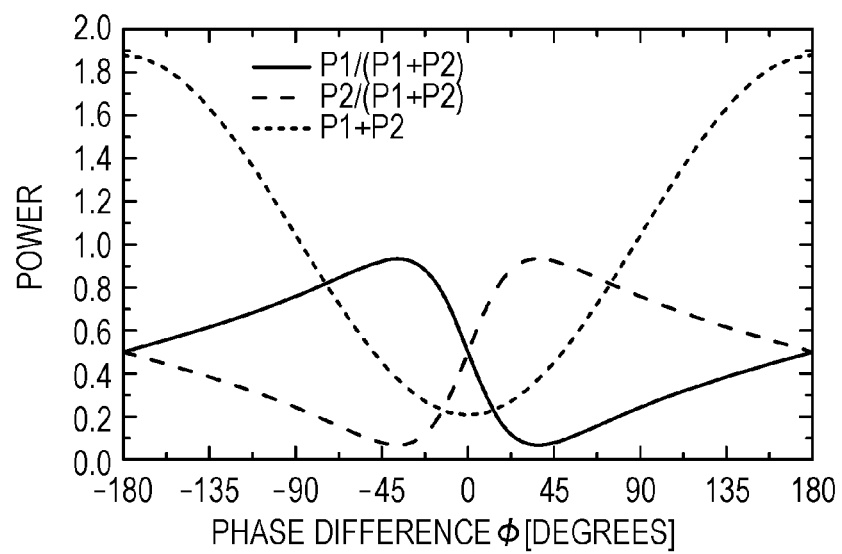
FIG. 19B is a graph showing a relationship among a phase difference $\phi$ between the two incident rays, normalized powers P1/(P1+P2) and P2/(P1+P2) of the transmitted rays, and the sum (P1+P2) of the powers in the light detection device according to the sixth embodiment.

FIG. 19A is a graph showing a relationship among a phase difference φ between the first incident light 8 and the second incident light 9, powers P1 and P2 of the transmitted light 12 and the transmitted light 13, and the sum (P1+P2) of the powers in the light detection device 280. FIG. 19B is a graph showing a relationship among a phase difference φ between the first incident light 8 and the second incident light 9, normalized powers P1/(P1+P2) and P2/(P1+P2) of the transmitted light 12 and the transmitted light 13, and the sum (P1+P2) of the powers in the light detection device 280. FIGS. 19A and 19B illustrate exemplary results of electromagnetic field analysis performed by using the FDTD method on the assumption that the first incident light 8 and the second incident light 9 which are linearly polarized light whose electric-field direction is the X direction are incident. Note that the graphs of FIGS. 19A and 19B show the values obtained on the assumption that incident loss is zero at the light incident portions 44 and 45 of the first and second optical propagation paths 35 and 36 (that is, the first incident light 8 and the second incident light 9 respectively become the first propagating light 60A and the second propagating light 31A at 100%) and exit loss is zero at the light exiting portions 41 and 42 (that is, the first propagating light 60B and the second propagating light 31B respectively become the first transmitted light 12 and the second transmitted light 13 at 100%).

In this analysis, highly coherent laser beams having the same wavelength λ and the same power (normalized power of 1) are used as the first incident light 8 and the second incident light 9. The phase difference φ [degrees] is a phase difference of the second incident light 9 with respect to the phase of the first incident light 8. As illustrated using a solid line and a dash line in FIG. 19A, the power P1 of the first transmitted light 12 and the power P2 of the second transmitted light 13 change depending on the phase difference φ between the first incident light 8 and the second incident light 9. The power P1 becomes the largest at around φ=−150° and becomes the smallest at around φ=30°. The power P2 becomes the largest at around φ=150° and becomes the smallest at around φ=−30°. Accordingly, the phase difference φ can be uniquely quantified in a range from −180° to 180° from the powers P1 and P2 on the basis of these curves. That is, the phase difference φ between the first incident light 8 and the second incident light 9 can be uniquely detected by detecting the powers P1 and P2 using the first photodetector 6 and the second photodetector 7, respectively.

In the range where |φ| is small (e.g., −90°<φ<90°), the sum (P1+P2) of the powers of the first transmitted light 12 and the second transmitted light 13 detected by the light detector 5 is low as illustrated using a dot line in FIG. 19A. It has been found that this phenomenon results from an increase in reflected light components that exit from the light incident portions 44 and 45 of the first and second optical propagation paths 35 and 36 in the −Z direction.

Values P1/(P1+P2) and P2/(P1+P2), which are obtained by dividing the powers P1 and P2 by (P1+P2), may be used as normalized powers instead of the powers P1 and P2 as illustrated in FIG. 19B. In this case, P1/(P1+P2)=P2/(P1+P2)=0.5 is maintained at $\phi=0$ and $\pm 180°$ even if (P1+P2) changes. Accordingly, this configuration is convenient for quantification based on the measured values.

FIGS. 19A and 19B illustrate the results of the case where guided light of the TE mode is excited in the first optical propagation path 35 and the second optical propagation path 36 by using the first incident light 8 and the second incident light 9 each of which is linearly polarized light whose electric-field direction is the X direction. Since optical waveguides of photonic crystal are used as the first, second, and third optical propagation paths 35, 36, and 37 in the sixth embodiment, polarization dependency occurs. The SN ratio can be increased when polarized light (linearly polarized light or elliptically polarized light) that gives the larger |P1−P2| value in response to a change in the phase difference than when non-polarized incident light is used.

Photodetector System

The light detection device 280 according to the sixth embodiment is capable of obtaining information regarding the structure of an object (e.g., the surface structure, the refractive index distribution, etc.) when it is used in combination with a light source and an processing circuit. An example of such a light detection system will be described below.

FIG. 20A is a diagram schematically illustrating an example of the configuration of the light detection system in which the light detection device 280 according to the sixth embodiment is used. This light detection system includes a light source 25 that emits light having a wavelength $\lambda$ in the air and an processing circuit 20 that generates and outputs information (electric signal 18) regarding the structure of an object on the basis of a first electric signal output from the first photodetector 6 and a second electric signal output from the second photodetector 7. The first photodetector 6 and the second photodetector 7 detect the light having the wavelength $\lambda$ that has been emitted from the light source 25 and is incoming from the object 21. This light detection system detects transmitted light from the object 21; however, the light detection system may be configured to detect reflected light. The object 21 can be, but not limited to, a biological tissue or a phase-stepping forgery prevention mark on documents, for example.

The processing circuit 20 used in the sixth embodiment may be an integrated circuit, for example, a DSP, an ASIC, or an FPGA. The processing circuit 20 executes a computer program stored, for example, in a memory to perform computation to be described later and generate information regarding the structure of the object 21.

The light detection system irradiates the object 21 with emitted light 26 which is monochromatic coherent light, such as laser beams, from the light source 25 and detects, by using the light detection device 280, light that has passed through the object 21 (including the first incident light 8 and the second incident light 9 that are adjacent to each other). In the example illustrated in FIG. 20A, the first incident light 8 is light that has passed through a relatively thin portion of the object 21, whereas the second incident light 9 is light that has passed through a relatively thick portion of the object 21. Now, let S denote the difference in thickness between the relatively thin portion and the relatively thick portion and let $n_0$ denote a refractive index of the object 21. Then, the phase difference $\phi$ between the first incident light 8 and the second incident light 9 is denoted as Equation (26) below.

$$\phi=2\pi(n_0-1)S/\lambda \qquad (26)$$

That is, the phase of the second incident light 9 is delayed with respect to the phase of the first incident light 8 by $2\pi(n_0-1)S/\lambda$.

The first photodetector 6 outputs a first electric signal 15 having a signal value that is proportional to the power P1 of the first transmitted light 12. The second photodetector 7 outputs a second electric signal 16 having a signal value that is proportional to the power P2 of the second transmitted light 13. The processing circuit 20 receives the first and second electric signals 15 and 16 and determines the power P1 of the first incident light 8, the power P2 of the second incident light 9, and the phase difference $\phi$. The phase difference $\phi$ can be determined by using the method described with reference to FIGS. 19A and 19B. The processing circuit 20 outputs information representing the phase difference $\phi$ as the information (electric signal 18) regarding the structure of the object 21. The value of the change (step) S in thickness can be determined from the information representing the phase difference $\phi$ by using Equation (26). The processing circuit 20 may calculate the value of S on the basis of the phase difference $\phi$ and may output the electric signal 18 containing information regarding the S value.

Since the power of the emitted light 26 emitted from the light source 25 is known, transmittance or reflectance of the object 21 can be determined from the power of the first incident light 8 and the power of the second incident light 9. The processing circuit 20 may output a signal representing the transmittance or reflectance of the object 21 thus determined. As described above, "information regarding the structure of an object" used herein can include information representing at least one of the phase difference between the first incident light 8 and the second incident light 9, a spatial change in thickness of the object, and transmittance or reflectance of the object.

The light detection system may include the coherent light source 25, for example, a laser light source, or the light source 25 may be an external element. The light source 25 may be included in the light detection device 280. The light detection system may include elements other than those illustrated in FIG. 20A. For example, the light detection system may include a microlens array including a plurality of microlenses between the object 21 and the substrate 400. The microlens array condenses the first incident light 8 and the second incident light 9 from the object 21 to the light incident portions 44 and 45, respectively. With such a configuration, optical coupling efficiency to the first and second optical propagation paths 35 and 36 improves.

For example, the light detection system may include, between the substrate 400 and the object 21, a bandpass filter that selectively allows light having a specific wavelength range in use to pass. Such a bandpass filter may be disposed in front of the first photodetector 6 and the second photodetector 7.

FIG. 20B is a diagram illustrating a modification of the light detection system according to the sixth embodiment. As illustrated in FIG. 20B, the light detection device 280 may include, between the object 21 and the substrate 400, a polarization element 50 that allows specific polarization components of incident light to pass. The polarization element 50 may be, for example, a linear polarizer or an elliptical polarizer. With the polarization element 50, light containing more polarization components that gives a large |P1−P2| value among TE polarization components and TM polarization components can be incident on the substrate 400. As a result, the detection sensitivity can be increased.

Modification of Photodetector Device

A modification of the light detection device according to the sixth embodiment will be described next.

Figure 21A:
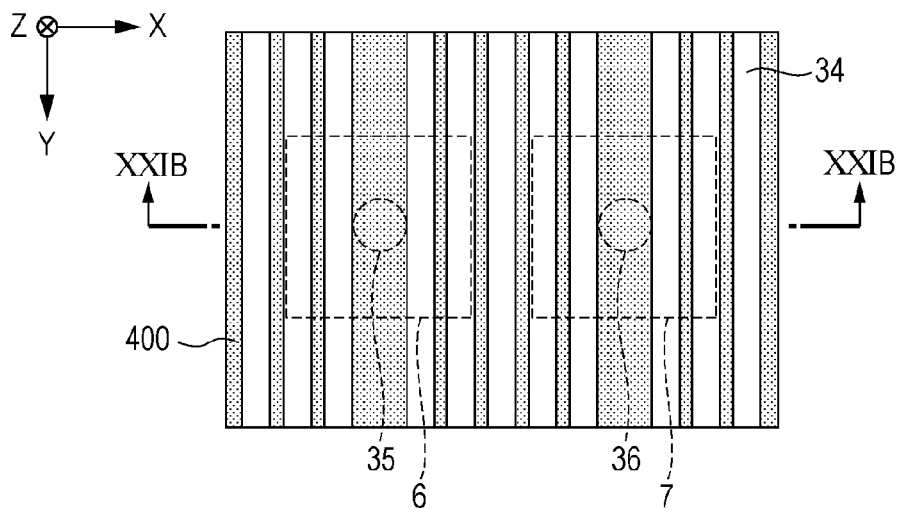
FIG. 21A is a first diagram illustrating the configuration of a light detection device according to a modification of the sixth embodiment.
Figure 21B:
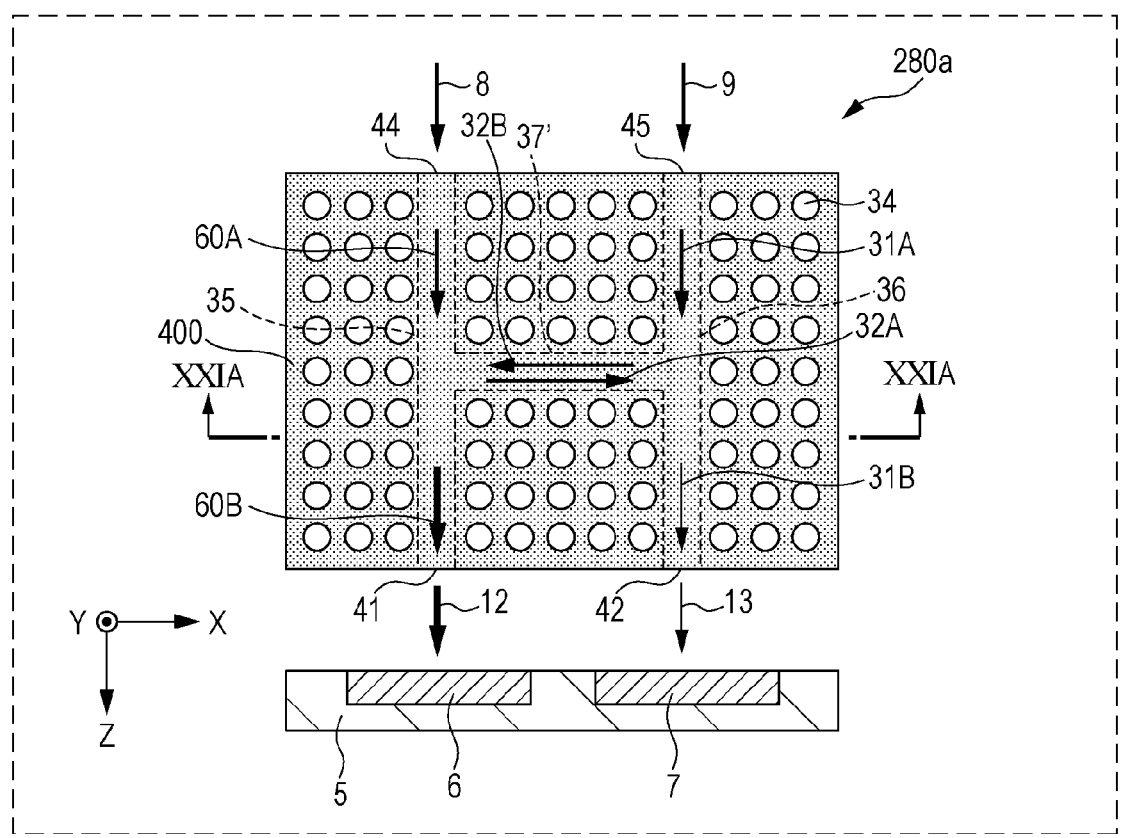
FIG. 21B is a second diagram illustrating the configuration of the light detection device according to the modification of the sixth embodiment.

FIGS. 21A and 21B are diagrams schematically illustrating the configuration of a light detection device 280a according to the modification of the sixth embodiment. Specifically, FIG. 21A illustrates a cross-section taken along line XXIA-XXIA illustrated in FIG. 21B, and FIG. 21B illustrates a cross-section taken along line XXIB-XXIB illustrated in FIG. 21A.

The light detection device 280a according to this modification has a structure in which a plurality of cavities 34 having a circular cylindrical shape extending in the Y direction are periodically arranged in a tetragonal lattice pattern when viewed from the Y direction. A third optical propagation path 37' in this modification extends linearly in the X direction, and connects a middle or halfway portion of the first optical propagation path 35 and a middle or halfway portion of the second optical propagation path 36. Even with such a configuration, information regarding an object can be quantitatively determined without any complex operations just like the light detection device 280 described above.

Seventh Embodiment

A light detection device according to a seventh embodiment of the present disclosure will be described next.

Figure 22:
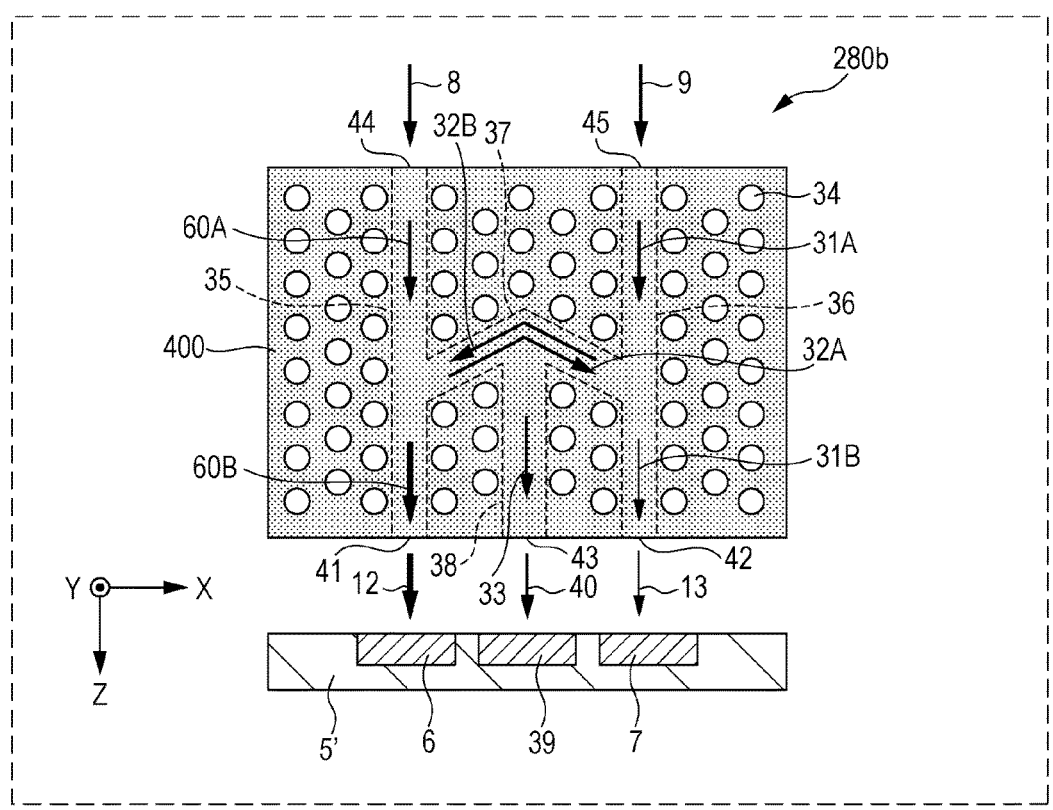
FIG. 22 is a cross-sectional view schematically illustrating the configuration of a light detection device according to a seventh embodiment of the present disclosure.

FIG. 22 is a cross-sectional view schematically illustrating the configuration of a light detection device 280b according to the seventh embodiment. Differences of the light detection device 280b according to the seventh embodiment from the light detection device 280 according to the sixth embodiment will be described below. In the seventh embodiment, a light detector 5' includes a third photodetector 39 between the first photodetector 6 and the second photodetector 7. Further, the substrate 400 has a fourth optical propagation path 38 that extends in a direction from a middle or halfway portion of the third optical propagation path 37 toward the third photodetector 39. A light exiting portion 43 of the fourth optical propagation path 38 opposes the third photodetector 39.

At least part of the first incident light 8 that has passed through the first optical propagation path 35, which serves as the first transmitted light 12, is incident on the first photodetector 6. At least part of the second incident light 9 that has passed through the second optical propagation path 36, which serves as the second transmitted light 13, is incident on the second photodetector 7. At least part of the first incident light 8 and the second incident light 9 that have passed through the third optical propagation path 37 and the fourth optical propagation path 38, which serves as third transmitted light 40, is incident on the third photodetector 39.

Also in the seventh embodiment, an object is irradiated with coherent light, such as laser beams, and transmitted light or reflected (including the first incident light 8 and the second incident light 9 that are adjacent to each other) from the object is incident on the substrate 400. At that time, the third propagating light 32A and the third propagating light 32B that propagate in the opposite directions are excited and interfere with each other in the third optical propagation path 37. The inventors have found that the amounts (powers) of the first propagating light 60B, the second propagating light 31B, the third propagating light 32A and 32B, and fourth propagating light 33 change depending on the degree of interference between the third propagating light 32A and the third propagating light 32B, and consequently, powers of the first transmitted light 12, the second transmitted light 13, and the third transmitted light 40 also change. Accordingly, a coherence difference (or a phase difference) between the first incident light 8 and the second incident light 9 can be detected by detecting the powers of the first transmitted light 12, the second transmitted light 13, and the third transmitted light 40 by using the first photodetector 6, the second photodetector 7, and the third photodetector 39, respectively.

Figure 23A:
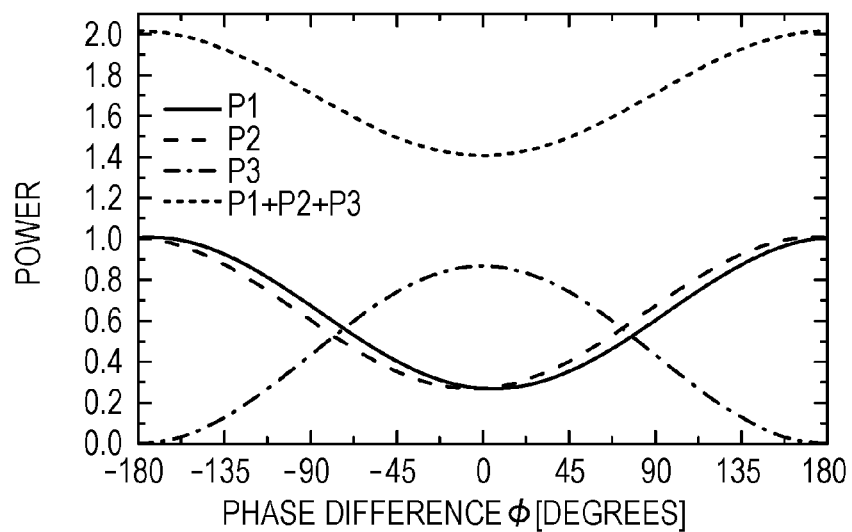
FIG. 23A is a graph showing a relationship among a phase difference $\phi$ between the two incident rays, powers P1, P2, and P3 of the transmitted rays, and the sum (P1+P2+P3) of the powers in the light detection device according to the seventh embodiment.
Figure 23B:
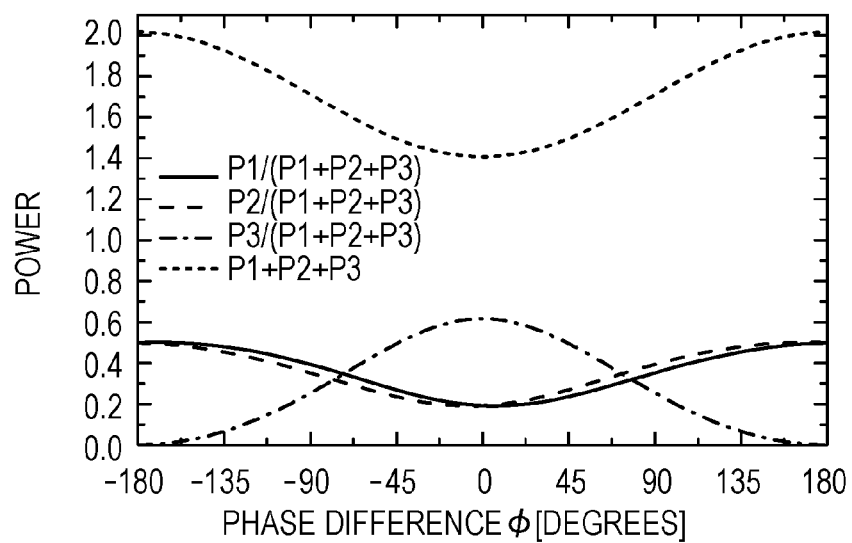
FIG. 23B is a graph showing a relationship among a phase difference $\phi$ between the two incident rays, normalized powers P1/(P1+P2+P3), P2/(P1+P2+P3), and P3/(P1+P2+P3) of the transmitted rays, and the sum (P1+P2+P3) of the powers in the light detection device according to the seventh embodiment.

FIG. 23A is a graph showing a relationship among a phase difference $\phi$ between the first incident light 8 and the second incident light 9, powers P1, P2, and P3 of the first transmitted light 12, the second transmitted light 13, and the third transmitted light 40, and the sum (P1+P2+P3) of the powers in the light detection device 280b according to the seventh embodiment. FIG. 23B is a graph showing a relationship among a phase difference $\phi$ between the first incident light 8 and the second incident light 9, normalized powers P1/(P1+P2+P3), P2/(P1+P2+P3), and P3/(P1+P2+P3) of the first transmitted light 12, the second transmitted light 13, and the third transmitted light 40, and the sum (P1+P2+P3) of the powers in the light detection device 280b. FIGS. 23A and 23B illustrate exemplary results of electromagnetic field analysis performed by using the FDTD method for linearly polarized light whose electric-field direction is the X direction as in FIGS. 19A and 19B. Highly coherent laser beams having the same wavelength $\lambda$ and the same power (normalized power of 1) are used as the first incident light 8 and the second incident light 9. As illustrated using a solid line, a dash line, and a dot-and-dash line in FIG. 23A, the power P1 of the first transmitted light 12, the power P2 of the second transmitted light 13, and the power P3 of the third transmitted light 40 change depending on the phase difference $\phi$ between the first incident light 8 and the second incident light 9. The power P1 becomes the largest at around $\phi=-170°$ and becomes the smallest at around $\phi=10°$. The power P2 becomes the largest at around $\phi=170°$ and becomes the smallest at around $\phi=-10°$. The power P3 becomes the largest at around $\phi=0°$ and becomes the smallest at around $\phi=\pm180°$. Accordingly, the phase difference $\phi$ can be uniquely quantified in a range from $-180°$ to $180°$ from the powers P1, P2, and P3 on the basis of these curves. That is, the phase difference $\phi$ between the first incident light 8 and the second incident light 9 can be uniquely detected by detecting the powers P1, P2, and P3 using the first photodetector 6, the second photodetector 7, and the third photodetector 39, respectively.

Values P1/(P1+P2+P3), P2/(P1+P2+P3), and P3/(P1+P2+P3), which are obtained by dividing the powers P1, P2, and P3 by (P1+P2+P3), may be used as normalized powers instead of the powers P1, P2, and P3 as illustrated in FIG. 23B. In this case, P1/(P1+P2+P3)=P2/(P1+P2+P3)=0.5 is maintained at $\phi=\pm180°$ even if (P1+P2+P3) changes. Accordingly, this configuration is convenient for quantification based on the measured values.

With the light detection device 280b according to the seventh embodiment, the sum (P1+P2+P3) of the powers detectable by the light detector 5' significantly improves in a range where $|\phi|$ is small (e.g., $-90°<\phi<90°$) compared with the light detection device 280 according to the sixth embodiment (see the dot lines in FIGS. 23A and 23B). That is, according to the seventh embodiment, the light utilization efficiency improves more than in the sixth embodiment. In the light detection device 280 according to the sixth embodiment, many reflected light components that exit in the –Z direction from the light incident portions 44 and 45 of the first and second optical propagation paths 35 and 36 occur. In contrast, in the light detection device 280b according to the seventh embodiment, the fourth propagating light 33 that propagates through the fourth optical propagation path 38 is excited as a result of providing the fourth optical propagation path 38, and it is considered that the reflected light components that exit from the light incident portions 44 and 45 are reduced accordingly.

Eighth Embodiment

A light detection device according to an eighth embodiment of the present disclosure will be described next.

Figure 24A:
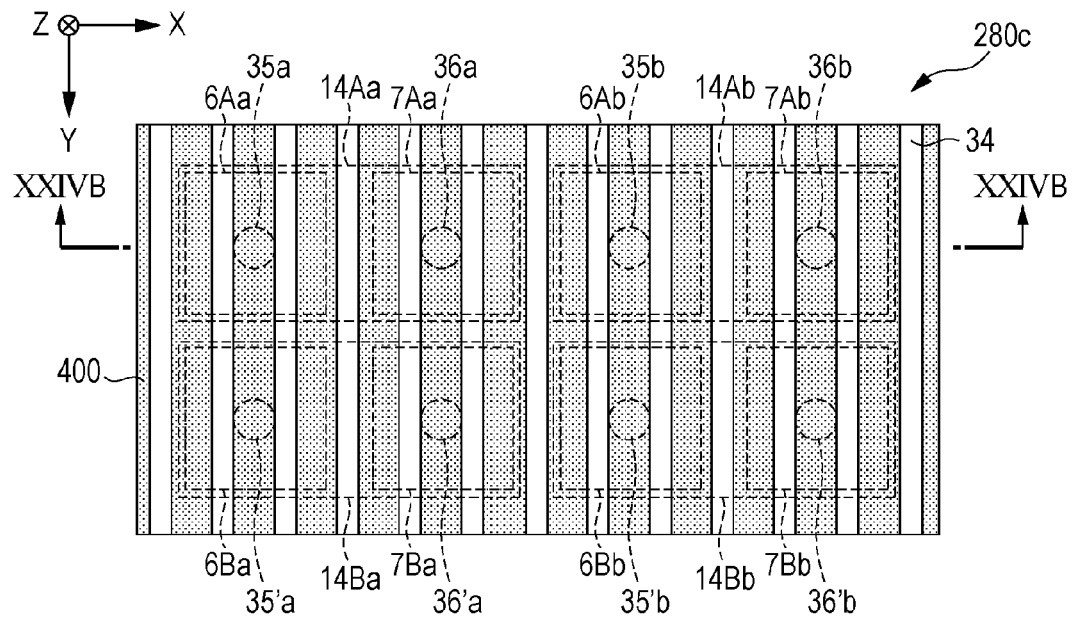
FIG. 24A is a first diagram schematically illustrating the configuration of a light detection device according to an eighth embodiment of the present disclosure.
Figure 24B:
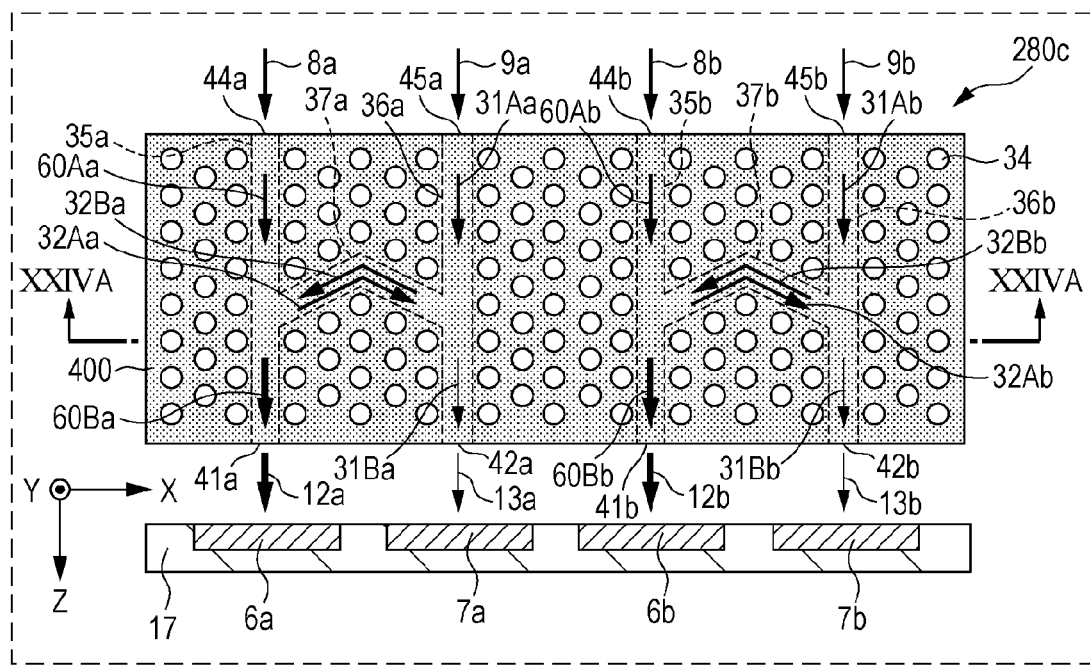
FIG. 24B is a second diagram schematically illustrating the configuration of the light detection device according to the eighth embodiment of the present disclosure.

FIGS. 24A and 24B are diagrams schematically illustrating the configuration of a light detection device 280c according to the eighth embodiment. FIG. 24A illustrates a cross-sectional taken along line XXIVA-XXIVA illustrated in FIG. 24B. FIG. 24B illustrates a cross-sectional taken along line XXIVB-XXIVB illustrated in FIG. 24A. In the following description, illustrated detection units 14Aa, 14Ab, 14Ba, and 14Bb, and so on are collectively referred to as "detection units 14". The same applies to other reference signs.

The light detection device 280c according to the eighth embodiment differs from the light detection device 280 according to the sixth embodiment in that the light detection device 280c includes a plurality of detection units 14. Each of the plurality of detection units 14 has a configuration similar to that of the light detection device 280 according to the sixth embodiment. Specifically, each of the detection units 14 includes the first optical propagation path 35, the second optical propagation path 36, the third optical propagation path 37, the first photodetector 6, and the second photodetector 7. The plurality of detection units 14 share the substrate 400. The substrate 400 is arranged across the first and second photodetectors 6 and 7 of the detection units 14. Each of the detection units 14 is arranged over the first and second photodetectors 6 and 7. In the eighth embodiment, the light detector is an image sensor 17. The plurality of detection units 14 are arranged two-dimensionally along the X and Y directions. Although FIG. 24A illustrates only four detection units 14Aa, 14Ab, 14Ba, and 14Bb, the number of detection units 14 may be five or more or three or less. FIG. 24B omits illustration of wirings used to output electric signals from the image sensor 17.

The light detection device 280c according to the eighth embodiment allows (an incident light set of) the first incident light 8 and the second incident light 9 that are adjacent to each other out of transmitted light or reflected light from the object to be incident on each of the detection units 14 and detects the light. In this way, two-dimensional information of the object is successfully determined quantitatively. More specifically, the surface step, the spatial thickness change of the object, or the refractive index distribution can be determined for each detection unit 14 by using the method described in the sixth embodiment. In this way, two-dimensional information regarding the structure of the object can be obtained.

In the configuration illustrated in FIG. 24A, the plurality of detection units 14 are arranged two-dimensionally along the X direction and the Y direction. Such an arrangement is sometimes referred to as an arrangement in a strip pattern herein. The plurality of detection units 14 may be arranged in a pattern different from this pattern. For example, the plurality of detection units 14 may be arranged in a staggered pattern. Herein, an "arrangement in the staggered pattern" indicates an arrangement in which the X-direction position of the detection units 14 in a certain row is shifted from the X-direction position of the detection units 14 in another row adjacent to the certain row by a half cycle or an arrangement in which the Y-direction position of the detection units 14 in a certain column is shifted from the Y-direction position of the detection units 14 in another column adjacent to the certain column by a half cycle. With such an arrangement, the detection resolution can be substantially increased.

The plurality of detection units 14 may include first detection units that detect information regarding one direction (e.g., the X direction) and second detection units that detect information regarding a direction (e.g., the Y direction) perpendicular to the one direction. Since the first photodetector 6 and the second photodetector 7 are arranged along the X direction in each of the detection units 14 illustrated in FIGS. 24A and 24B, information (e.g., thickness or spatial refractive index distribution of the object) regarding the X direction can be detected. By providing detection units 14 in which the first photodetector 7 and the second photodetector 7 are arranged along the Y direction in addition to this configuration, information regarding the Y direction can also be detected. In this way, the accuracy of quantitative measurement of the object can be increased.

Ninth Embodiment

A light detection device according to a ninth embodiment of the present disclosure will be described next.

Figure 25A:
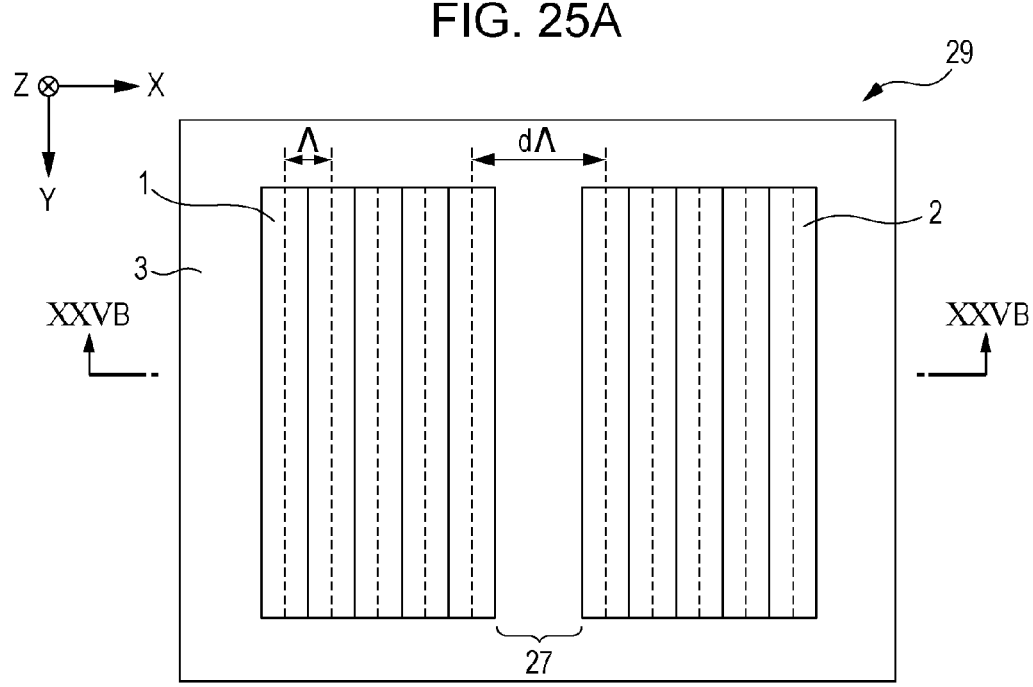
FIG. 25A is a plan view schematically illustrating the configuration of a light detection device according to a ninth embodiment of the present disclosure.
Figure 25B:
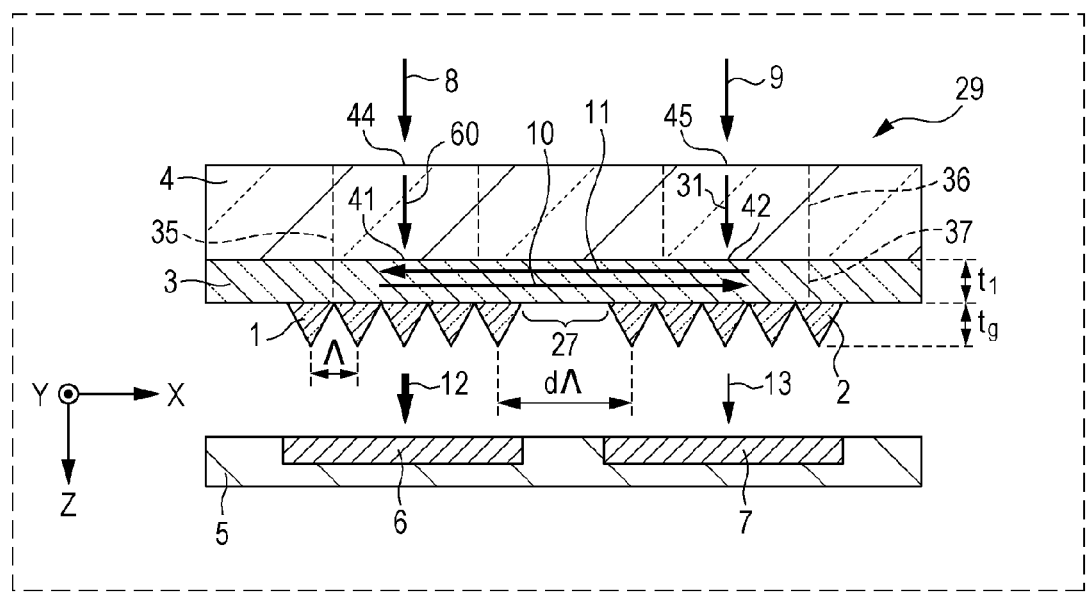
FIG. 25B is a cross-sectional view taken along line XXVB-XXVB illustrated in FIG. 25A.

FIG. 25A is a plan view schematically illustrating the configuration of a light detection device 29 according to a ninth embodiment. FIG. 25A illustrates the structure of the light detection device 29 when viewed from the light incident side. FIG. 25B is a cross-sectional view taken along line XXVB-XXVB illustrated in FIG. 25A.

The light detection device 29 according to the ninth embodiment includes, between the second layer 4 and the light detector 5, the first layer 3, the first optical coupler 1, and the second optical coupler 2. The first layer 3 is a light-transmissive layer. The first optical coupler 1 is light-transmissive and opposes the first photodetector 6 on the surface of the first layer 3. The second optical coupler 2 is light-transmissive and opposes the second photodetector 7 on the surface of the first layer 3. The first layer 3 has a refractive index higher than that of the second layer 4. The first optical coupler 1 is a light-transmissive member that couples part of the first incident light 8 to an optical waveguide in the first layer 3. The second optical coupler 2 is a light-transmissive member that couples part of the second incident light 9 to an optical waveguide in the first layer 3. Herein, the expression "something is light-transmissive" means that something has a property of allowing at least part of incident light to pass therethrough.

The first and second optical couplers 1 and 2 form optical waveguides in the first layer 3. In the ninth embodiment, the first optical propagation path 35 is a region of the second layer 4 where the first incident light 8 propagates. The light exiting portion 41 of the first optical propagation path 35 opposes the first optical coupler 1 with the first layer 3 interposed therebetween. The second optical propagation path 36 is a region of the second layer 4 where the second incident light 9 propagates. The light exiting portion 42 of the second optical propagation path 36 opposes the second optical coupler 2 with the first layer 3 interposed therebetween. The third optical propagation path 37 is an optical waveguide formed in the first layer 3 by the first and second optical couplers 1 and 2.

The first, second, and third optical propagation paths 35, 36, and 37 are formed by the plurality of cavities 34 in the substrate 400 in the sixth embodiment. In contrast, in the ninth embodiment, the first, second, and third optical propagation paths 35, 36, and 37 are formed by using the second layer 4 and the first layer 3 which are substantially uniform light-transmissive medium and the first and second optical couplers 1 and 2 disposed on the surface of the first layer 3. When the first incident light 8 and the second incident light 9 are incident on the upper surface (the light incident portions 44 and 45) of the second layer 4, the first incident light 8 and the second incident light 9 propagate as the first propagating light 60 and the second propagating light 31, respectively. In the ninth embodiment, light paths along which the first propagating light 60 and the second propagating light 31 propagates in the second layer 4 are virtually assumed as the first optical propagation path 35 and the second optical propagation path 36, respectively. The third optical propagation path 37 connects the end of the first optical propagation path 35 and the end of the second optical propagation path 36. For ease of understanding, FIG. 25B illustrates regions of the first optical propagation path 35, the second optical propagation path 36, and the third optical propagation path 37 by using dash lines; however, clear boundaries do not necessarily exist.

The first optical coupler 1 allows part of the first incident light 8 to propagate through the first layer 3 at least in the first direction (X direction), that is, in a direction toward the second optical coupler 2 (guided light 10). The second optical coupler 2 allows part of the second incident light 9 to propagate through the first layer 3 at least in a direction (−X direction) opposite to the first direction, that is, in a direction toward the first optical coupler 1 (guided light 11). In this way, interference between the guided light 10 and the guided light 11 occurs in the third optical propagation path 37 in the first layer 3. At least part of the first incident light 8 that has passed through the first optical propagation path 35, the first layer 3, and the first optical coupler 1 is incident on the first photodetector 6 as the first transmitted light 12. At least part of the second incident light 9 that has passed through the second optical propagation path 36, the first layer 3 and the second optical coupler 2 is incident on the second photodetector 7 as the second transmitted light 13.

The first optical propagation path 35 and the second optical propagation path 36 are not necessarily configured to be optical waveguides having dimensions corresponding to the wavelength in use. The first optical propagation path 35 and the second optical propagation path 36 may have any given dimensions as long as the first propagating light 60 and the second propagating light 31 propagate through the second layer 4. The first optical propagation path 35 and the second optical propagation path 36 may be, for example, optical propagation paths having dimensions of millimeter order.

Each of the first optical coupler 1 and the second optical coupler 2 in the ninth embodiment is a grating (diffraction grating). In the following description, the first optical coupler 1 is sometimes referred to as a "first grating 1", and the second optical coupler 2 is sometimes referred to as a "second grating 2". Each of the first grating 1 and the second grating 2 according to the ninth embodiment has a structure in which a plurality of light-transmissive members each having a protrusion extending in the Y direction (second direction) are arranged periodically along the X direction (first direction) on the surface of the first layer 3. Two adjacent light-transmissive members define a groove extending in the Y direction therebetween. In the ninth embodiment, the plurality of light-transmissive members are arranged at a period $\Lambda$ that is shorter than a wavelength $\lambda$ of the first incident light 8 and the second incident light 9 in the air ($\Lambda<\lambda$). In the ninth embodiment, the light-transmissive members have a triangular cross-section. The plurality of light-transmissive members that constitute the first grating 1 and the second grating 2 can have various structures as described below. The first grating 1, the second grating 2, and the first layer 3 may be a single structure composed of the same material.

The period $\Lambda$ and the wavelength $\lambda$ can be set, for example, such that $\Lambda=0.45$ μm and $\lambda=0.85$ μm although they can be set differently depending on the object to be observed. As a result of setting the period $\Lambda$ to be smaller than the wavelength $\lambda$, only transmitted light and reflected light which are 0-th order diffracted light occur in the air when the first incident light 8 and the second incident light 9 are respectively incident on the first optical coupler 1 and the second optical coupler 2. Since diffracted light of ±1st order or higher is not emitted to the outside, the light utilization efficiency is high and stray light can be reduced.

The first layer 3 is designed to function as an optical waveguide (having a thickness $t_1$) for incident light of $\lambda=0.85$ μm. The second layer 4 is designed to function as a buffer layer. The thickness $t_1$ of the first layer 3 (optical waveguide) is designed so that waveguide modes can exist. The first layer 3 (optical waveguide) has a refractive index $n_1$ that is larger than a refractive index $n_2$ of the second layer 4 ($n_1>n_2$).

In the light detection device 29 according to the ninth embodiment, the first layer 3, the first optical coupler 1, and the second optical coupler 2 can be composed of tantalum pentoxide $Ta_2O_5$ ($n_2=2.11$). The second layer 4 may be a quartz substrate composed of silicon dioxide $SiO_2$ ($n_2=1.45$) or a glass substrate such as BK 7. In such a case, known waveguide-mode characteristic equations indicate that there are waveguide modes for TE and TM modes if $t_1 \geq 0.13$ Accordingly, in this case, the thickness $t_1$ of the first layer 3 can be set to a thickness that is sufficiently larger than 0.13 μm (for example, $t_1=0.3$ μm).

Various materials other than $Ta_2O_5$ can be used for the first layer 3, the first optical coupler 1, and the second optical coupler 2. Likewise, various materials other than $SiO_2$ can be used for the second layer 4. Materials that are transparent for incident light having a wavelength in use may be used. For example, inorganic materials, such as one or a plurality of oxides selected from $ZrSiO_4$, $(ZrO_2)_{25}(SiO_2)_{25}(Cr_2O_3)_{50}$, SiCr, $TiO_2$, $ZrO_2$, $HfO_2$, ZnO, $Nb_2O_5$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$, for example, can also be used as the materials of the first layer 3, the first optical coupler 1, the second optical coupler 2, and the second layer 4. In addition, one or a plurality of nitrides selected from C—N, Ti—N, Zr—N, Nb—N, Ta—N, Si—N, Ge—N, Cr—N, Al—N, Ge—Si—N, and Ge—Cr—N, for example, can also be used as the materials of the first layer 3, the first optical coupler 1, the second optical coupler 2, and the second layer 4. Further, a sulfide such as ZnS, a carbide such as SiC, or a fluoride such as $LaF_3$, $CeF_3$, or $MgF_2$ can also be used as materials of the first layer 3, the first optical coupler 1, the second optical coupler 2, and the second layer 4. In addition, the first layer 3, the first optical coupler 1, the second optical coupler 2, and the second layer 4 may be formed by using a mixture of a plurality of materials selected from the above materials.

Further, the materials of the first layer 3, the first optical coupler 1, the second optical coupler 2, and the second layer 4 may be organic materials such as resins, for example, a polycarbonate resin, polymethyl methacrylate (PMMA), a norbornene resin (sold under the trademark ARTON by JSR Corporation, for example), or a cyclo-olefin resin (sold under the trademark "ZEONEX" by ZEON CORPORATION, for example). Materials that satisfy a relationship between the refractive indices of $n_1>n_2$ may be selected for the first layer 3 and the second layer 4.

Although the first layer 3, the first optical coupler 1, and the second optical coupler 2 are composed of the same material in the ninth embodiment, they may be composed of different materials.

If incident light is linearly polarized light (TE-polarized light) whose electric field oscillates in the Y direction (that is, if the electric-field direction of incident light is parallel to the direction in which the grooves of the gratings extend), guided light of the TE mode is excited in the first layer 3. On the other hand, if incident light is linearly polarized light (TM-polarized light) whose electric field oscillates in the X direction (that is, the magnetic-field direction of the light is parallel to the direction in which the grooves of the gratings extend), guided light of the TM mode is excited in the first layer 3. Accordingly, the mode of the guided light can be changed by changing the polarization direction of incident light.

In the ninth embodiment, the cross-section of the first grating 1 and the second grating 2 that is parallel to the X-Z plane is an isosceles triangle shape. A depth $t_g$ of the grooves of the first optical coupler 1 and the second optical coupler 2 can be set such that $t_g=0.3$ μm, for example. The shape and dimensions of the first optical coupler 1 and the second optical coupler 2 are not limited to this example, and the first optical coupler 1 and the second optical coupler 2 may have different shape and dimensions.

When the first incident light 8 and the second incident light 9 are respectively incident on the first optical coupler 1 and the second optical coupler 2, guided light is excited in the first layer 3 if Equation (27) below is satisfied.

$$\sin\theta = N - m\lambda/\Lambda \tag{27}$$

In Equation (27), N denotes the effective refractive index in the optical waveguide (the first layer 3), θ denotes the incident angle of light with respect to the Z direction, and m denotes the diffraction order. If the period Λ of the light-transmissive members of the gratings 1 and 2 is set to a value that satisfies Equation (27), part of the first incident light 8 and the second incident light 9 are coupled to the optical waveguide in the first layer 3 and guided light is excited. For example, when the first-order diffracted light (m=1) that couples relatively easily is incident vertically (θ=0), Equation (27) is modified to Equation (28) below.

$$\Lambda = \lambda/N \tag{28}$$

For the structure described above, $\Lambda \approx 0.45$ μm is calculated from waveguide-mode characteristic equations.

The waveguide-mode characteristic equations indicate that the effective reflective index N changes as the thickness $t_1$ of the first layer 3. When the waveguide modes exist, N satisfies Inequality (29) below.

$$n_2 < N < n_1 \tag{29}$$

Inequality (29) can be modified into Inequality (30) by using Equation (27).

$$m\lambda/(n_1-\sin\theta) < \Lambda < m\lambda/(n_2-\sin\theta) \tag{30}$$

When θ=0 and m=1 hold, Λ satisfies Inequality (31) below.

$$\lambda/n_1 < \Lambda < \lambda/n_2 \tag{31}$$

When the first incident light 8 and the second incident light 9 from the object are incident on the second layer 4, the first incident light 8 and the second incident light 9 become first propagating light 60 and second propagating light 31, respectively. The first propagating light 60 and the second propagating light 31 pass through the first layer 3 and are incident on the first optical coupler 1 and the second optical coupler 2, respectively.

Guided light excited in the optical waveguide (third optical propagation path 37) in the first layer 3 by each of the first optical coupler 1 and the second optical coupler 2 propagates both in the +X direction and the −X direction. Among these guided light, FIG. 25B illustrates guided light 10 that is excited by the first incident light 8 and propagates in the +X direction and guided light 11 that is excited by the second incident light 9 and propagates in the −X direction. Since the guided light 10 and the guided light 11 travel in the opposite directions, they interfere within the first layer 3.

Although part of the first incident light 8 and part of the second incident light 9 become guided light in this manner, most of the first incident light 8 and the second incident light 9 pass through the first layer 3 and become transmitted light 12 and transmitted light 13, respectively. The transmitted light 12 and the transmitted light 13 are detected by the first photodetector 6 and the second photodetector 7, respectively.

The inventors have found that the structure (for example, a change in thickness or a refractive index distribution) of an object can be quantitatively determined by irradiating the object with coherent light, such as laser beams, and detecting reflected light or transmitted light from the object by using the light detection device 29 according to the ninth embodiment. The inventors also found that, when two adjacent light beams of light from the object are set as the first incident light 8 and the second incident light 9, amounts (powers) of the transmitted light 12 and the transmitted light 13 change depending on the degree of interface between the guided light 10 and the guided light 11. That is, a coherence difference (or a phase difference) between the first incident light and the second incident light is detectable by detecting the amounts of the transmitted light 12 and the transmitted light 13 by using the first photodetector 6 and the second photodetector 7, respectively.

Phase information of the transmitted light or the reflected light changes depending on the structure (for example, a change in thickness or inside refractive index distribution) of the object. Accordingly, a change in thickness or a refractive index distribution of the object can be quantitatively determined by detecting the coherence difference (or the phase difference) between the first incident light 8 and the second incident light 9.

In the configuration illustrated in FIG. 25A, a distance between the peaks or centers of two most adjacent protrusions of the first optical coupler (first grating) 1 and the second optical coupler (second grating) 2 is larger than the period Λ. That is, the first grating 1 and the second grating 2 have a flat portion (referred to as a "spacing region 27") therebetween, and the length of the spacing region 27 along the X direction is larger than zero.

It is assumed that the distance between the most adjacent peaks of the first grating 1 and the second grating 2 is equal to a value dΛ that is a product of the period Λ by a constant d. This constant d is referred to as a "distance constant d". In the case of d=1, the distance between the most adjacent peaks is equal to Λ. Accordingly, the first grating 1 and the second grating 2 are formed closely, and there is no spacing region 27 therebetween. On the other hand, in the case of d>1 as in the ninth embodiment, the spacing region 27 exists between the first grating 1 and the second grating 2.

Since each of the protrusions of the first grating 1 and the second grating 2 has a symmetrical cross-section in the ninth embodiment, the distance between peaks is equal to the distance between the centers. In contrast, when each of the protrusions has an asymmetrical cross-section (for example, an asymmetrical triangular shape), the distance between the peaks is not equal to the distance between the centers. The distance between the peaks of two most adjacent protrusions of the first grating 1 and the second grating 2 can be set to $d\Lambda$ also when gratings having an asymmetrical cross-section are used.

Figure 26A:
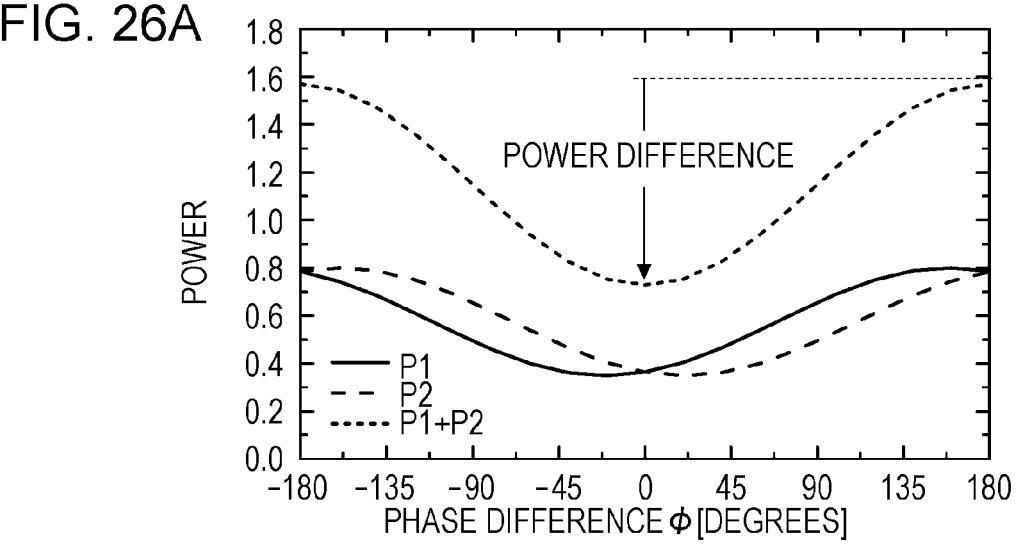
FIG. 26A is a graph showing a relationship among a phase difference $\phi$ between the two incident rays, powers P1 and P2 of the transmitted rays, and the sum (P1+P2) of the powers in the case where the distance constant d=1 in the light detection device according to the ninth embodiment.
Figure 26B:
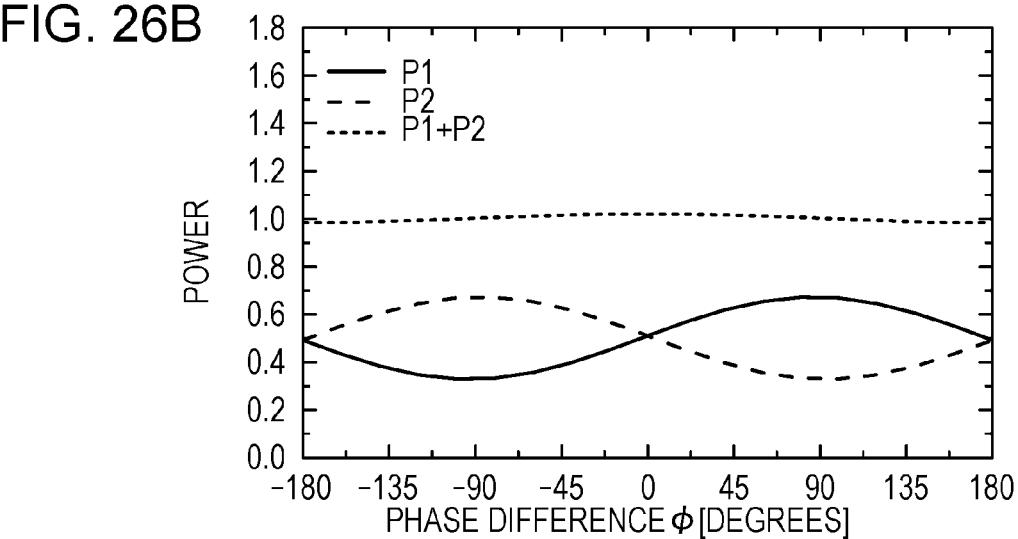
FIG. 26B is a graph showing a relationship among a phase difference $\phi$ between the two incident rays, powers P1 and P2 of the transmitted rays, and (P1+P2) in the case where the distance constant d=1.19 in the light detection device according to the ninth embodiment.
Figure 26C:
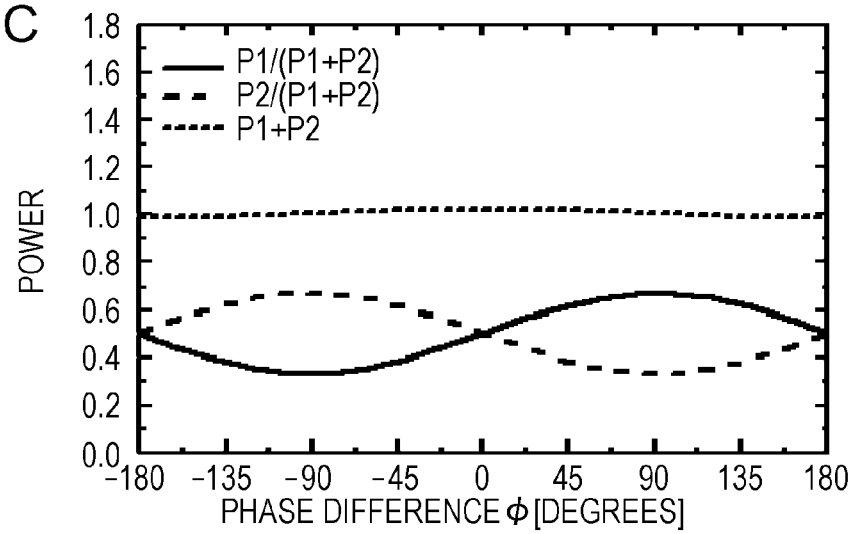
FIG. 26C is a graph showing a relationship among a phase difference $\phi$ between the two incident rays, normalized powers P1/(P1+P2) and P2/(P1+P2) of the transmitted rays, and the sum (P1+P2) of the powers in the light detection device according to the ninth embodiment.

FIG. 26A is a graph showing a relationship among a phase difference $\phi$ between the first incident light 8 and the second incident light 9, powers P1 and P2 of the first transmitted light 12 and the second transmitted light 13, and the sum (P1+P2) of the powers in the case where the distance constant d=1 in the light detection device 29. FIG. 26B is a graph showing a relationship among a phase difference $\phi$ between the first incident light 8 and the second incident light 9, powers P1 and P2 of the first transmitted light 12 and the second transmitted light 13, and the sum (P1+P2) of the powers in the case where the distance constant d=1.19 in the light detection device 29. FIG. 26C is a graph showing a relationship among a phase difference $\phi$ between the first incident light 8 and the second incident light 9, normalized powers P1/(P1+P2) and P2/(P1+P2) of the first transmitted light 12 and the second transmitted light 13, and the sum (P1+P2) of the powers in the case where the distance constant d=1.19 in the light detection device 29. FIGS. 26A to 26C illustrate exemplary results of electromagnetic field analysis performed by using the FDTD method for TM-polarized light whose electric-field direction is the X direction.

In this analysis, highly coherent laser beams having the same wavelength $\lambda$ and the same power (normalized power of 1) are used as the first incident light 8 and the second incident light 9. The phase difference $\phi$ [degrees] is a phase difference of the second incident light 9 with respect to the phase of the first incident light 8. As illustrated using a solid line and a dash line in FIG. 26A, the power P1 of the first transmitted light 12 and the power P2 of the second transmitted light 13 change depending on the phase difference $\phi$ between the first incident light 8 and the second incident light 9. The power P1 becomes the largest at around $\phi=160°$ and becomes the smallest at around $\phi=-20°$. The power P2 becomes the largest at around $\phi=-160°$ and becomes the smallest at around $\phi=20°$. Accordingly, the phase difference $\phi$ can be uniquely quantified in a range from $-180°$ to $180°$ from the powers P1 and P2 on the basis of these curves. That is, the phase difference $\phi$ between the first incident light 8 and the second incident light 9 can be uniquely detected by detecting the powers P1 and P2 using the first photodetector 6 and the second photodetector 7, respectively.

FIGS. 26A to 26C illustrate results of the case where guided light of the TM mode is excited by using the first incident light 8 and the second incident light 9, each of which is TM-polarized light. When the first grating 1 and the second grating 2, which are fine gratings, are used as in the ninth embodiment, polarization dependency occurs and the largest value of |P1−P2| in response to the change in the phase difference differs between the case where guided light of the TE mode is excited and the case where guided light of the TM mode is excited. In the ninth embodiment, the largest value of |P1−P2| of the case where guided light of the TM mode is excited is about 5.5 times as large as that of the case where guided light of the TE mode is excited.

Accordingly, in the light detection device 29 according to the ninth embodiment, the SN ratio can be increased in the case of using linearly polarized light (TM-polarized light in the ninth embodiment) that makes the largest value of |P1−P2| larger, compared with the case of using non-polarized incident light. Thus, the detection sensitivity can be increased by using the first incident light 8 and the second incident light 9 (linearly polarized light or elliptically polarized light) mainly containing TM-polarized light (that is, containing more TM-polarization components than TE-polarization components). The light detection device 28 may include, as a configuration for implementing the higher detection sensitivity, a polarization element (for example, linear polarizer or elliptical polarizer) that allows more TM-polarized light to be incident on the first grating 1 and the second grating 2 than TE-polarized light. Such a polarization element is disposed between the object and the first and second gratings 1 and 2 or between the light source and the object. Alternatively, for example, a semiconductor laser light source that emits linearly polarized light may be provided after rotation adjustment is performed so that light containing more TM-polarized light components than TE-polarized light components is emitted.

The inventors have considered that the actual powers of the first incident light 8 and the second incident light 9 could be calculated from the signal (P1+P2) obtained from the light detector 5. However, the inventors have found that the signal (P1+P2) changes in accordance with the phase difference $\phi$ as illustrated by a dot line in FIG. 26A. More specifically, the signal (P1+P2) shows the smallest or largest value at $\phi=0°$ and $180°$. Here, the absolute value of a value obtained by subtracting the power (P1+P2) at $\phi=180°$ or $-180°$ from the power (P1+P2) at $\phi=0°$ is defined as a "power difference". It is convenient when the actual powers of the first incident light 8 and the second incident light 9 are calculated if the power difference is constant.

The inventors have found that the signal (P1+P2) is barely dependent on the phase difference $\phi$ (that is, is substantially constant) if the distance constant d is set to a particular value (d>1), for example, such that d=1.19 as illustrated using a dot line in FIG. 26B because it is considered that a period at which the guided light 10 and the guided light 11 interfere (typically $\lambda/N \approx \Lambda$ from Equation (28)) is disturbed by the spacing region 27 located at the center portion. The output characteristics of the powers P1 and P2 can be controlled by changing the distance constant d the disturbance degree of the period.

As illustrated using the solid line and the dash line in FIG. 26B, the power P1 of the first transmitted light 13 and the power P2 of the second transmitted light 13 change in accordance with the phase difference $\phi$. In the case of d=1.19, the largest value of |P1−P2| is larger than that of the case of d=0. The power P1 becomes the largest at around $\phi=85°$ and becomes the smallest at around $\phi=-95°$. The power P2 becomes the largest at around $\phi=-85°$ and becomes the smallest at around $\phi=95°$. Accordingly, the phase difference $\phi$ can be quantified uniquely in a range from $-180°$ to $180°$ from the values of the powers P1 and P2 on the basis of these curves.

It can be assumed that the powers of the first incident light 8 and the second incident light 9 are proportional to the signal (P1+P2) independently from the phase difference $\phi$ when d=1.19. When the powers of the first incident light 8 and the second incident light 9 are normalized to 1, the signal (P1+P2) is equal to 1.0 as illustrated in FIG. 26B. Accordingly, the values of the powers of the first incident light 8 and the second incident light 9 can be calculated through a calculation of (P1+P2)/1.0 without using the phase difference ϕ.

Values P1/(P1+P2) and P2/(P1+P2), which are obtained by dividing the powers P1 and P2 by (P1+P2), may be used as normalized powers as illustrated in FIG. 26C. In this case, P1/(P1+P2)=P2/(P1+P2)=0.5 is maintained at ϕ=0 and ±180° even if (P1+P2) changes. Accordingly, this configuration is convenient for quantification based on the measured values.

The inventors have found that the value of d at which (P1+P2) is barely dependent on the phase difference ϕ periodically exists other than d=1.19. The wavelength of guided light in the first layer 3 (optical waveguide) is denoted by λ/N.

In the case where guided light is excited in the conditions of θ=0 (vertically incident) and m=1, λ/N=Λ is determined according to Equation (28). Thus, the wavelength of the guided light is equal to the period Λ. Accordingly, the period of d can be approximated to λ/(NΛ)≈1 for light that is incident at an angle close 90°.

Figure 27:
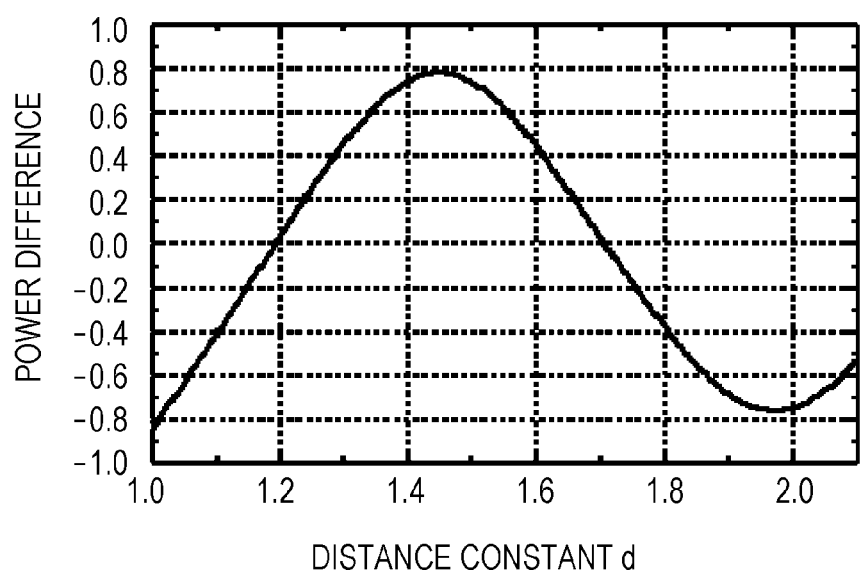
FIG. 27 is a graph showing a relationship between the distance constant d and the power difference in the light detection device according to the ninth embodiment.

FIG. 27 is a graph showing a relationship between the distance constant d and the power difference in the light detection device 29 according to the ninth embodiment.

An optimum value d making the power difference zero has been determined to be $$d=1.19+i \quad (32)$$

or $$d=1.71+i \quad (33),$$

where i is an integer of 0 or larger. For example, if i=10, d=11.19 or d=11.71. At that time, a space between the most adjacent peaks of the first optical coupler 1 and the second optical coupler 2 is dΛ=5.03 μm or dΛ=5.27 μm.

The condition of d with which the power difference is within a range from −0.5 to 0.5 is $$1.08+i \leq d \leq 1.31+i \quad (34)$$

or $$1.58+i \leq d \leq 1.83+i \quad (35).$$

The condition of d with which the power difference is within a range from −0.2 to 0.2 is $$1.15+i \leq d \leq 1.24+i \quad (36)$$

or $$1.66+i \leq d \leq 1.76+i \quad (37).$$

The condition of d with which the power difference is within a range from −0.1 to 0.1 is $$1.17+i \leq d \leq 1.21+i \quad (38)$$

or $$1.68+i \leq d \leq 1.73+i \quad (39).$$

In the case of θ≠0, the accuracy increases if N is calculated from the waveguide-mode characteristic equations and iλ/(NΛ) is used instead of i.

In the configuration described above, the first optical coupler 1 and the second optical coupler 2 are gratings in which a plurality of light-transmissive members are arranged at an equal period Λ. However, the first optical coupler 1 and the second optical coupler 2 are not limited to such gratings, and each of the first grating 1 and the second grating 2 may have a plurality of portions where a plurality of light-transmissive members are arranged at different periods. Equation (27) indicates that the preferable period Λ is dependent on the incident angle θ and the wavelength λ of light. The use of gratings having a plurality of periods can increase the ranges of the incident angle θ and the wavelength λ.

In the case where the light detection device 29 is designed to have conditions suitable for vertical incidence of light (θ=0), a change in the amount of transmitted light, which is the largest value of |P1−P2| in response to a change in the phase difference ϕ, decreases if the incident angle of the light changes. The full width at half maximum is, for example, approximately ±4° which is relatively narrow. If the first grating 1 and the second grating 2 have a plurality of periods, this angle range can be increased. Preferable values of the period Λ at θ=±5° are 0.43 μm and 0.47 μm. Thus, if the first grating 1 and the second grating 2 are configured as chirped gratings in which the period Λ gradually changes from 0.43 μm to 0.47 μm, for example, the light detection device 29 having good oblique incidence characteristics can be implemented.

Each of the first grating 1 and the second grating 2 may include three or more portions having different periods of, for example, Λ=0.43 μm, 0.45 μm, and 0.47 μm. With such a configuration, similar benefits can be expected.

The wavelength characteristics can also be extended based on the similar idea. In the case of a multi-wavelength configuration in which the wavelength of incident light is wide, the change in the amount of transmitted light, which is the largest value of |P1−P2| in response to a change in the phase difference, decreases and the full width at half maximum can be, for example, approximately ±10 nm. Preferable values for the single wavelength λ=0.84 and 0.86 μm (at θ=0) are Λ=0.445 μm and 0.455 μm, respectively. Thus, if the first grating 1 and the second grating 2 are configured as chirped gratings in which the period Λ gradually changes from 0.445 μm to 0.455 μm, for example, the wavelength range can be extended.

Each of the first grating 1 and the second grating 2 may include three or more portions having different periods of, for example, Λ=0.445 μm, 0.450 μm, and 0.455 μm. With such a configuration, similar effects can be expected.

An example of a method for fabricating the light detection device 29 according to the ninth embodiment will be described next.

FIGS. 28A and 28B are cross-sectional views illustrating an example of a process of fabricating the light detection device 29 according to the ninth embodiment. First, the first layer 3 having the thickness $t_1$ is deposited on the second layer 4 as illustrated in FIG. 28A. For example, spattering or vacuum vapor deposition can be used during the deposition process. In the case of using a resin material for the first layer 3, the use of a coating process enables a low-temperature process. Then, the first optical coupler 1 and the second optical coupler 2 are formed simultaneously on the first layer 3 as illustrated in FIG. 28B. During this step, a combination of photolithography and the etching process (known so-called binary optics fabrication method) can be used. In this way, for example, gratings having a triangular cross-section can be created. Other than the binary optics fabrication method, for example, nanoimprinting or 3D printing can also be used. Nanoimprinting, in particular, can reduce the cost. The element thus fabricated are combined with the light detector 5 including the first photodetector 6 and the second photodetector 7, whereby the light detection device 29 is fabricated.

Photodetector System

The light detection device 29 according to the ninth embodiment is capable of obtaining information regarding the structure of an object (e.g., the surface structure, the refractive index distribution, etc.) when it is used in combination with a light source and an processing circuit. An example of such a light detection system will be described below.

Figure 29A:
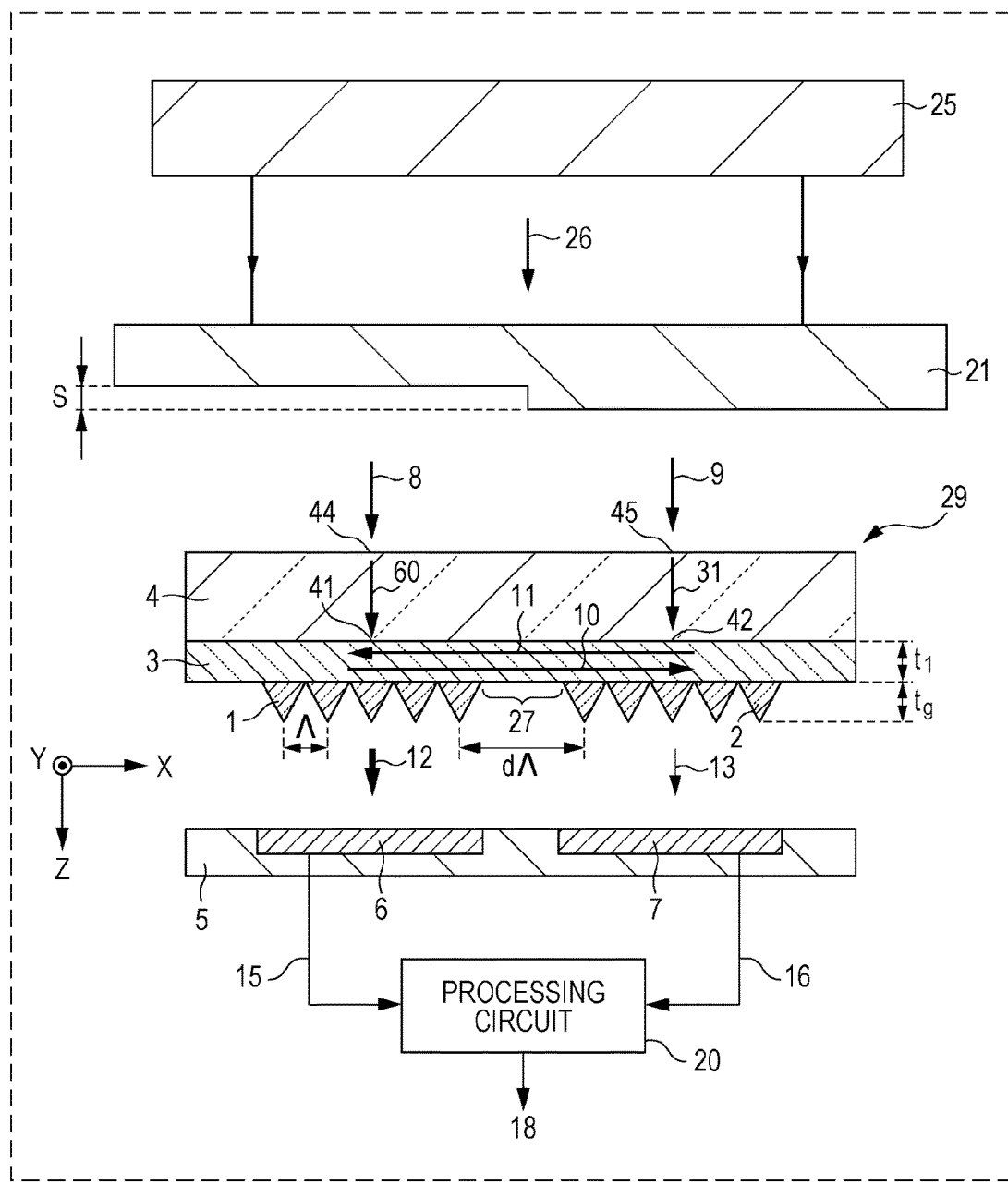
FIG. 29A is a diagram schematically illustrating an example of the configuration of a light detection system in which the light detection device according to the ninth embodiment is used.

FIG. 29A is a diagram schematically illustrating an example of the configuration of the light detection system in which the light detection device 29 according to the ninth embodiment is used. This light detection system includes a light source 25 that emits light having a wavelength λ in the air and an processing circuit 20 that generates and outputs information (electric signal 18) regarding the structure of an object on the basis of a first electric signal output from the first photodetector 6 and a second electric signal output from the second photodetector 7. The first photodetector 6 and the second photodetector 7 detect the light having the wavelength λ that has been emitted from the light source 25 and is incoming from the object 21. This light detection system detects transmitted light from the object 21; however, the light detection system may be configured to detect reflected light. The object 21 can be, but not limited to, a biological tissue or a phase-stepping forgery prevention mark on documents, for example.

The processing circuit 20 used in the first embodiment may be an integrated circuit, for example, a DSP, an ASIC, or an FPGA. The processing circuit 20 executes a computer program stored, for example, in a memory to perform computation to be described later and generate information regarding the structure of the object 21.

The light detection system irradiates the object 21 with emitted light 26 which is monochromatic coherent light, such as laser beams, from the light source 25 and detects, by using the light detection device 29, light that has passed through the object 21 (including the first incident light 8 and the second incident light 9 that are adjacent to each other). In the example illustrated in FIG. 29A, the first incident light 8 is light that has passed through a relatively thin portion of the object 21, whereas the second incident light 9 is light that has passed through a relatively thick portion of the object 21. Now, let S denote the difference in thickness between the relatively thin portion and the relatively thick portion and let $n_0$ denote a refractive index of the object 21. Then, the phase difference $\phi$ between the first incident light 8 and the second incident light 9 is denoted as Equation (40) below.

$$\phi = 2\pi(n_0-1)S/\lambda \quad (40)$$

That is, the phase of the second incident light 9 is delayed with respect to the phase of the first incident light 8 by $2\pi(n_0-1)S/\lambda$.

The first photodetector 6 outputs an electric signal 15 having a signal value that is proportional to the power P1 of the first transmitted light 12. The second photodetector 7 outputs an electric signal 16 having a signal value that is proportional to the power P2 of the second transmitted light 13. The processing circuit 20 receives the electric signals 15 and 16 and determines the power of the first incident light 8, the power of the second incident light 9, and the phase difference $\phi$. The phase difference $\phi$ can be determined by using the method described with reference to FIGS. 26A to 26C. The processing circuit 20 outputs information representing the phase difference $\phi$ as the information (electric signal 18) regarding the structure of the object 21. The value of the change in thickness (step) S can be determined from the information representing the phase difference $\phi$ by using Equation (40). The processing circuit 20 may calculate the value of S on the basis of the phase difference $\phi$ and may output the electric signal 18 containing information regarding the S value.

Since the power of the emitted light 26 emitted from the light source 25 is known, transmittance or reflectance of the object 21 can be determined from the power of the first incident light 8 and the power of the second incident light 9. The processing circuit 20 may output a signal representing the transmittance or reflectance of the object 21.

The light detection system may include the coherent light source 25, for example, a laser light source, or the light source 25 may be an external element. The light source 25 may be included in the light detection device 29. The light detection system may include elements other than those illustrated in FIG. 29A. For example, the light detection system may include, between the object 21 and the first and second optical couplers 1 and 2, a bandpass filter that selectively allows light having a specific wavelength range in use to pass, for example. Such a bandpass filter may be disposed in front of the first photodetector 6 and the second photodetector 7.

Figure 29B:
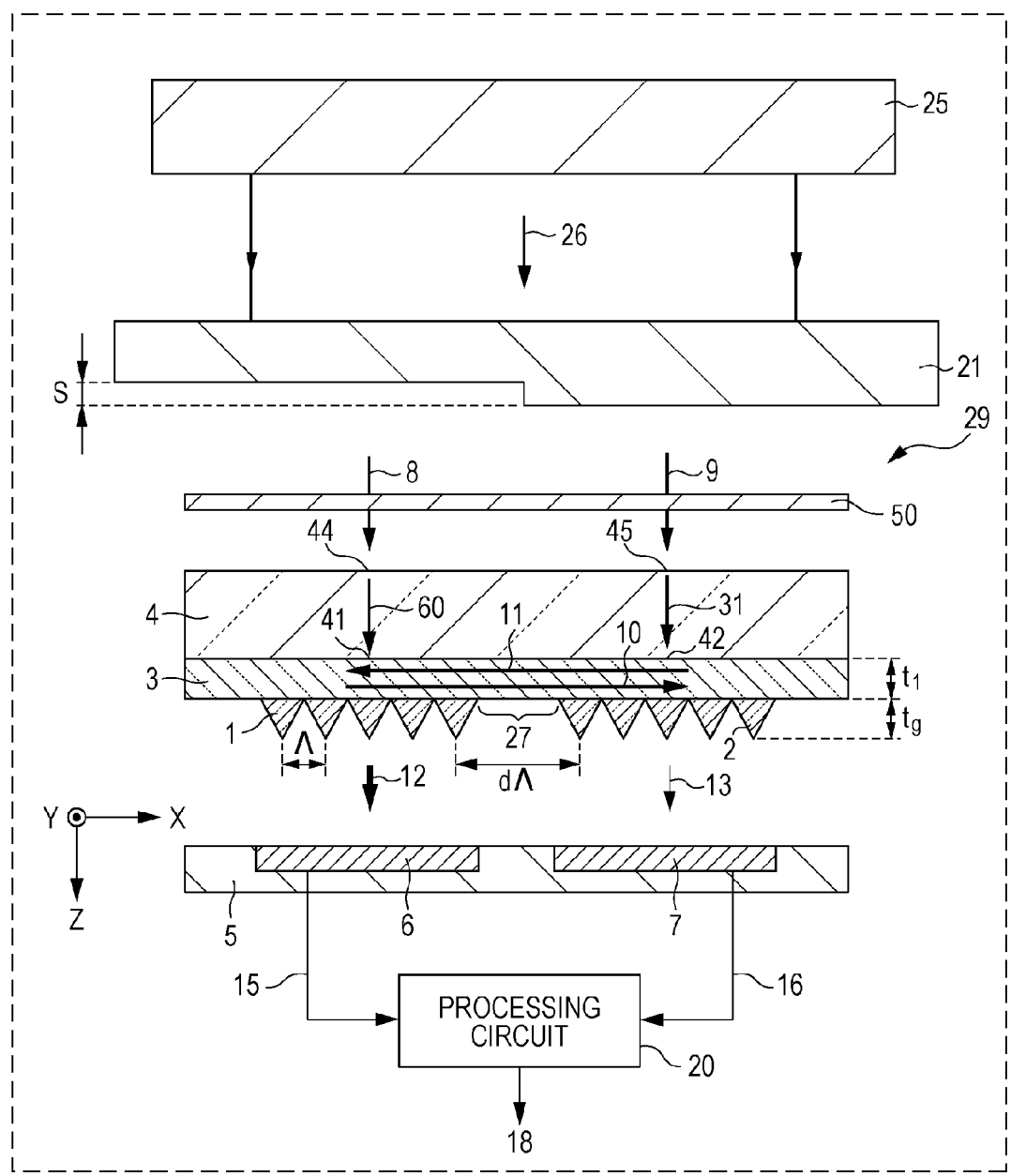
FIG. 29B is a diagram illustrating a modification of the light detection system according to the ninth embodiment.

FIG. 29B is a diagram illustrating a modification of the light detection system according to the ninth embodiment. As illustrated in FIG. 29B, the light detection device 29 may include, between the object 21 and the first and second optical couplers 1 and 2, a polarization element 50 that allows more TM polarization components to pass than TE polarization components. The polarization element 50 may be, for example, a linear polarizer or an elliptical polarizer. With the polarization element 50, light containing more TM polarization components than TE polarization components is incident on the first optical coupler 1 and the second optical coupler 2. Thus, the detection sensitivity can be increased as described above.

Modification of Photodetector Device

Figure 30:
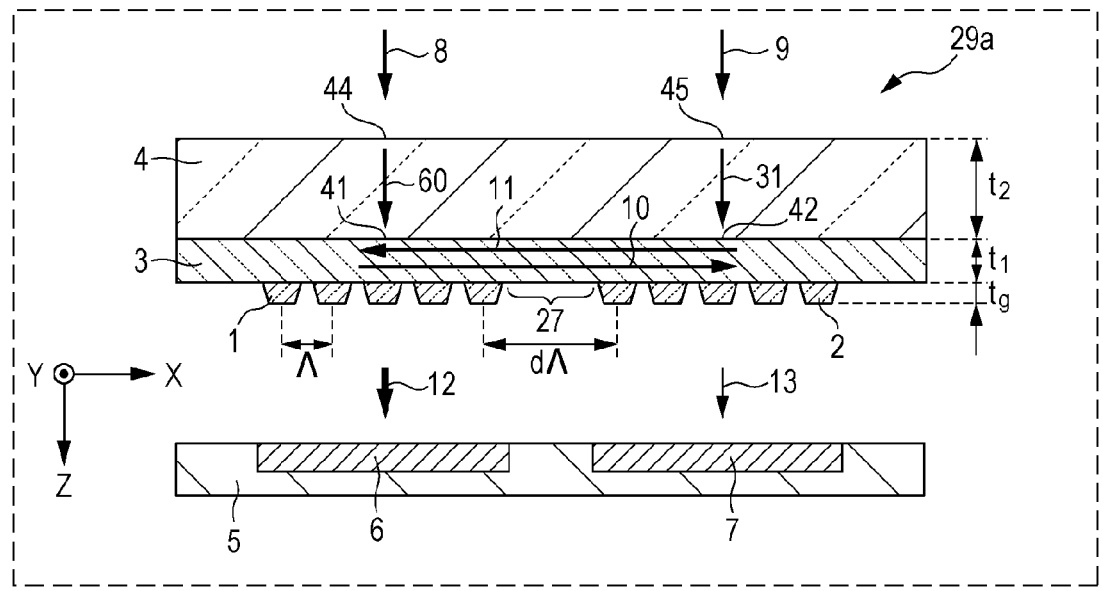
FIG. 30 is a cross-sectional view illustrating the configuration of a light detection device according to a modification of the ninth embodiment.

FIG. 30 is a cross-sectional view illustrating the configuration of a light detection device 29a according to a modification of the ninth embodiment. In this example, each of the first optical coupler 1 and the second optical coupler 2 is a grating including light-transmissive members whose cross-section parallel to the X-Z plane is trapezoidal. The light-transmissive members of the first grating 1 and the second grating 2 have a shape of a triangular pillar whose top portion (corner) is removed. Each of the light-transmissive members may have a sinusoidal cross-section, for example. Each of the light-transmissive members need not have a cross-section with a sharp corner and may have a cross-section with a round corner. If each of the light-transmissive members has a tapered cross-section in which the area of the cross-section parallel to the X-Z plane decreases toward the top from the bottom, benefits similar to those of the case where gratings including light-transmissive members having a triangular pillar shape are used are obtained. That is, a small and thin light detection device having a stable structure and capable of quantitatively determining information regarding an object on the basis of the degree of coherence of transmitted light or reflected light from the object can be implemented.

Figure 31:
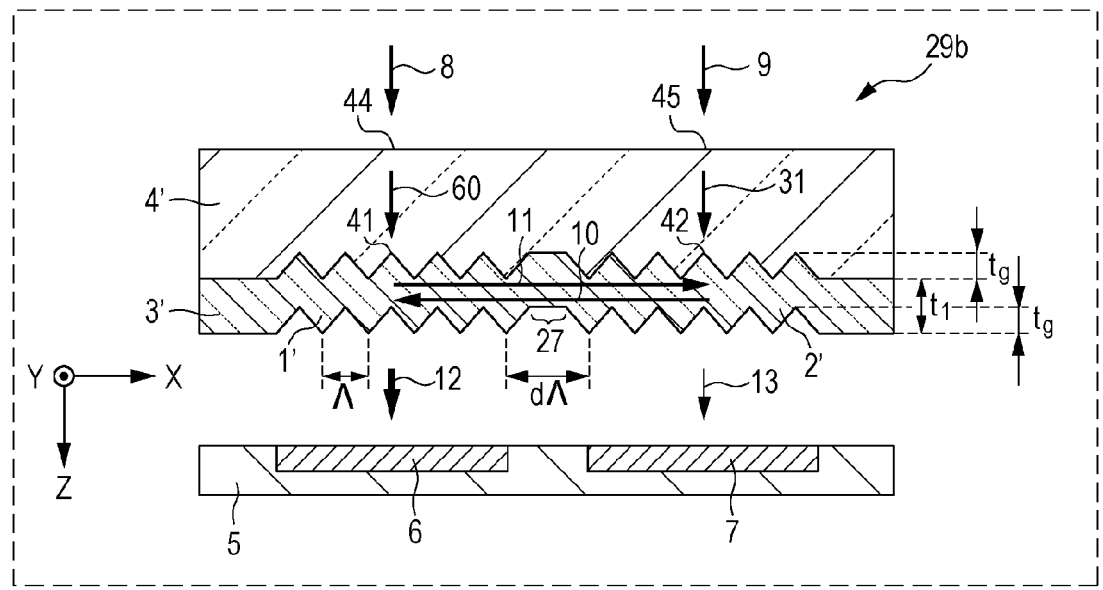
FIG. 31 is a cross-sectional view illustrating the configuration of a light detection device according to another modification of the ninth embodiment.

FIG. 31 is a cross-sectional view illustrating the structure of a light detection device 29b according to another modification of the ninth embodiment. In this example, a first optical coupler 1' and a second optical coupler 2' are formed on two surfaces (upper and lower surfaces) of a first layer 3'. The first optical coupler 1' and the second optical coupler 2' are composed of the same material as that of the first layer 3'. In other words, the first optical coupler 1' and the second optical coupler 2' are formed in the first layer 3'. As described above, the first optical coupler, the second optical coupler, and the first layer may be a single structure composed of the same material. In this configuration, the light exiting portion 41 of the first optical propagation path 35 and the light exiting portion 42 of the second optical propagation path 36 are in contact with the first optical coupler 1' and the second optical coupler 2', respectively.

In addition, the first optical coupler 1' and the second optical coupler 2' may be formed only in the first layer 3' by using a material having a refractive index different from that of the first layer 3', for example.

The light detection device 29b illustrated in FIG. 31 can be fabricated in the following process, for example. First, gratings having the depth $t_g$ is fabricated on the surface of the second layer 4' by using, for example, photolithography or etching. The first layer 3' is deposited thereon. Consequently, similar gratings having the depth of $t_g$ are also formed on the (lower) surface of the first layer 3'. The element thus fabricated is combined with the light detector 5, whereby the light detection device 29b is fabricated. According to this modification, fabrication becomes easier if the material of the second layer 4' has good etching characteristics and formation of the gratings 1' and 2' is easy.

Figure 32:
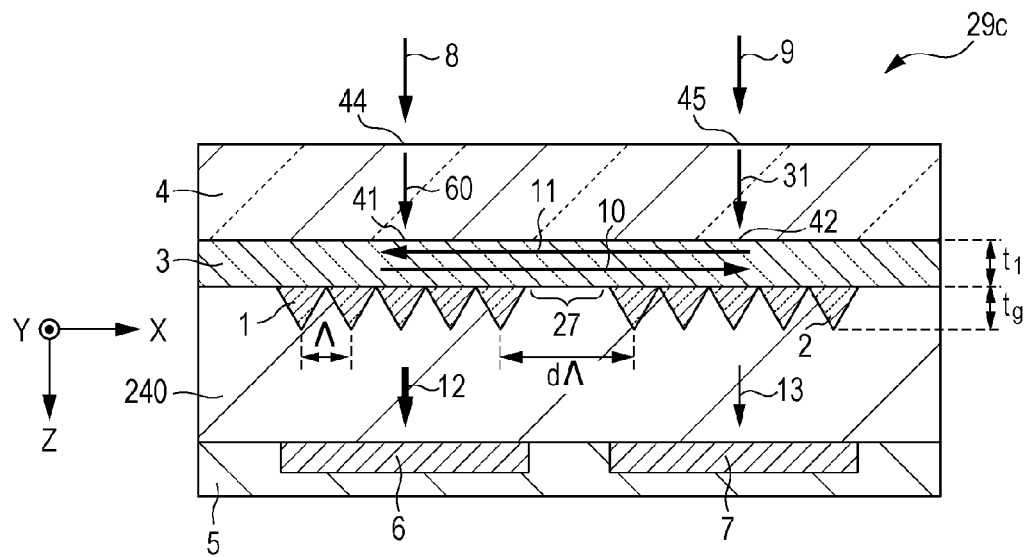
FIG. 32 is a cross-sectional view illustrating the configuration of a light detection device according to yet another modification of the ninth embodiment.

FIG. 32 is a cross-sectional view illustrating the configuration of a light detection device 29c according to yet another modification of the ninth embodiment. This light detection device 29c includes a third layer 240 that is light-transmissive and replaces an air layer between the light detector 5 and the first and second optical couplers 1 and 2 in the light detection device 29 described above. The third layer 240 has a refractive index that is smaller than those of the first layer 3 and the first and second optical couplers 1 and 2. With this configuration, the light detection device 29c that has a stable structure and is robust to disturbance, such as vibration, is implemented.

The light detection device 29c according to this modification can be fabricated in the following manner. After the step illustrated in FIG. 28B, the first and second optical couplers 1 and 2 are arranged to oppose the first and second photodetectors 6 and 7 of the light detector 5, respectively. Then, for example, a light-transmissive UV curable resin, an adhesive, or the like is placed therebetween and is caused to cure. In this way, the third layer 240 is formed.

Tenth Embodiment

A light detection device according to a tenth embodiment of the present disclosure will be described next.

Figure 33:
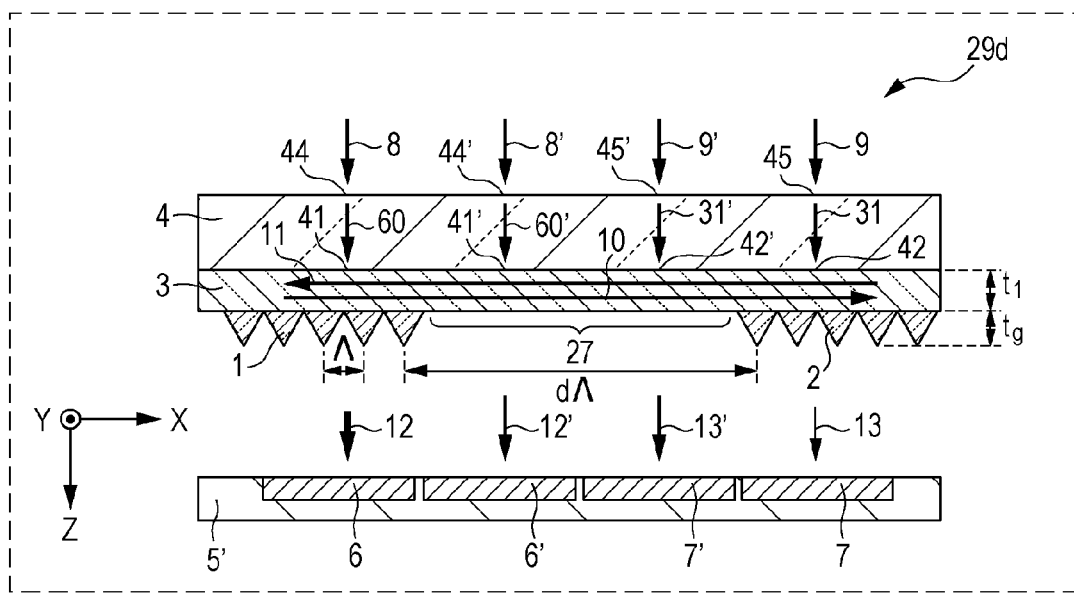
FIG. 33 is a cross-sectional view schematically illustrating the configuration of a light detection device according to a tenth embodiment of the present disclosure.

FIG. 33 is a cross-sectional view schematically illustrating the configuration of a light detection device 29d according to the tenth embodiment. The light detection device 29d according to the tenth embodiment differs from the light detection device 29 according to the ninth embodiment in that a light detector 5' further includes a photodetector 6' (third photodetector) and a photodetector 7' (fourth photodetector) and the spacing region 27 is relatively large. In the light detection device 29 according to the ninth embodiment, incident light components that pass through the spacing region 27 are not incident on the photodetectors of the light detector 5. In contrast, in the light detection device 29d according to the tenth embodiment, incident light 8' and incident light 9' that pass through the spacing region 27 located at the center become transmitted light 12' and transmitted light 13' and are detected by the photodetector 6' and the photodetector 7' of the light detector 5', respectively.

The incident light 8' that is not incident on the first optical coupler 1 among the first incident light is not related to excitation of guided light. The incident light 8' passes through the second layer 4 and the first layer 3 and becomes the transmitted light 12'. Likewise, the incident light 9' that is not incident on the second optical coupler 2 among the second incident light is not related to excitation of guided light. The incident light 9' passes through the second layer 4 and the first layer 3 and becomes the transmitted light 13'. Accordingly, power of the incident light 8' and power of the incident light 9' can be detected by detecting the transmitted light 12' and the transmitted light 13' using the photodetector 6' and the photodetector 7', respectively.

With the configuration according to the tenth embodiment, the light utilization efficiency can be increased by providing the photodetectors 6' and 7' that detect light passing through the spacing region 27 even if the spacing region 27 is large.

The power distribution detection accuracy increases as a result of providing the photodetectors 6' and 7' separately from the photodetectors 6 and 7 as illustrated in FIG. 33. In addition, the photodetectors 6 and 6' may be integrated, and the photodetector 7 and 7' may be integrated. The number of photodetectors that oppose the spacing region 27 is not limited to two and one or three or more photodetectors may be provided. As described above, the light detector may include at least one third photodetector that opposes the spacing region 27 located between the first grating 1 and the second grating 2.

Eleventh Embodiment

A light detection device according to an eleventh embodiment of the present disclosure will be described next.

Figure 34:
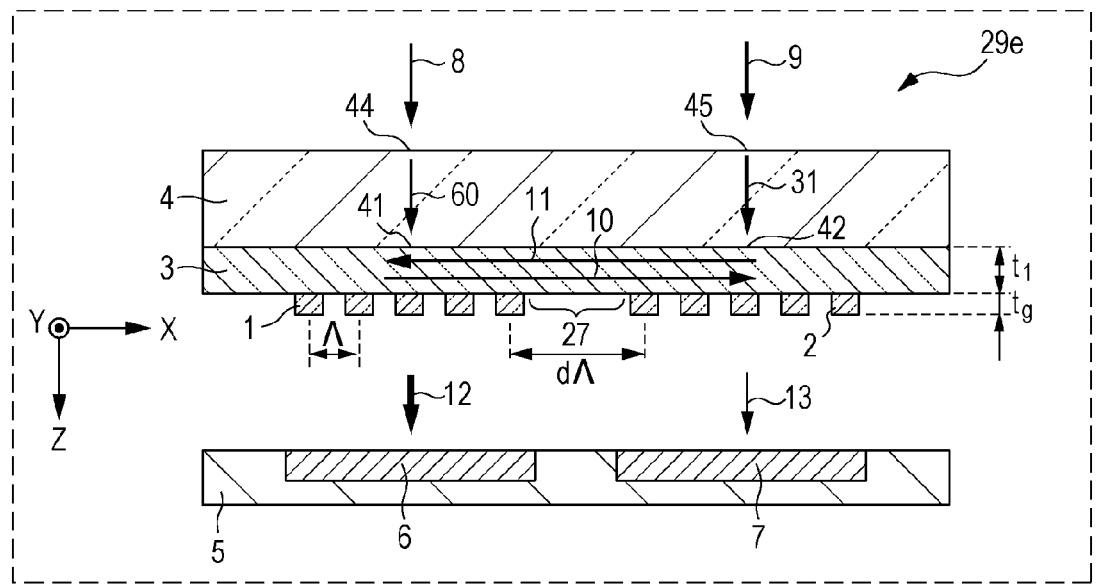
FIG. 34 is a cross-sectional view schematically illustrating the configuration of a light detection device according to an eleventh embodiment of the present disclosure.

FIG. 34 is a cross-sectional view schematically illustrating the configuration of a light detection device 29e according to the eleventh embodiment.

The light detection device 29e according to the eleventh embodiment differs from the light detection device 29 according to the ninth embodiment in the shape of the first optical coupler 1 and the second optical coupler 2. Each of the first optical coupler 1 and the second optical coupler 2 according to the eleventh embodiment is a grating including a plurality of light-transmissive members each of which has a protrusion extending in the Y direction and whose cross-section parallel to the X-Z plane is rectangular. The light-transmissive members of the gratings 1 and 2 have a shape for which the peak is not determined uniquely; however, the description will be given as in the ninth embodiment by using the center of each protrusion of the first and second gratings 1 and 2 as a reference (virtual peak) as illustrated in FIG. 34 for convenience.

The first and second gratings 1 and 2 according to the eleventh embodiment are composed of $Ta_2O_5$, which is the same material as that of the first layer 3. The wavelength $\lambda$ of the first incident light 8 and the second incident light 9 in the air is, for example, $\lambda = 0.85$ μm. The dimensions of each protrusion in the X direction is the same as those of the groove (dent) between the protrusions. The depth $t_g$ of the groove is, for example, $t_g = 0.1$ μm. The distance $\Lambda$ between the centers of two adjacent protrusions is, for example, $\Lambda = 0.45$ μm. Fabrication of gratings having a rectangular cross-section with shallow grooves is easier than fabrication of gratings having a triangular cross-section according to the ninth embodiment.

Figure 35:
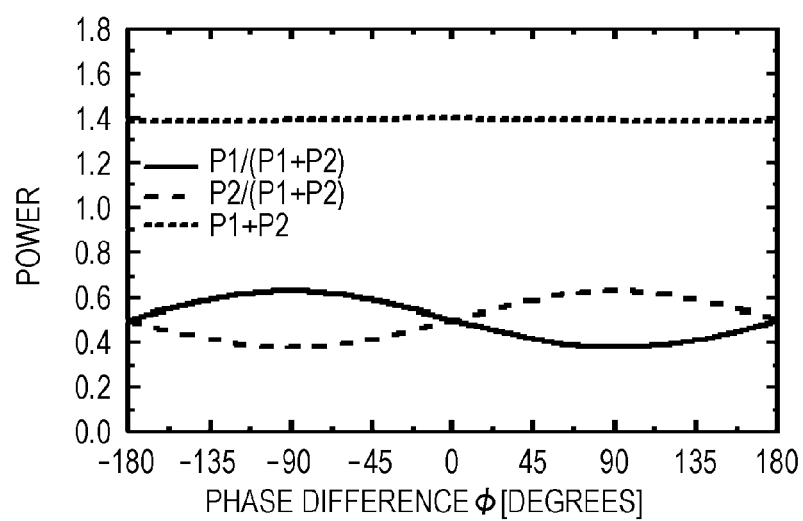
FIG. 35 is a graph showing a relationship among a phase difference φ between the two incident rays, normalized powers P1/(P1+P2) and P2/(P1+P2) of the transmitted rays, and the sum (P1+P2) of the powers in the case where the distance constant d=1.05 in the light detection device according to the eleventh embodiment.
Figure 36:
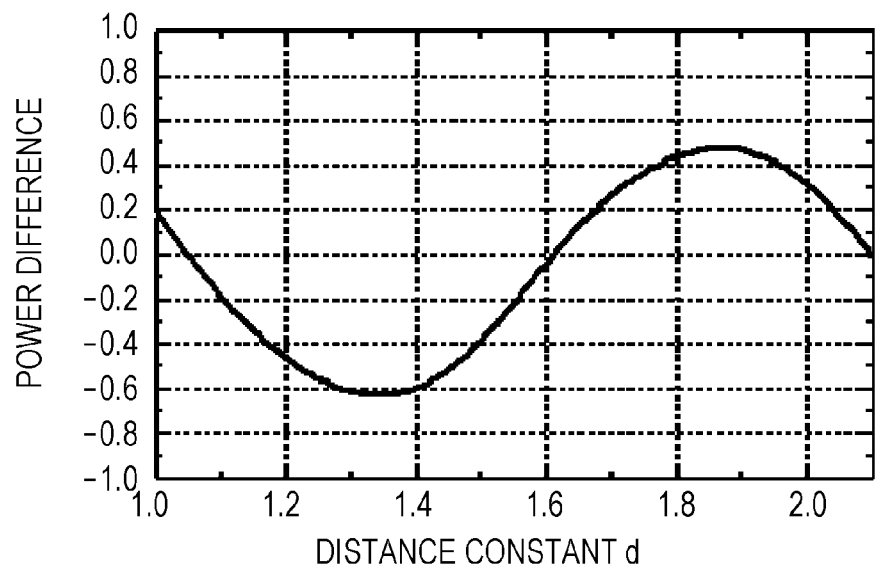
FIG. 36 is a graph showing a relationship between the distance constant d and the power difference in the light detection device according to the eleventh embodiment.

FIG. 35 is a graph showing a relationship among a phase difference $\phi$ between the first incident light 8 and the second incident light 9, normalized powers P1/(P1+P2) and P2/(P1+P2) of the transmitted light 12 and the transmitted light 13, and the sum (P1+P2) of the powers in the case where the distance constant d=1.05 in the light detection device 29e according to the eleventh embodiment. FIG. 36 is a graph showing a relationship between the distance constant d and the power difference in the light detection device 29e according to the eleventh embodiment.

A value of d (d>1) at which (P1+P2) is barely dependent on the phase difference φ also exists for the light detection device 29e according to the eleventh embodiment. For example, when d=1.05, the sum (P1+P2) takes a substantially constant value of 1.4 as illustrated using a dot line in FIG. 35. This value is larger than 1.0, which is the value of (P1+P2) of the light detection device 29 according to the ninth embodiment. Accordingly, the configuration of the eleventh embodiment implements higher light utilization efficiency. The powers of the first incident light 8 and the second incident light 9 can be calculated as (P1+P2)/1.4 without using the phase difference φ in the eleventh embodiment.

As illustrated in FIG. 36, the power difference changes in accordance with the distance constant d. A value d making the power difference zero has been determined to be $$d=1.05+i \quad (41)$$

or $$d=1.61+i \quad (42),$$

where i is an integer of 0 or larger. For example, if i=10, d=11.05 or d=11.61. At that time, a space between the most adjacent peaks (centers of the protrusions) of the first optical coupler 1 and the second optical coupler 2 is dΛ=4.97 μm or dΛ=5.22 μm.

The condition of d with which the power difference is within a range from −0.5 to 0.5 is $$1 \le d \le 1.22 \quad (43) \text{ or}$$

$$1.46+i \le d \le 2.22+i \quad (44).$$

The condition of d with which the power difference is within a range from −0.2 to 0.2 is $$1 \le d \le 1.10 \quad (45),$$

$$1.56+i \le d \le 1.68+i \quad (46), \text{ or}$$

$$2.04+i \le d \le 2.18+i \quad (47).$$

The condition of d with which the power difference is within a range from −0.1 to 0.1 is $$1.02+i \le d \le 1.07+i \quad (48), \text{ or}$$

$$1.58+i \le d \le 1.64+i \quad (49).$$

FIG. 35 illustrates a result of the case where guided light of the TM mode is excited by using the first incident light 8 and the second incident light 9 that contain TM-polarized light. In the eleventh embodiment, the largest value of |P1−P2| of the case where guided light of the TM mode is excited is, for example, approximately 1.6 times as large as the largest value of the case where guided light of the TE mode is excited. However, this difference due to polarization is smaller than the value (approximately 5.5 times) obtained with the configuration according to the ninth embodiment in which gratings including light-transmissive members having a triangular cross-section are used.

Accordingly, in the light detection device 29e according to the eleventh embodiment, the SN ratio can also be increased in the case of using linearly polarized light (TM-polarized light in the eleventh embodiment) that makes the largest value of |P1−P2| larger, compared with the case of using non-polarized incident light. That is, the SN ratio increases as a result of using the first incident light 8 and the second incident light (linearly polarized light or elliptically polarized light) mainly containing TM-polarized light, and consequently the detection sensitivity can be increased.

Figure 37:
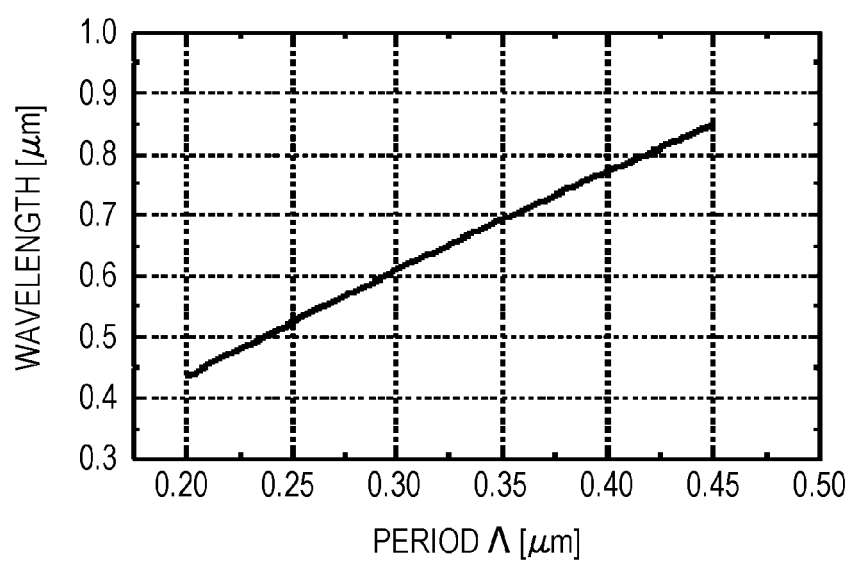
FIG. 37 is a graph illustrating a relationship between a period Λ of light-transmissive members of gratings and a preferable wavelength for the light detection device according to the eleventh embodiment.

FIG. 37 is a graph illustrating a relationship between a period Λ of the light-transmissive members of the gratings and a preferable wavelength for the light detection device 29e according to the eleventh embodiment. This graph illustrates a result of the case where the depth of the grooves of the gratings is constant ($t_g$=0.1 μm). The graph indicates that the preferable wavelength λ changes linearly in accordance with the change in the period Λ. The graph also indicates that the preferable wavelength λ can be suitably approximated by Equation (50) below.

$$\lambda = 1.6488\Lambda + 0.11211 \quad (50)$$

According to Equation (50), Λ=211 nm is obtained for a wavelength λ=0.46 μm which represents blue light. In addition, Λ=255 nm is obtained for a wavelength λ=0.532 μm which represents green light, and Λ=315 nm is obtained for a wavelength λ=0.632 μm which represents red light. In the case of typical gratings that includes dents and protrusions having the same length in the X direction and thus have a duty ratio of 0.5, the line width (width of each protrusion) is half the period. Accordingly, in the case of forming gratings including light-transmissive members having a rectangular cross-section with a depth $t_g$=0.1 μm, a light detection device that supports wavelengths of red, green, and blue can be implemented if processing of the line width of 0.1 μm is possible.

Figure 38:
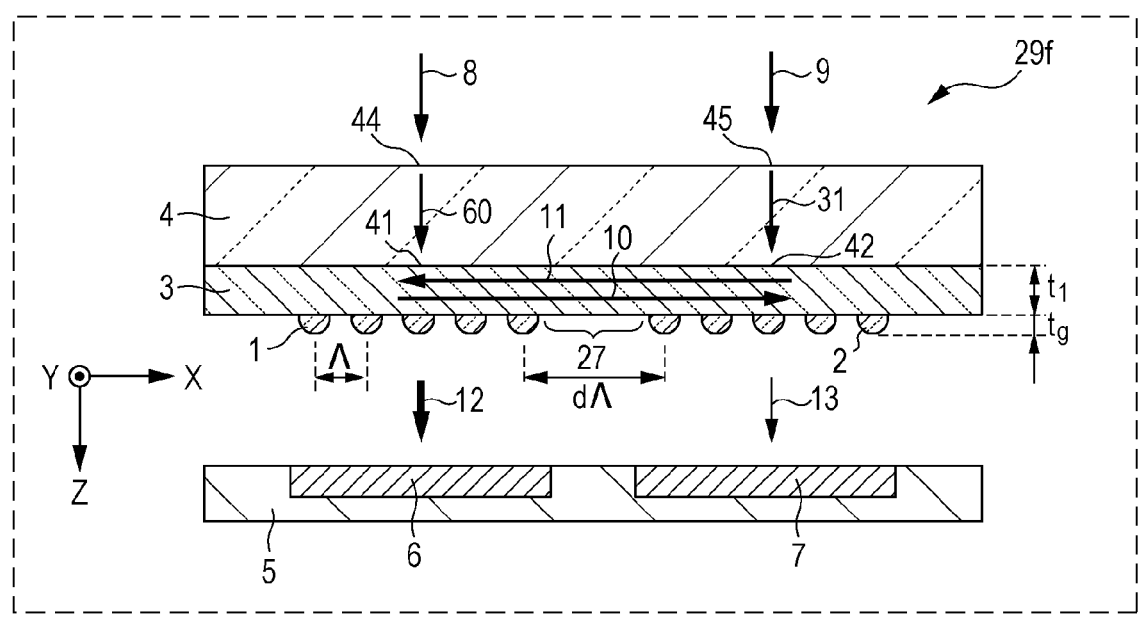
FIG. 38 is a cross-sectional view schematically illustrating the configuration of a light detection device according to a modification of the eleventh embodiment.

FIG. 38 is a cross-sectional view schematically illustrating the configuration of a light detection device 29f according to a modification of the eleventh embodiment. In this modification, each of the first optical coupler 1 and the second optical coupler 2 is a grating including light-transmissive members whose cross-section parallel to the X-Z plane is semicircular. The gratings 1 and 2 including light-transmissive members having a semicircular cross-section can be considered as the gratings 1 and 2 that include light-transmissive members having a substantially rectangular cross-section whose upper portion is rounded. In the gratings 1 and 2 including light-transmissive members having a semicircular cross-section or the gratings 1 and 2 including light-transmissive members having a rectangular cross-section with rounded corners, a lateral surface near the bottom is substantially perpendicular to the first layer 3. Benefits similar to those obtained in the case of using the gratings 1 and 2 including light-transmissive members having a rectangular cross-section can be obtained in the case of using these gratings. That is, a small and thin light detection device having a stable structure and capable of quantitatively determining information regarding an object on the basis of the degree of coherence of transmitted light or reflected light from the object can be implemented.

Twelfth Embodiment

A light detection device according to a twelfth embodiment of the present disclosure will be described next.

Figure 39A:
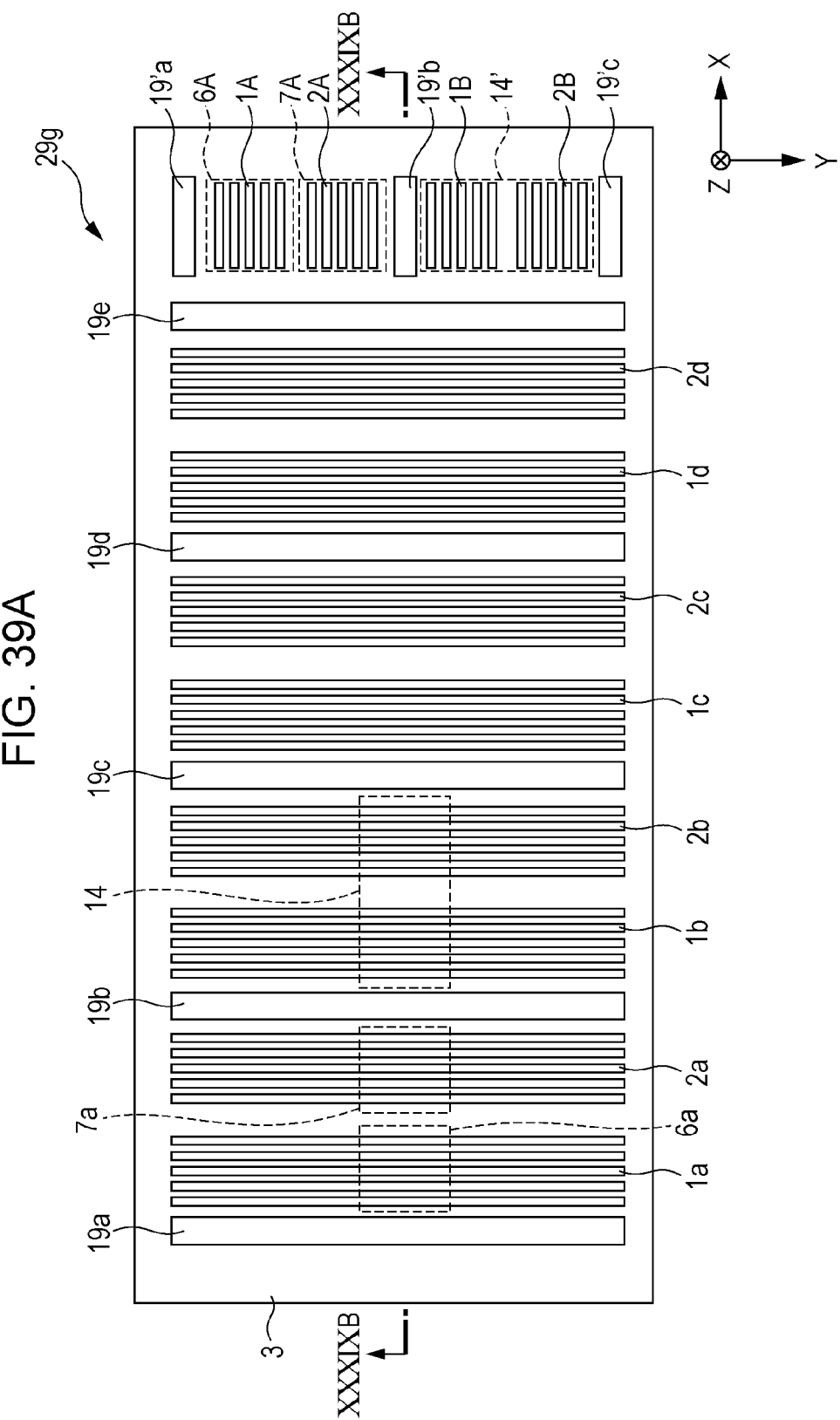
FIG. 39A is a plan view schematically illustrating the configuration of a light detection device according to a twelfth embodiment of the present disclosure.
Figure 39B:
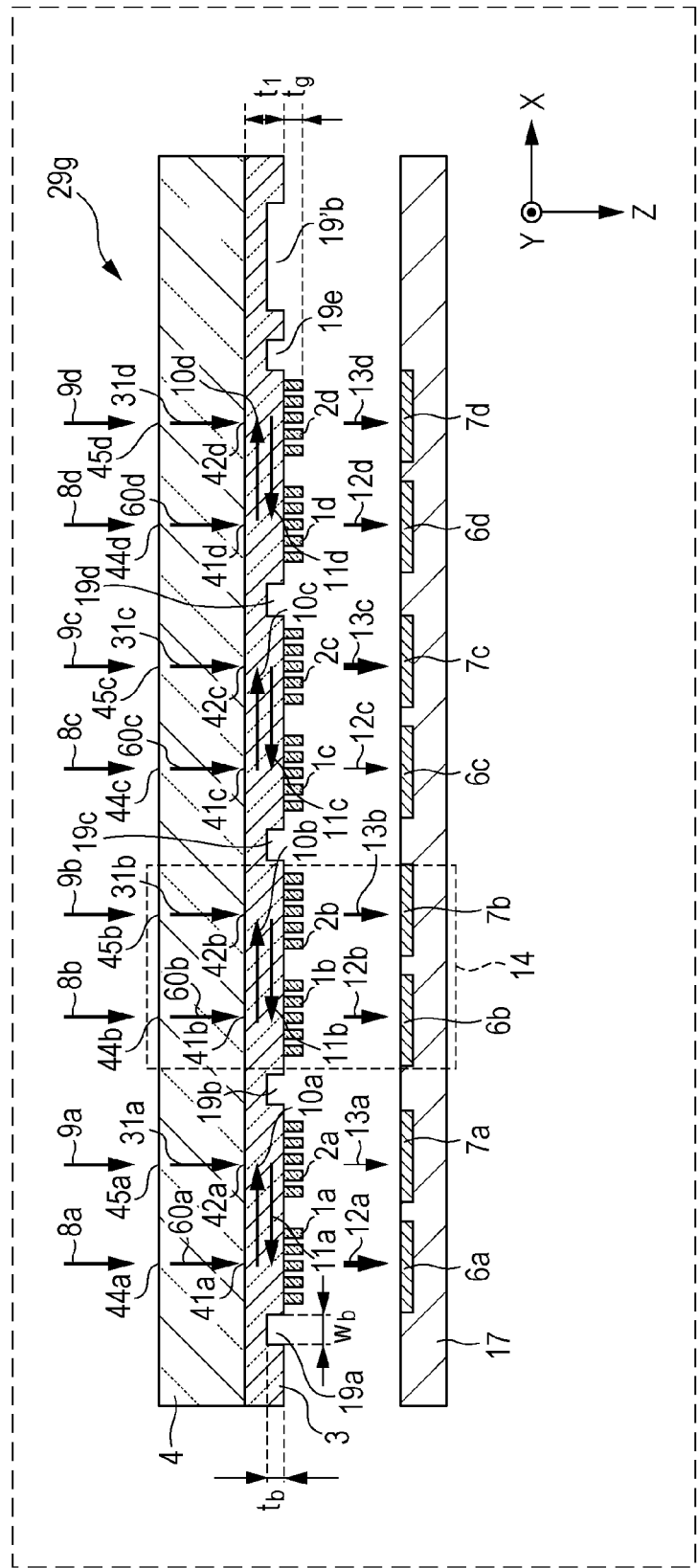
FIG. 39B is a cross-sectional view taken along line XXXIXB-XXXIXB illustrated in FIG. 39A.

FIG. 39A is a plan view schematically illustrating the configuration of a light detection device 29g according to the twelfth embodiment. FIG. 39B is a cross-sectional view taken along line XXXIXB-XXXIXB illustrated in FIG. 39A.

In the following description, first optical couplers 1*a*, 1*b*, 1*c*, and 1*d* illustrated in FIG. 39A are collectively referred to as first optical couplers 1. The same applies to other elements.

The light detection device 29*g* according to the twelfth embodiment differs from the light detection device 29*e* according to the eleventh embodiment in that the light detection device 29*g* according to the twelfth embodiment includes a plurality of detection units 14 and 14'. The plurality of detection units 14 are two-dimensionally arranged in parallel to the X-Y plane. The plurality of detection units 14' are arranged along the Y direction. Each of the plurality of detection units 14 and 14' includes a part of the first layer 3, a part of the second layer 4, the first optical coupler 1, the second optical coupler 2, the first photodetector 6, and the second photodetector 7. The plurality of detection units 14 and 14' share the first layer 3 and the second layer 4. A light detector used in the twelfth embodiment is an image sensor 17. On the first layer 3, a groove 19 (having a width $w_b$ and a depth $t_b$) is formed along the Y direction at each region between two adjacent detection units 14 among the plurality of detection units 14. On the first layer 3, a groove 19' (having the width $w_b$ and depth $t_b$) is formed along the X direction at each region between two adjacent detection units 14' among the plurality of detection units 14'. FIG. 39B omits illustration of wirings used to output electric signals from the image sensor 17. Although FIG. 39B illustrates only four detection units 14 arranged along the X direction, five sets of the similar configuration are arranged along the Y direction.

The light detection device 29*g* according to the twelfth embodiment includes a plurality of detection units each having the configuration of the light detection device 29*e* according to the eleventh embodiment. The plurality of detection units includes the plurality of first detection units 14 that detect information for a first direction (X direction in this example) and the plurality of second detection units 14' that detect information for a second direction (Y direction in this example) perpendicular to the first direction. In each of the first detection units 14, the first photodetector 6 and the second photodetector 7 are arranged along the first direction (X direction). In each of the second detection units 14', the first photodetector 6 and the second photodetector 7 are arranged along the second direction (Y direction).

FIG. 39A illustrates an example in which twenty first detection units 14 in total (four along the X direction and five along the Y direction (4×5)) and two second detection units 14' (one along the X direction and two along the Y direction (1×2)) are arranged. This arrangement is merely an example, and the number of first detection units 14 and the number of second detection units 14' and the arrangements of the first and second detection units 14 and 14' are not limited to this example. Information regarding the X direction (first direction) and the Y direction (second direction) of the object is successfully obtained if at least one first detection unit 14 and at least one second detection unit 14' are provided.

The light detection device 29*g* according to the twelfth embodiment allows the incident light 8 and the incident light 9 that are adjacent to each other out of transmitted light or reflected light from the object to be incident on the first detection units 14 and the second detection units 14' and detects the light. In this way, two-dimensional information of the object is successfully determined quantitatively.

In the configuration illustrated in FIG. 39A, the first detection units 14 and the second detection units 14' are arranged in a stripe pattern. The twenty first detection units 14 arranged in a matrix of five rows and four columns on the left side in FIG. 39A detect information regarding the X direction two-dimensionally. The two second detection units 14' arranged in a matrix of two rows and one column on the left side in FIG. 39A detect information regarding the Y direction one-dimensionally. Since information regarding the object obtained by each of the first detection units 14 is information regarding the X direction, two-dimensional information of the object is successfully obtained by using such information in combination with the information regarding the Y direction obtained by the second detection units 14' located on the right side.

The light detection device 29*g* according to the twelfth embodiment includes gratings 1*a*, 1*b*, 1*c*, 1*d*, 2*a*, 2*b*, 2*c*, and 2*d* whose grooves extend in parallel to the Y direction (second direction) and gratings 1A, 1B, 2A, and 2B whose grooves extend in parallel to the X direction (first direction). Accordingly, TE-polarized light for the first detection units 14 serves as TM-polarized light for the second detection units 14', and TM-polarized light for the first detection units 14 serves as TE-polarized light for the second detection units 14'. The detection performance of the first and second detection units 14 and 14' need not necessarily be dependent on the polarization direction. As described above, a difference in the largest value of |P1−P2| due to a difference in the polarization direction between the incident light 8 and the incident light 9 is smaller when gratings including light-transmissive members having a rectangular or semicircular cross-section are used than when gratings including light-transmissive members having a triangular cross-section are used as in the ninth embodiment. Accordingly, in the twelfth embodiment, gratings including light-transmissive members having a rectangular cross-section are used as illustrated in FIG. 39B. However, the shape of the cross-section of the gratings is not limited to this example, and gratings used in the ninth embodiment may be used.

Grooves 19*a*, 19*b*, 19*c*, 19*d*, 19*e*, 19'*a*, 19'*b*, and 19'*c* (which are sometimes referred to as grooves 19 and 19') are formed in respective regions between the plurality of first and second detection units 14 and 14' in the first layer 3 in the twelfth embodiment. Accordingly, leakage of guided light from each of the first and second detection units 14 and 14' to the adjacent detection unit is successfully reduced. As a result, crosstalk is successfully reduced. The width $w_b$ of the grooves 19 and 19' can be typically set to a value larger than the period Λ of the plurality of light-transmissive members of the gratings, for example, to a value of Λ to 5Λ. The depth $t_b$ of the grooves 19 and 19' can be set to be equal to or larger than a thickness (so-called cut-off thickness) with which no waveguide modes occur thereunder, for example, such that $t_b \geq 0.26$ μm. The grooves 19 and 19' successfully reduce the power of guided light that leaks to the adjacent detection unit to ⅓ to ¹⁄₁₅ of the original level, for example. Note that thickness $t_b$ may be set such that $t_b = t_1$, or the grooves 19 and 19' may be formed so as to penetrate through the first layer 3 and reach the second layer 4 located above the first layer 3.

An example of a process of fabricating the light detection device 29*g* according to the twelfth embodiment will be described next.

Figure 40A:
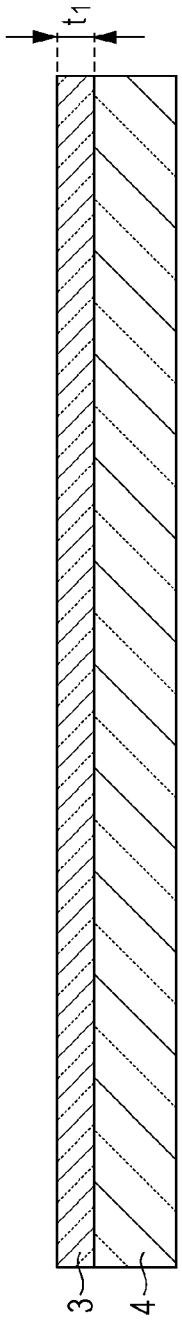
FIG. 40A is a first diagram illustrating a process of fabricating the light detection device according to the twelfth embodiment.
Figure 40B:
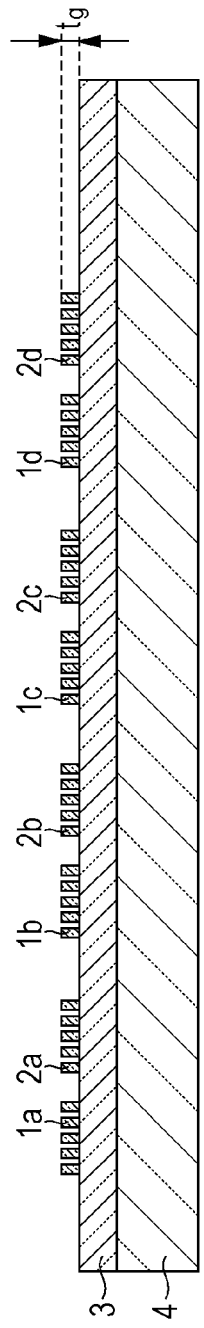
FIG. 40B is a second diagram illustrating the process of fabricating the light detection device according to the twelfth embodiment.
Figure 40C:
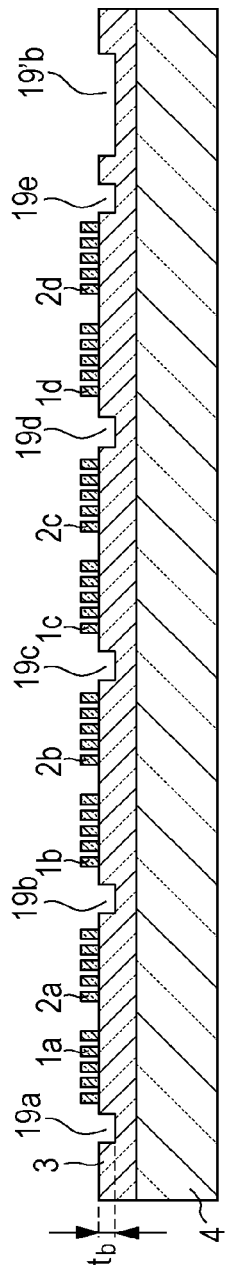
FIG. 40C is a third diagram illustrating the process of fabricating the light detection device according to the twelfth embodiment.

FIGS. 40A to 40C are cross-sectional views illustrating an example of the process of fabricating the light detection device 29*g* according to the twelfth embodiment. The process of fabricating the light detection device 29*g* according to the twelfth embodiment is almost the same as that of the light detection device 29 according to the ninth embodiment expect that the plurality of first detection units 14 and the plurality of second detection units 14' are formed in a two-dimensional matrix and the grooves 19 and 19' are formed.

First, as illustrated in FIG. 40A, the first layer 3 having the thickness $t_1$ is deposited on the second layer 4. Then, as illustrated in FIG. 40B, the plurality of first optical couplers 1 and the plurality of second optical couplers 2 are simultaneously formed on the first layer 3 two-dimensionally. Note that FIG. 40B illustrates only four detection units. Then, as illustrated in FIG. 40C, the plurality of grooves 19 and 19' are formed in respective regions between the plurality of detection units 14 and 14' in the first layer 3. The element thus fabricated is combined with the image sensor 17, whereby the light detection device 29g is completed.

In the twelfth embodiment, each of the detection units 14 and 14' includes the gratings 1 and 2 including a plurality of light-transmissive members arranged at an equal period. That is, the light detection device 29g according to the twelfth embodiment has a configuration suitable for a specific wavelength and a specific incident angle. However, as described with reference to FIG. 37, various wavelengths can be handled by using gratings each including a plurality of light-transmissive members arranged at a plurality of periods. For example, the period Λ of the light-transmissive members may be changed for each detection unit. In addition, gratings including a plurality of light-transmissive members arranged at a plurality of periods may be used in a single detection unit. With this configuration, improved oblique incidence characteristics or wavelength characteristics of the light detection device can be expected.

Figure 41A:
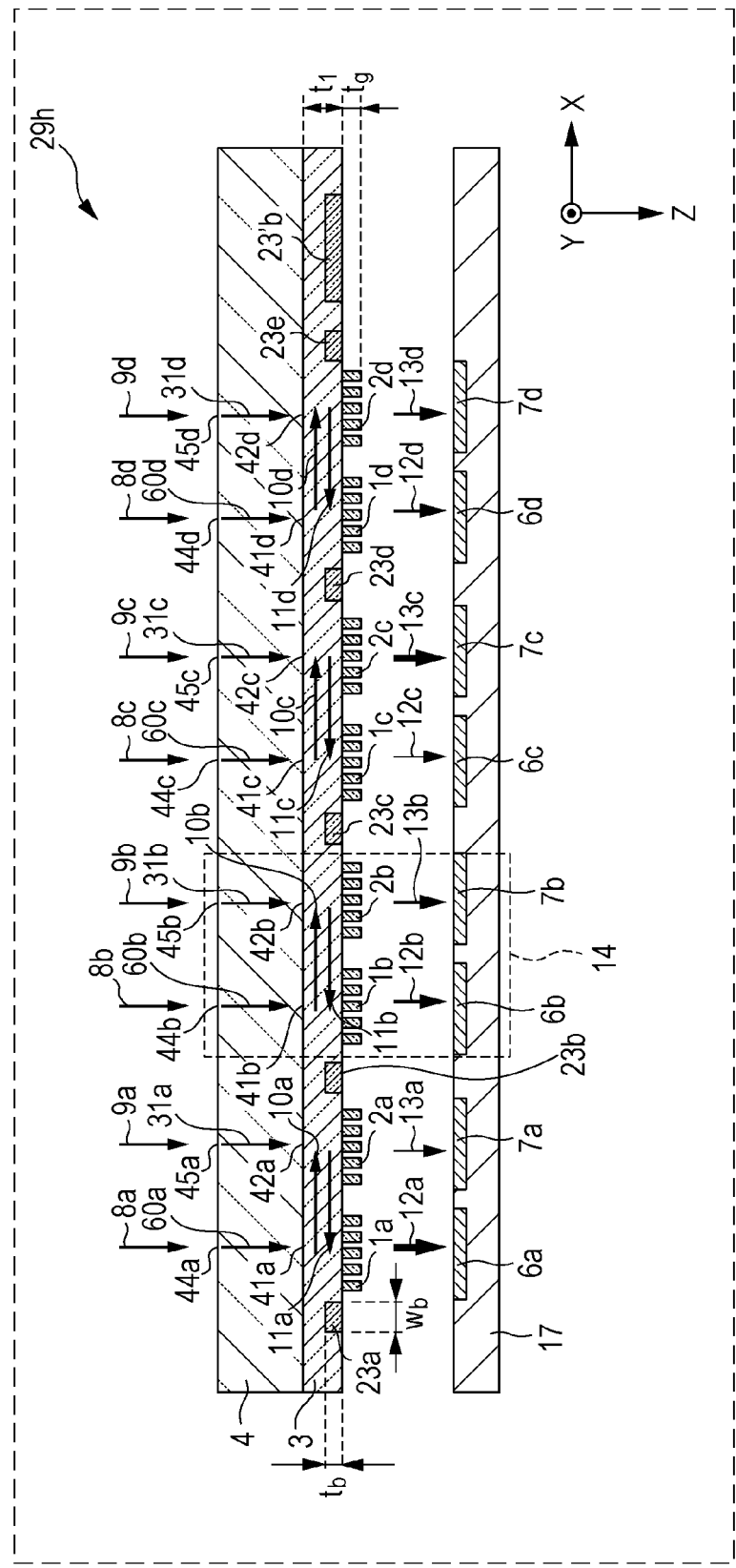
FIG. 41A is a cross-sectional view schematically illustrating the configuration of a light detection device according to a modification of the twelfth embodiment.

FIG. 41A is a cross-sectional view schematically illustrating the configuration of a light detection device 29h according to a modification of the twelfth embodiment. In this example, grooves are formed in respective regions between the plurality of first detection units 14 in the first layer 3, and absorbing films 23a, 23b, 23c, 23d, 23e, and 23'b are deposited in the respective grooves. The absorbing films 23a, 23b, 23c, 23d, 23e, and 23'b reduce reflected/scattered light that occurs in the grooves, and successfully reduce stray light of the light detection device 29h and improve the SN ratio. For example, a resin doped with carbon can be used for the absorbing films 23a, 23b, 23c, 23d, 23e, and 23'b. Other than this material, any material having a large extinction coefficient can be used similarly.

Figure 41B:
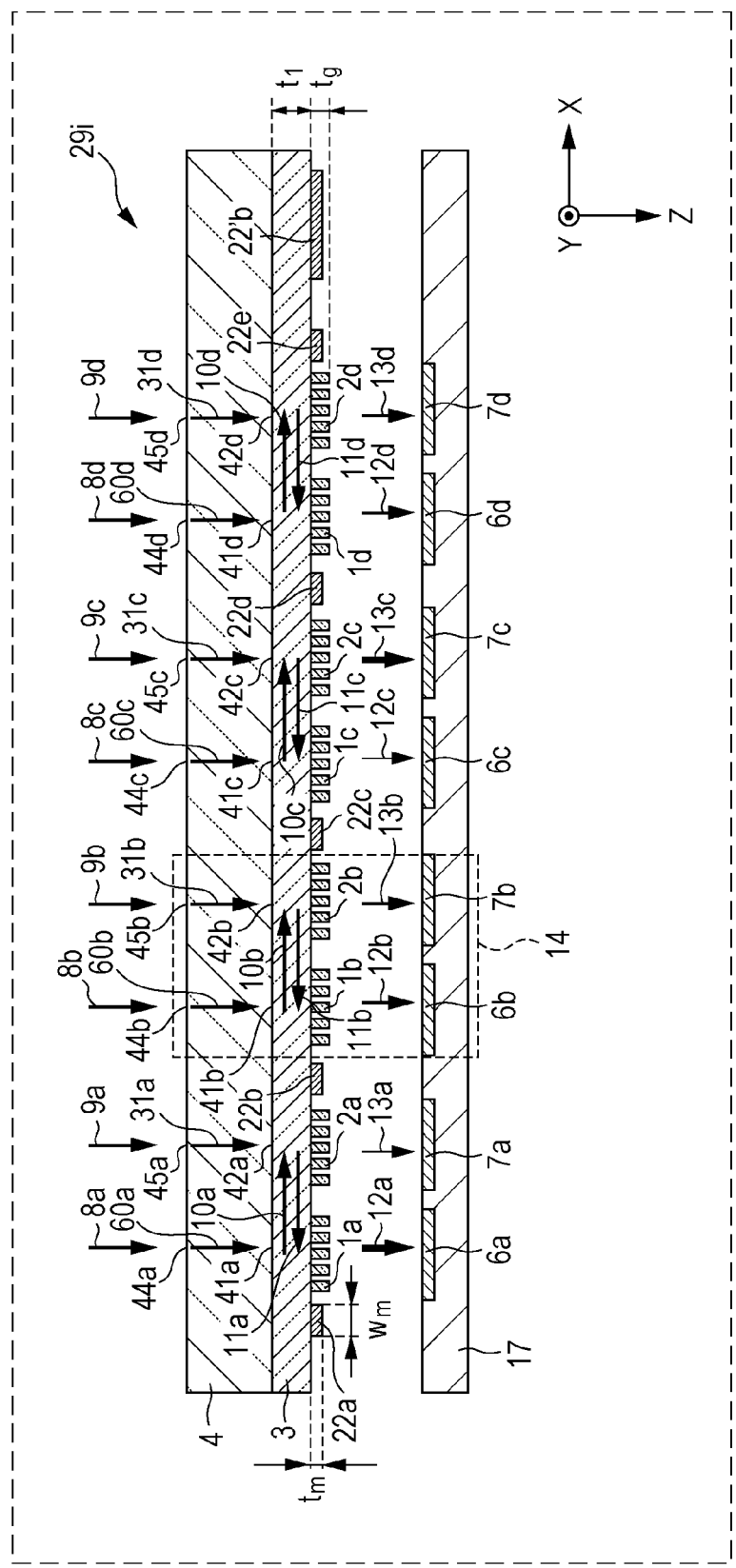
FIG. 41B is a cross-sectional view schematically illustrating the configuration of a light detection device according to another modification of the twelfth embodiment.

FIG. 41B is a cross-sectional view schematically illustrating the configuration of a light detection device 29i according to another modification of the twelfth embodiment. In this example, patterns of metal films 22a, 22b, 22c, 22d, 22e, and 22'b (having a width $w_m$ and a thickness $t_m$) are formed in respective regions between the plurality of first detection units 14 in the first layer 3. The patterns of the metal films 22a, 22b, 22c, 22d, 22e, and 22'b (i.e., protrusions composed of a metal) create a state where light trapping conditions are no longer satisfied in that region and the waveguide modes no longer exist. In this way, the power of guided light that leaks to the adjacent detection unit is successfully reduced. For example, Au, Ag, Cu, Al, W, Ti can be used for the metal films 22a, 22b, 22c, 22d, 22e, and 22'b. The inventors have confirmed that the reduction effect is larger for Al, W, and Ti than for Au, Ag, and Cu. The dimension (width) $w_m$ of the metal films 22a, 22b, 22c, 22d, 22e, and 22'b in the X direction can be set, for example, such that $w_m = \Lambda$ to $5\Lambda$, where Λ denotes the period of the light-transmissive members of gratings. The dimension (thickness) $t_m$ of the metal films 22a, 22b, 22c, 22d, 22e, and 22'b in the Z direction can be set, for example, such that $t_m = 20$ to 100 nm. With such a configuration, the power of guided light that leaks to the adjacent detection unit is successfully reduced to approximately $\frac{1}{5}$ to $\frac{3}{100}$ of the original level, for example.

In this modification, since the patterns of the metal films 22a, 22b, 22c, 22d, 22e, and 22'b are formed on the first layer 3, grooves are no longer required. Since the light detection device 29i include no grooves, reflection of guided light is successfully reduced. If reflection of guided light is large, the reflection influences interference between the guided light 10 and the guided light 11 in each first detection unit 14 and decreases the accuracy in phase-difference detection. According to this modification, reflection of guided light is successfully reduced, and the accuracy of phase-difference detection is successfully increased.

Figure 41C:
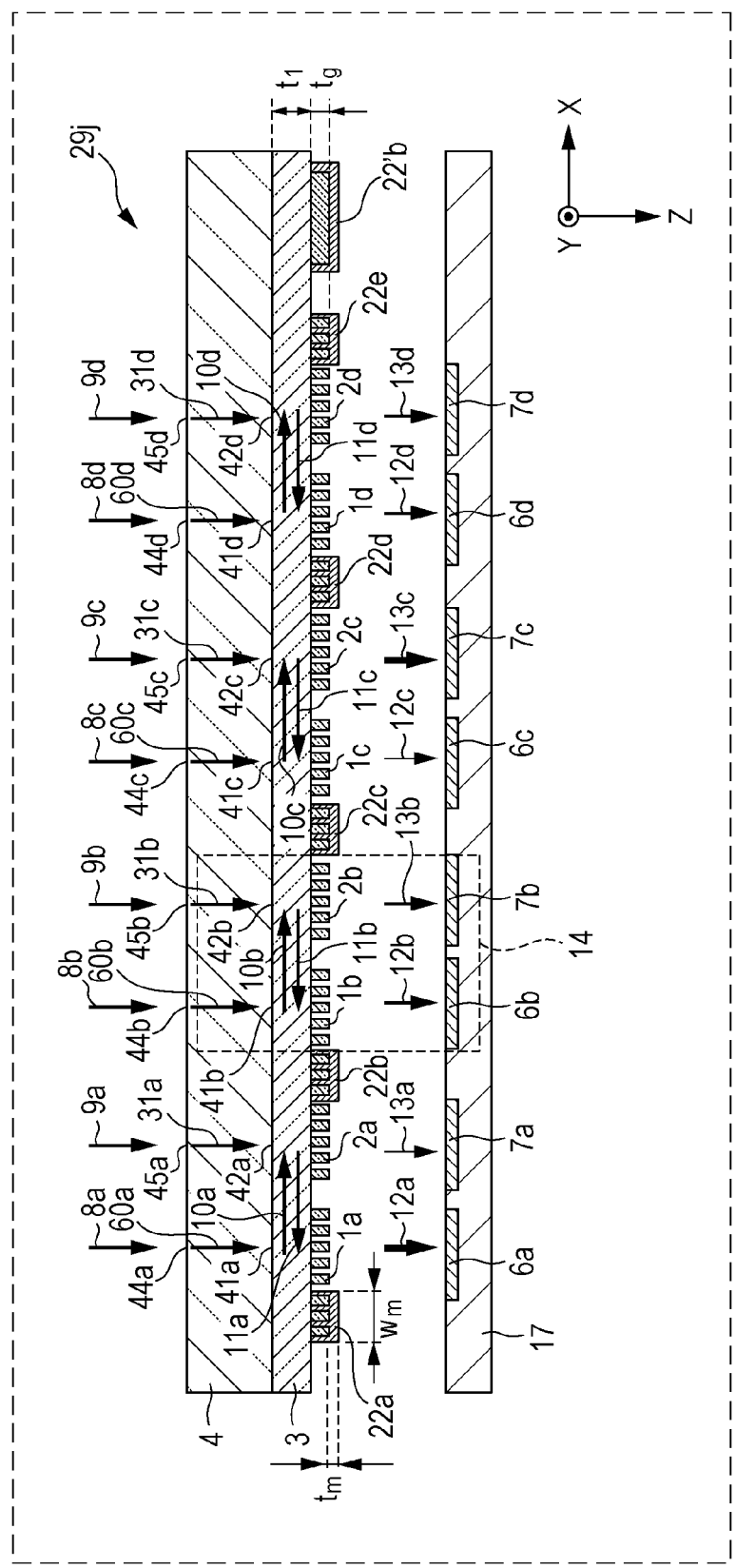
FIG. 41C is a cross-sectional view schematically illustrating the configuration of a light detection device according to yet another modification of the twelfth embodiment.

FIG. 41C is a cross-sectional view schematically illustrating the configuration of a light detection device 29j according to yet another modification of the twelfth embodiment. In this example, an optical coupler (grating) is continuously formed over regions between the plurality of first detection units 14. The patterns of the metal films 22a, 22b, 22c, 22d, 22e, and 22'b are formed on the gratings. In other words, the light detection device 29j according to this modification of the twelfth embodiment includes another optical coupler covered with the metal film in regions between the plurality of first detection units 14 in the first layer 3. According to this modification, the power of guided light that leaks to the adjacent detection unit is successfully reduced more than that achieved by the light detection device 29i illustrated in FIG. 41B. Accordingly, the configuration of this modification implements good crosstalk characteristics.

Thirteenth Embodiment

A light detection device according to a thirteenth embodiment of the present disclosure will be described next.

Figure 42:
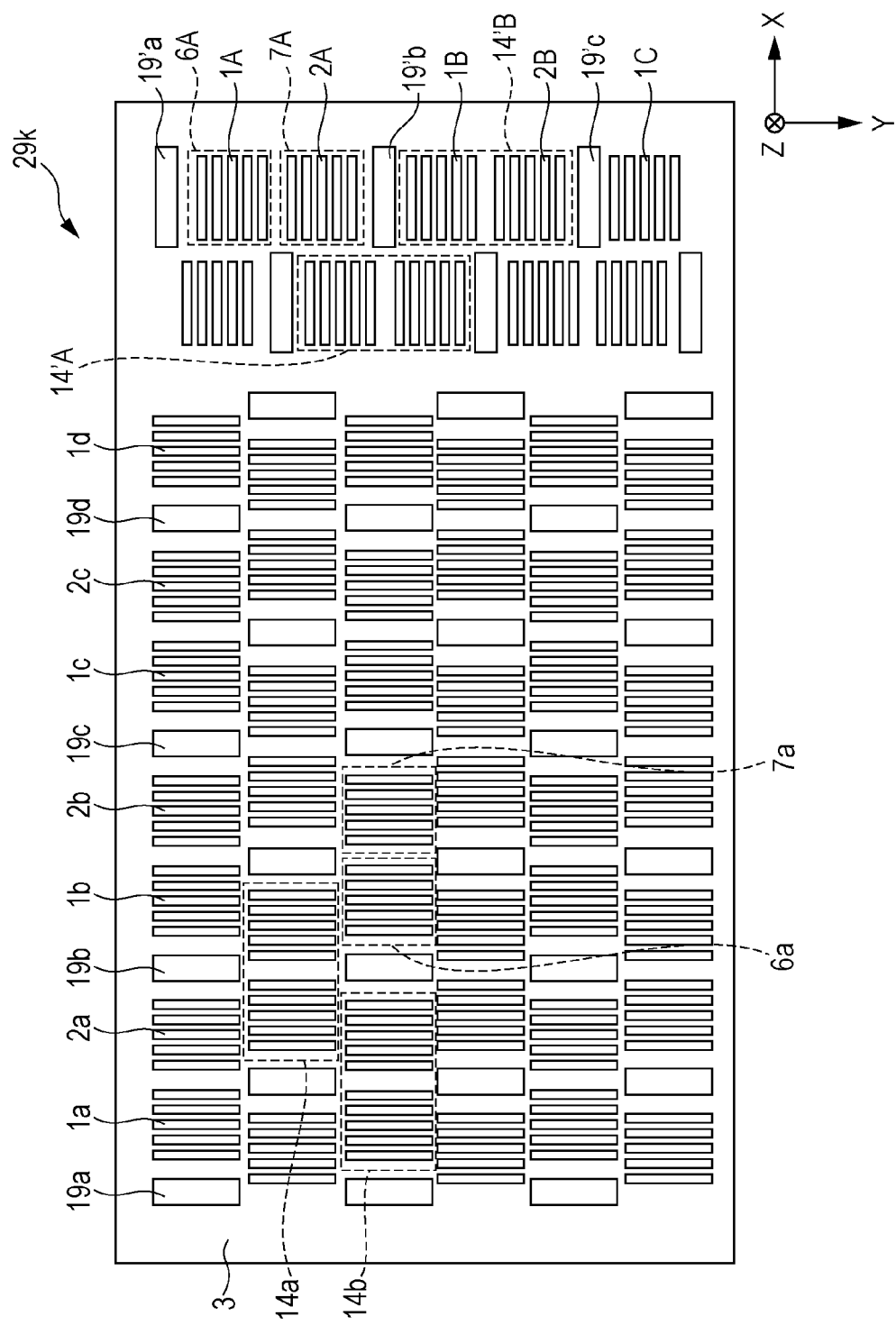
FIG. 42 is a plan view schematically illustrating the configuration of a light detection device according to a thirteenth embodiment of the present disclosure.

FIG. 42 is a plan view schematically illustrating the configuration of a light detection device 29k according to the thirteenth embodiment. The light detection device 29k according to the thirteenth embodiment has a configuration in which the arrangements of the plurality of first detection units 14 and the plurality of second detection units 14' (referred to as a stripe pattern) in the light detection device 29g according to the twelfth embodiment are changed to arrangements in a staggered pattern.

In the thirteenth embodiment, the X-direction position of the first detection units 14 in a certain row is shifted by a half period from the X-direction position of the first detection units 14 in another row adjacent to the certain row. Likewise, the Y-direction position of the second detection units 14' in a certain column is shifted by a half period from the Y-direction position of the second detection units 14' in another columns adjacent to the certain column. With such an arrangement in a staggered pattern, the resolution in the X direction and the Y direction can be substantially increased.

The light detection devices according to the first to thirteenth embodiments and the light detection systems have been described as examples of the technique of the present disclosure. However, the technique of the present disclosure is not limited to these light detection devices and light detection systems and is applicable to embodiments in which modification, replacement, addition, and omission are performed appropriately. Other embodiments may be created by combining the elements in the above-described embodiments.

What is claimed is:

1. A light detection device comprising:
a light detector including a first photodetector and a second photodetector;
a first layer disposed above the first photodetector and the second photodetector, the first layer being light-transmissive and having a first surface and a second surface opposing the first surface;
a first optical coupler disposed on at least one surface selected from the group consisting of the first surface and the second surface, the first optical coupler being light-transmissive and disposed above the first photodetector;
a second optical coupler disposed on the at least one surface, the second optical coupler being light-transmissive and disposed above the second photodetector; and
a second layer disposed between the light detector and the first layer so as to be in contact with the second surface of the first layer, the second layer being light-transmissive, wherein:
the second surface is closer to the light detector than the first surface is,
the second layer has a refractive index lower than a refractive index of the first layer,
the first optical coupler and the second optical coupler are disposed on the first surface of the first layer,
the first optical coupler has a structure that allows part of first light incident on the first optical coupler to propagate through the first layer in a direction toward the second optical coupler, and
the second optical coupler has a structure that allows part of second light incident on the second optical coupler to propagate through the first layer in a direction toward the first optical coupler.

2. The light detection device according to claim 1, wherein
the first optical coupler allows another part of the first light to pass through the first layer and the second layer and to be incident on the first photodetector, and
the second optical coupler allows another part of the second light to pass through the first layer and the second layer and to be incident on the second photodetector.

3. A light detection device comprising:
a light detector including a first photodetector and a second photodetector;
a first layer disposed above the first photodetector and the second photodetector, the first layer being light-transmissive and having a first surface and a second surface opposing the first surface;
a first optical coupler disposed on at least one surface selected from the group consisting of the first surface and the second surface, the first optical coupler being light-transmissive and disposed above the first photodetector;
a second optical coupler disposed on the at least one surface, the second optical coupler being light-transmissive and disposed above the second photodetector; and
a second layer that is in contact with the first surface of the first layer, the second layer being light-transmissive, wherein:
the second surface is closer to the light detector than the first surface is,
the second layer has a refractive index lower than a refractive index of the first layer, and
the first optical coupler and the second optical coupler are disposed on the second surface of the first layer.

4. A light detection device comprising:
a light detector including a first photodetector and a second photodetector;
a first layer disposed above the first photodetector and the second photodetector, the first layer being light-transmissive and having a first surface and a second surface opposing the first surface;
a first optical coupler disposed on at least one surface selected from the group consisting of the first surface and the second surface, the first optical coupler being light-transmissive and disposed above the first photodetector; and
a second optical coupler disposed on the at least one surface, the second optical coupler being light-transmissive and disposed above the second photodetector, wherein:
the second surface is closer to the light detector than the first surface is,
the first photodetector and the second photodetector are arranged along a first direction in plan view,
the first optical coupler is a first grating including first light-transmissive structures arranged along the first direction and extending in a second direction crossing the first direction in plan view, each of the first light-transmissive structures including a protrusion, and
the second optical coupler is a second grating including second light-transmissive structures arranged along the first direction and extending in the second direction in plan view, each of the second light-transmissive structures including a protrusion.

5. The light detection device according to claim 4, wherein:
each of the first photodetector and the second photodetector detects light having a wavelength λ in the air, and
each of the first light-transmissive structures and the second light-transmissive structures are arranged at a period Λ smaller than the wavelength λ, where 0.46 μm≤λ≤0.85 μm.

6. The light detection device according to claim 5, further comprising:
a second layer disposed between the light detector and the first layer so as to be in contact with the second surface of the first layer, the second layer being light-transmissive, wherein:
the second layer has a refractive index lower than a refractive index of the first layer, and
the period Λ satisfies $$\lambda/n_1 < \Lambda < \lambda/n_2,$$

where $n_1$ denotes the refractive index of the first layer and $n_2$ denotes the refractive index of the second layer.

7. The light detection device according to claim 5, wherein
the first grating further includes a portion in which the first light-transmissive structures are arranged at a period different from the period Λ, and
the second grating further includes a portion in which the second light-transmissive structures are arranged at a period different from the period Λ.

8. The light detection device according to claim 5, wherein a distance between a first light-transmissive structure closest to the second optical coupler among the first light-transmissive structures and a second light-transmissive structure closest to the first optical coupler among the second light-transmissive structures is greater than the period Λ.

9. The light detection device according to claim 8, wherein the light detector further includes a third photodetector opposing a region between the first grating and the second grating.

10. The light detection device according to claim 8, further comprising:
a second layer disposed between the light detector and the first layer so as to be in contact with the first layer, the second layer being light-transmissive, wherein:
the second layer has a refractive index lower than a refractive index of the first layer,
the first optical coupler and the second optical coupler are disposed on the first surface of the first layer,
cross-sections of the protrusion of the first grating and the protrusion of the second grating, the cross-sections being perpendicular to the second direction, have a shape selected from the group consisting of a triangular shape, a trapezoidal shape, and a sinusoidal shape, and
the distance is equal to dΛ, d satisfying $i+1.05 \le d \le i+1.26$, or $i+1.58 \le d \le i+1.79$, where i is an integer that is greater than or equal to 0.

11. The light detection device according to claim 8, further comprising:
a second layer that is in contact with the first surface of the first layer, the second layer being light-transmissive, wherein:
the second layer has a refractive index lower than a refractive index of the first layer,
the first optical coupler and the second optical coupler are disposed on the second surface of the first layer,
cross-sections of the protrusion of the first grating and the protrusion of the second grating, the cross-sections being perpendicular to the second direction, have a shape selected from the group consisting of a triangular shape, a trapezoidal shape, and a sinusoidal shape, and
the distance is equal to dΛ, d satisfying $1.08+i \le d \le 1.31+i$, or $1.58+i \le d \le 1.83+i$, where i is an integer that is greater than or equal to 0.

12. The light detection device according to claim 8, further comprising:
a second layer disposed between the light detector and the first layer so as to be in contact with the first layer, the second layer being light-transmissive, wherein:
the second layer has a refractive index lower than a refractive index of the first layer,
the first optical coupler and the second optical coupler are disposed on the first surface of the first layer,
cross-sections of the protrusion of the first grating and the protrusion of the second grating, the cross-sections being perpendicular to the second direction, have a shape selected from the group consisting of a rectangular shape, a rounded rectangular shape, and a semicircular shape, and
the distance is equal to dΛ, d satisfying one condition selected from the group consisting of:

$1 < d \le 1.16$, $i+1.47 \le d \le i+1.77$, and $i+1.92 \le d \le i+2.16$, where i is an integer that is greater than or equal to 0.

13. The light detection device according to claim 8, further comprising:
a second layer that is in contact with the first surface of the first layer, the second layer being light-transmissive, wherein:
the second layer has a refractive index lower than a refractive index of the first layer,
the first optical coupler and the second optical coupler are disposed on the second surface of the first layer,
cross-sections of the protrusion of the first grating and the protrusion of the second grating, the cross-sections being perpendicular to the second direction, have a shape selected from the group consisting of a rectangular shape, a rounded rectangular shape, and a semicircular shape, and
the distance is equal to dΛ, d satisfying $1 < d \le 1.22$, or $1.46+i \le d \le 2.22+i$, where i is an integer that is greater than or equal to 0.

14. A light detection device comprising:
a light detector including a first photodetector and a second photodetector:
a first layer disposed above the first photodetector and the second photodetector, the first layer being light-transmissive and having a first surface and a second surface opposing the first surface;
a first optical coupler disposed on at least one surface selected from the group consisting of the first surface and the second surface, the first optical coupler being light-transmissive and disposed above the first photodetector;
a second optical coupler disposed on the at least one surface, the second optical coupler being light-transmissive and disposed above the second photodetector; and
a polarizer, wherein:
the second surface is closer to the light detector than the first surface is, and
the polarizer allows light containing more transverse-magnetic polarization components than transverse-electric polarization components to be incident on the first optical coupler and the second optical coupler.

15. A light detection device comprising:
a light detector including a first photodetector and a second photodetector;
a first layer disposed above the first photodetector and the second photodetector, the first layer being light-transmissive and having a first surface and a second surface opposing the first surface;
a first optical coupler disposed on at least one surface selected from the group consisting of the first surface and the second surface, the first optical coupler being light-transmissive and disposed above the first photodetector; and a second optical coupler disposed on the at least one surface, the second optical coupler being light-transmissive and disposed above the second photodetector, wherein:

the second surface is closer to the light detector than the first surface is, a plurality of first photodetectors are provided in the light detector, each of the plurality of first photodetectors being the first photodetector, a plurality of second photodetectors are provided in the light detector, each of the plurality of second photodetectors being the second photodetector, a plurality of first optical couplers are provided in the light detection device, each of the plurality of first optical couplers being the first optical coupler, a plurality of second optical couplers are provided in the light detection device, each of the plurality of second optical couplers being the second optical coupler, the plurality of first photodetectors, the plurality of second photodetectors, the plurality of first optical couplers, and the plurality of second optical couplers are partitioned into a plurality of detection units arranged two-dimensionally, and each of the plurality of detection units includes a part of the first layer, one of the plurality of first optical couplers, one of the plurality of second optical couplers, one of the plurality of first photodetectors, and one of the plurality of second photodetectors.

16. The light detection device according to claim 15, further comprising:

a third optical coupler disposed in a region of the first layer between the plurality of detection units, the third optical coupler being covered with a metal film.

17. The light detection device according to claim 15, wherein:

the first photodetector and the second photodetector are arranged along a first direction in plan view, and the plurality of detection units are arranged along at least one direction selected from the group consisting of the first direction and a second direction crossing the first direction in plan view.

18. The light detection device according to claim 15, wherein the plurality of detection units are arranged in a staggered pattern.

19. A light detection system comprising:

a light detection device including a light detector including a first photodetector and a second photodetector;

a first layer disposed above the first photodetector and the second photodetector, the first layer being light-transmissive and having a first surface and a second surface opposing the first surface;

a first optical coupler disposed on at least one surface selected from the group consisting of the first surface and the second surface, the first optical coupler being light-transmissive and disposed above the first photodetector;

a second optical coupler disposed on the at least one surface, the second optical coupler being light-transmissive and disposed above the second photodetector; and a second layer disposed between the light detector and the first layer so as to be in contact with the second surfave of the first layer, the second layer being light-transmissive, wherein:

the second surface is closer to the photodetector than the first surface is, the second surface layer has a reractive index lower than a refractive index of the first layer, and a processing circuit that, in operation, generates information regarding a structure of an object by using a first electric signal output from the first photodetector and a second electric signal output from the second photodetector.

* * * * *